United States Patent
Marinescu et al.

(10) Patent No.: US 9,811,863 B1
(45) Date of Patent: Nov. 7, 2017

(54) DATABASE MANAGEMENT SYSTEM

(71) Applicant: Paulmar Software, Inc., Las Vegas, NV (US)

(72) Inventors: Cristian Marinescu, Lake Forest, CA (US); Emma Hart, Lake Forest, CA (US)

(73) Assignee: Paulmar Software, Inc., Las Vegas, NV (US)

( * ) Notice: Subject to any disclaimer, the term of this patent is extended or adjusted under 35 U.S.C. 154(b) by 0 days.

(21) Appl. No.: 15/290,867

(22) Filed: Oct. 11, 2016

Related U.S. Application Data

(60) Provisional application No. 62/348,072, filed on Jun. 9, 2016.

(51) Int. Cl.
*G06Q 40/00* (2012.01)
*G06Q 40/08* (2012.01)
*G06F 17/30* (2006.01)

(52) U.S. Cl.
CPC ....... *G06Q 40/08* (2013.01); *G06F 17/30312* (2013.01); *G06F 17/30522* (2013.01); *G06Q 40/12* (2013.12)

(58) Field of Classification Search
CPC ........ G06Q 40/08; G06Q 40/00; G06Q 10/10; G06Q 40/04; G06Q 40/06; G06F 19/328
See application file for complete search history.

(56) References Cited

U.S. PATENT DOCUMENTS

2002/0103729 A1* 8/2002 Young, III ....... G06Q 10/06398
705/30
2009/0319380 A1* 12/2009 Jacoby ............... G06Q 30/0277
705/14.73
2010/0125466 A1* 5/2010 Labelle .................. G06Q 40/08
705/4

OTHER PUBLICATIONS

Richard Gendal Brown, How to explain the value of replicated, shared ledgers from first principles, May 2, 2015.*
Government of Western Australia Department of Commerce, Real Estate and Business Agents' Trust Account Handbook, Dec. 2013.*
State Government of Victoria, Estate agents trust accounts: a reference guide, 2012.*
Chris Marinescu, et al., "Shortcomings of Current Premium Invoice Accounting," Insurance Journal, Sep. 5, 2005, http://www.insurancejournal.com/magazines/west/features/2005/09/05/60119.htm.
Chris Marinescu, et al., "Issues in Current Return Premium Accounting," Insurance Journal, Dec. 5, 2005, http://www.insurancejournal.com/magazines/features/2005/12/05/63462.htm.

(Continued)

*Primary Examiner* — Kirsten Apple
*Assistant Examiner* — Michael W Anderson
(74) *Attorney, Agent, or Firm* — Knobbe, Martens, Olson & Bear, LLP

(57) ABSTRACT

The database management system can include a plurality of databases, including a first database and a second database. The first database can include a plurality of database tables and/or indexes for storing account data records and a plurality of associated first database identifiers. In some embodiments, the first database includes a first database query system. The second database can include a second database table and/or index configured to store a plurality of symbolic data. In some embodiments, the second database includes a management module for generating symbolic data to be stored in the second database table and/or for generating a plurality of reports, among other things.

18 Claims, 77 Drawing Sheets

(56) References Cited

OTHER PUBLICATIONS

Chris Marinescu, et al., "How should agencies manage premium dollars?" Insurance Journal, Mar. 20, 2006, http://www.insurancejournal.com/magazines/features/2006/03/20/68710.htm.
Chris Marinescu, et al., "Financial Solvency Issues in P&C Insurance Industry," Agenda Magazine, Jan. 2009, pp. 29-30.
Chris Marinescu, et al., "From Concept to Practice: Insurance Trust Account Management," Insurance Journal, Aug. 6, 2012, http://www.insurancejournal.com/magazines/ideaexchange/2012/08/06/257776.htm.
Chris Marinescu, et al., "Agency Commission Income: Can It Be Managed?", AgencyEquity.com, accessed Dec. 21, 2016, https://www.agencyequity.com/articles/761-agency-commission-income-can-it-be-managed.
Chris Marinescu, et al., "What is an Insurance Broker's Biggest Pain?" AgencyEquity.com, accessed Dec. 21, 2016, https://www.agencyequity.com/articles/773-what-is-an-insurance-brokers-biggest-pain.
Chris Marinescu, et al., "What is an Insurance Broker's Biggest Pain?", Linkedin.com, Nov. 4, 2014, https://www.linkedin.com/pulse/20141104213358-45576242-what-is-an-insurance-broker-s-biggest-pain.
Chris Marinescu, et al., "Insurance Trust Account Management: Can an Agency Survive Without It?" AgencyEquity.com, accessed Dec. 21, 2016, https://www.agencyequity.com/articles/783-insurance-trust-account-management-can-an-agency-survive-without-it.
Chris Marinescu, "Is General Ledger Accounting Adequate for P/C Insurance Premium Transactions?" Insurance Journal, May 7, 2012, http://www.insurancejournal.com/magazines/features/2012/05/07/245711.htm.
Chris Marinescu, "Part Two: Is General Ledger Accounting Adequate for P/C Insurance Premium Transactions?" Insurance Journal, Jun. 4, 2012, http://www.insurancejournal.com/magazines/features/2012/06/04/249479.htm.
Chris Marinescu, Untitled blog post from Apr. 28, 2013, http://chrismarinescu.blogspot.com/2013/04/many-may-be-unaware-that-general-ledger.html.
Chris Marinescu, "P&C Insurance Agencies: Are They More Than Sales & Service Operations?" Linkedin.com, Oct. 14, 2014, https://www.linkedin.com/pulse/20141014151726-45576242-p-c-insurance-agencies-are-they-more-than-sales-service-operations.
Chris Marinescu, "Agency Commission Income: Why Agencies Struggle With It," Linkedin.com, Dec. 29, 2014, https://www.linkedin.com/pulse/agency-commission-income-why-agencies-struggle-chris-marinescu?trk=mp-reader-card.
Chris Marinescu, et al., "Quickbooks Accounting: Is It Adequate for P&C Insurance Premium Transactions?" The Anderson Agency Report, Aug. 1, 2013, http://taareport.com/taar/2013/08/quickbooks-accounting-is-it-adequate-for-pc-insurance-premium-transactions.html.
Chris Marinescu, "Insurance Fiduciary (Trust) Accounting," Linkedin.com, Oct. 3, 2014, https://www.linkedin.com/pulse/20141003195347-45576242-insurance-fiduciary-trust-accounting?trk=mp-reader-card.
Chris Marinescu, "Groundbreaking Accounting System for the Insurance Industry," Linkedin.com, Aug. 24, 2015, https://www.linkedin.com/pulse/groundbreaking-accounting-system-insurance-industry-chris-marinescu?trk=mp-reader-card.
Chris Marinescu, Blog post titled "Insurance Trust (Fiduciary) Accounting: Why Is It Different From Standard Trust Accounting?" Jul. 20, 2016, http://chrismarinescu.blogspot.com/2016/07/insurance-trust-fiduciary-accounting.html.
Chris Marinescu, Blog post titled "P&C Insurance Agency Automation," Aug. 29, 2016, http://chrismarinescu.blogspot.com/2016/08/.
"Insurance Trust Account Technology—NOBL Reporting System", Paulmar Group, LLC, Nov. 4, 2012, http://paulmargroup.com/.
"NOBL Insurance Premium Accounting & Financial Management," Paulmar Group, LLC, http://paulmargroup.com/. The "publication date" of this reference is not readily available. Applicant requests that the Examiner review the reference as prior art. Applicant reserves the right to disqualify the reference as prior art if needed.
"Paulmar Group LLC Announces Trust Ledger Accounting," Press Release, Paulmar Group, LLC, Mar. 12, 2013.
Report Samples, http://paulmargroup.com/. The "publication date" of this reference is not readily available. Applicant requests that the Examiner review the reference as prior art. Applicant reserves the right to disqualify the reference as prior art if needed.

\* cited by examiner

INSURANCE BROKER'S ACCOUNTING

GENERAL BUSINESS ACCOUNTING (Owner)

GL BALANCE SHEET

| ASSETS | | |
|---|---|---|
| Cash in Operating Bank Acct | | $0 |
| Cash on Hand | | $0 |
| Cash in Trust Account (Earned Comm) | | $250 |
| Commission Receivable | | $0 |
| TOTAL ASSETS | | $250 |

| LIABILITIES | | |
|---|---|---|
| Producer commission | | $0 |
| Salaries | | $0 |
| Vendors | | $0 |
| TOTAL LIABILITIES | | $0 |

| OWNERS EQUITY | | |
|---|---|---|
| | | $250 |
| TTL LIABILITIES & OWNERS EQUITY | | |

INCOME & EXPENSES STATEMENT

| INCOME | | |
|---|---|---|
| Commission Income | | $250 |
| DB Commission | | $0 |
| Other Income | | $0 |
| TOTAL INCOME | | $250 |

| EXPENSES | | |
|---|---|---|
| Producer Commission | | $0 |
| Salaries | | $0 |
| Vendors | | $0 |
| Other | | $0 |
| TOTAL EXPENSES | | $0 |
| PROFIT | | $250 |

FIDUCIARY/TRUST ACCOUNTING (Custodian)

Direction: Down / Payment

TL BALANCE SHEET

| CURRENT ASSETS | | |
|---|---|---|
| Cash in Trust Bank Acct | | $2,500 |
| Cash on Hand | | $0 |
| Premium Receivable | | $0 |
| TOTAL CURRENT ASSETS | | $2,500 |

| NON-CURRENT ASSETS | | |
|---|---|---|
| Un-Invoiced Transacted Premiums | | $7,500 |
| Un-Invoiced Endorsement Premiums | | $0 |
| TOTAL CURRENT & NON-CURRENT ASSETS | | $10,000 |

| CURRENT LIABILITIES | | |
|---|---|---|
| Agency commission | | $250 |
| Net Premium | | $2,250 |
| TOTAL CURRENT LIABILITIES | | $2,500 |

| NON-CURRENT LIABILITIES | | |
|---|---|---|
| Net-Premium on Un-Invoiced Premium | | $6,750 |
| Commission on Un-Invoiced Endorsements | | $750 |
| TOTAL NON-CURRENT LIABILITIES | | $7,500 |
| TOTAL LIABILITIES | | $10,000 |

RECEIPTS & DISBURSEMENTS (FLOAT) STATEMENT

| PREMIUM RECEIPTS | | |
|---|---|---|
| Transacted Premium Receipts | | $2,500 |
| Endorsement Premium Receipts | | $0 |
| TOTAL PREMIUM RECEIPTS | | $2,500 |
| OUTSTANDING TRANSACTED PREMIUM | | $7,500 |
| TOTAL TRANSACTED PREMIUM | | $10,000 |

| PREMIUM DISBURSEMENTS | | |
|---|---|---|
| Net Premium Remittance | | $0 |
| Commission Transfer | | $0 |
| TOTAL PREMIUM DISBURSEMENTS | | $0 |
| UNDISBURSED PREMIUM | | $10,000 |
| TOTAL TRANSACTED PREMIUM | | $10,000 |

| PREMIUM FLOAT | | |
|---|---|---|
| Premium Receipts | | $2,500 |
| Premium Disbursements | | $0 |
| PREMIUM FLOAT | | $2,500 |

Fig. 7B

INSURANCE BROKER'S ACCOUNTING

GENERAL BUSINESS ACCOUNTING (Owner) | FIDUCIARY/TRUST ACCOUNTING (Custodian)

| GL BALANCE SHEET | | | | TL BALANCE SHEET | | |
|---|---|---|---|---|---|---|
| ASSETS | | | | CURRENT ASSETS | | |
| Cash in Operating Bank Acct | $250 | | | Cash in Trust Bank Acct | | $2,250 |
| Cash on Hand | $0 | | | Cash on Hand | | $0 |
| Cash in Trust Account (Earned Comm.) | $0 | | | Premium Receivable | | $0 |
| Commission Receivable | $0 | | | TOTAL CURRENT ASSETS | | $2,250 |
| TOTAL ASSETS | $250 | | | NON-CURRENT ASSETS | | |
| LIABILITIES | | | | Un-invoiced Transacted Premiums | $7,500 | |
| Producer Commission | $0 | | | Un-invoiced Endorsement Premiums | $0 | |
| Salaries | $0 | | | TOTAL CURRENT & NON-CURRENT ASSETS | | $7,500 |
| Vendors | $0 | | | TOTAL ASSETS | | $9,750 |
| TOTAL LIABILITIES | $0 | Commission | | CURRENT LIABILITIES | | |
| OWNERS EQUITY | | Transfer | | Agency Commission | $0 | |
| TL LIABILITIES & OWNERS EQUITY | $250 | | | Net Premium | $2,250 | |
| | | | | TOTAL CURRENT LIABILITIES | | $2,250 |
| | | | | NON-CURRENT LIABILITIES | | |
| | | | | Net Premium on Un-Invoiced Premiums | $6,750 | |
| | | | | Commission on Un-Invoiced Endorsements | $750 | |
| | | | | TOTAL NON-CURRENT LIABILITIES | | $7,500 |
| | | | | TOTAL LIABILITIES | | $9,750 |

INCOME & EXPENSES STATEMENT | RECEIPTS & DISBURSEMENTS (FLOAT) STATEMENT

| | | | | | | |
|---|---|---|---|---|---|---|
| INCOME | | | | PREMIUM RECEIPTS | | |
| Commission Income | $250 | | | Premium Receipts | $2,500 | |
| DS Commission | $0 | | | Endorsement Premium Receipts | $0 | |
| Other Income | $0 | | | TOTAL PREMIUM RECEIPTS | | $2,500 |
| TOTAL INCOME | $250 | | | OUTSTANDING TRANSACTED PREMIUM | | $7,500 |
| EXPENSES | | | | PREMIUM DISBURSEMENTS | | |
| Producer Commission | $0 | | | Net Premium Remittance | $0 | |
| Salaries | $0 | | | Commission Transfer | $250 | |
| Vendors | $0 | | | TOTAL PREMIUM DISBURSEMENTS | | $250 |
| Other | $0 | | | UNDISBURSED PREMIUM | | $9,750 |
| TOTAL EXPENSES | $0 | | | TOTAL TRANSACTED PREMIUM | | $10,000 |
| PROFIT | $250 | | | PREMIUM FLOAT | | |
| | | | | Premium Receipts | $2,500 | |
| | | | | Premium Disbursements | ($250) | |
| | | | | PREMIUM FLOAT | | $2,250 |

| | | INSURANCE BROKER'S ACCOUNTING | | |
|---|---|---|---|---|
| GENERAL BUSINESS ACCOUNTING (Owner) | | FIDUCIARY/TRUST ACCOUNTING | | (Custodian) |
| GL BALANCE SHEET | | TL BALANCE SHEET | | |
| ASSETS | | CURRENT ASSETS | | |
| Cash in Operating Bank Acct | $1,000 | Cash in Trust Bank Acct | $6,750 | |
| Cash on Hand | $0 | Cash on Hand | $0 | |
| Cash in Trust Account (Earned Comm) | $0 | Premium Receivable | $0 | |
| Commission Receivable | $0 | | | $6,750 |
| TOTAL ASSETS | $1,000 | TOTAL CURRENT ASSETS | | |
| LIABILITIES | | NON-CURRENT ASSETS | | |
| Producer commission | $0 | Un-Invoiced Transacted Premiums | $0 | |
| Salaries | $0 | Un-Invoiced Endorsement Premiums | $0 | |
| Vendors | $0 | TOTAL NON-CURRENT ASSETS | | $0 |
| TOTAL LIABILITIES | $0 | | | $6,750 |
| OWNERS EQUITY | $1,000 | CURRENT LIABILITIES | | |
| TOTAL LIABILITIES & OWNERS EQUITY | $1,000 | Agency Commissions | $0 | |
| | | Net Premium | $6,750 | |
| | | TOTAL CURRENT LIABILITIES | | $6,750 |
| | | NON-CURRENT LIABILITIES | | |
| | | Post-Premium on Un-Invoiced Premium | $0 | |
| | | Commission on Un-Invoiced Endorsements | $0 | |
| | | TOTAL NON-CURRENT LIABILITIES | | $0 |
| | | | | $6,750 |
| INCOME & EXPENSES STATEMENT | | RECEIPTS & DISBURSEMENTS (FLOAT) STATEMENT | | |
| INCOME | | PREMIUM RECEIPTS | | |
| Commissions Income | $1,000 | Premium Receipts | $10,000 | |
| DB Commission | $0 | Endorsement Premium Receipts | $0 | |
| Other Income | $0 | TOTAL PREMIUM RECEIPTS | | $10,000 |
| TOTAL INCOME | $1,000 | OUTSTANDING TRANSACTED PREMIUM | | $0 |
| EXPENSES | | PREMIUM DISBURSEMENTS | | |
| Producer Commission | $0 | Net Premium Remittance | $2,250 | |
| Salaries | $0 | Commission Transfer | $1,000 | |
| Vendors | $0 | TOTAL TRANSACTED PREMIUM | | $3,250 |
| Other | $0 | UNDISBURSED PREMIUM | | $6,750 |
| TOTAL EXPENSES | $0 | PREMIUM FLOAT | | |
| PROFIT | $1,000 | Premium Receipts | $10,000 | |
| | | Premium Disbursements | ($3,250) | |
| | | PREMIUM TRANSACTED FLOAT | | $6,750 |

Fig. 7G

INSURANCE BROKER'S ACCOUNTING

GENERAL BUSINESS ACCOUNTING (Owner) | FIDUCIARY/TRUST ACCOUNTING (Custodian)

GL BALANCE SHEET | TL BALANCE SHEET

| GENERAL BUSINESS ACCOUNTING (Owner) | | | | FIDUCIARY/TRUST ACCOUNTING (Custodian) | |
|---|---|---|---|---|---|
| GL BALANCE SHEET | | | | TL BALANCE SHEET | |
| ASSETS | | | | CURRENT ASSETS | |
| Cash in Operating Bank Acct | $1,000 | | | Cash in Trust Bank Acct | $0 |
| Cash on Hand | $0 | | | Cash on Hand | $0 |
| Cash in Trust Account (Earned Comm) | $0 | Invoice | | Premium Receivable | $0 |
| Commission Receivable | $0 | Remit | | TOTAL CURRENT ASSETS | $0 |
| TOTAL ASSETS | $1,000 | | | NON-CURRENT ASSETS | |
| LIABILITIES | | | | Un-Invoiced Transacted Premiums | $0 |
| Producer commission | $0 | | | Un-Invoiced Endorsement Premiums | $0 |
| Salaries | $0 | | | TOTAL CURRENT & NON-CURRENT ASSETS | $0 |
| Vendors | $0 | | | CURRENT LIABILITIES | |
| TOTAL LIABILITIES | $0 | | | Agency Commission | $0 |
| OWNERS EQUITY | $1,000 | | | Net Premium | $0 |
| TT LIABILITIES & OWNERS EQUITY | $1,000 | | | TOTAL CURRENT LIABILITIES | $0 |
| | | | | NON-CURRENT LIABILITIES | |
| | | | | Net-Premium on Un-Invoiced Premium | $0 |
| | | | | Commission on Un-Invoiced Endorsements | $0 |
| | | | | TOTAL CURRENT & NON-CURRENT LIABILITIES | $0 |

INCOME & EXPENSES STATEMENT | RECEIPTS & DISBURSEMENTS (FLOAT) STATEMENT

| INCOME & EXPENSES STATEMENT | | | | RECEIPTS & DISBURSEMENTS (FLOAT) STATEMENT | |
|---|---|---|---|---|---|
| INCOME | | | | PREMIUM RECEIPTS | |
| Commission Income | $1,000 | | | Premium Receipts | $10,000 |
| BR Commission | $0 | | | Endorsement Premium Receipts | $0 |
| Other Income | $0 | | | TOTAL PREMIUM RECEIPTS | $10,000 |
| TOTAL INCOME | $1,000 | | | OUTSTANDING TRANSACTED PREMIUM | |
| EXPENSES | | | | TOTAL TRANSACTED PREMIUM | $0 |
| Producer Commission | $0 | | | PREMIUM DISBURSEMENTS | |
| Salaries | $0 | | | Net Premium Remittance | $9,000 |
| Vendors | $0 | | | Commission Transfer | $1,000 |
| Other | $0 | | | TOTAL PREMIUM DISBURSED | $10,000 |
| TOTAL EXPENSES | $0 | | | UNDISBURSED PREMIUM | |
| PROFIT | $1,000 | | | TOTAL UNTRANSACTED PREMIUM | $0 |
| | | | | PREMIUM FLOAT | |
| | | | | Premium Receipts | $10,000 |
| | | | | Premium Disbursements | ($10,000) |
| | | | | PREMIUM FLOAT | $0 |

Term Info | Premium, Tax & Fees | Down Pmt | Financing | Direct Remit
Comm | Endorsements | Comments Transacted Insurance Premium          $9,293.00

Company Fees:
Policy Tax                            $.00
Policy Fee                            $.00
Inspection Fee                        $.00
Other Fees                            $.00
Total                                 $.00

Agency Fees:
Broker Fee                            $250.00
Broker / General Agent Share          $.00
Agency Share                          $250.00
Technology Fee                        $.00
Other Fees                            $.00
Total                                 $250.00

Misc. Fees:
Referral Fee                          $.00

Term Info | Premium, Tax & Fees | Down Pmt | Financing | Direct Remit
Comm | Endorsements | Comments Premium Down Payment                  $2,323.25
Tax & Fees                            $250.00
Total Down Payment                    $2,573.25
Premium Balance                       $6,969.75
Down Payment Due Date                 06/12/2014
Down Payment Received                 $2,573.25
Date                                  06/06/2014
Check No.                             17306
Premium Financing?                    ●Yes ○No
Is Dn Pmt Check Endorsed to Carrier?  ○Yes ●No
Down Pmt Remittance
Down Pmt Remittance By
(A) Commission Paid in Full?          ○Yes ●No

Endorsements

Client No. 145
Acct No. 1

Policy No. 01TRM00721701 | Redwood Fire & Casualty Ins Co.
Coverage: Commercial Auto Li | Policy Type: Single Location
Endors No.: 2
Endors Date: 7/14/2014 | Endors Type: AP
Reason: Coverage change by client Endorsement Gross Premium: $23,664.00
Tax & Fees: $500.00
Premium, Tax & Fees: $24,164.00
Endorsement Net Premium: $21,297.60
Endorsement Comm & Fees: $2,866.40

Comments | Financing
Premium, Tax & Fees | Commissions | Down Payment

Endorsement Premium: $23,664.00

Company Fees:
Policy Tax: $.00
Policy Fee: $.00
Inspection Fee: $.00
Other Fees: $.00
Total: $.00

Agency Fees:
Broker Fee: $500.00
Broker / General Agent Share: $.00
Agency Share: $500.00
Technology Fee: $.00
Other Fees: $.00
Total: $500.00

1000C

Comments | Financing
Premium, Tax & Fees | Commissions | Down Payment

| | |
|---|---|
| Commission Rate | 10.0% |
| Broker / General Agent Comm. Share | .0% |
| Agency Commission Share | 10.0% |
| Commission Amount | $2,366.40 |
| Broker / General Agent Comm. Amount | $.00 |
| Agency Commission Amount | $2,366.40 |
| Broker/GA Commission & Fees | $.00 |
| Agency Commission & Fees | $2,866.40 |

Producers

| | |
|---|---|
| Commission Rate | 25.0% |
| Commission Amount | $591.60 |
| Fee Rate | 25.0% |
| Fee Amount | $125.00 |
| Commission & Fees | $716.60 |

Comments | Financing
Premium, Tax & Fees | Commissions | Down Payment

| | |
|---|---|
| Bill Type | Agency Bill |
| Premium Financing? | ● Yes ○ No |
| Options | Direct remittance to Co. |
| Endorsement Down Payment | $4,732.80 |
| Tax & Fees | $500.00 |
| Total Down Payment | $5,232.80 |
| Premium Balance | $6,993.20 |
| Down Payment Due Date | 07/14/2014 |
| Down Payment Received | |
| Date | |
| Check No. | |
| Down Pmt Net | $2,366.40 |
| Down Pmt Comm & Fees | $2,866.40 |

| | |
|---|---|
| Finance Co. | 101 | TOP Premium Finance Co |
| Finance Amt | $18,931.20 |
| Financed Agreement No. | 9814 |
| Financed Agreement Date | 09/08/2014 |
| Remittance Amount | $18,931.20 |
| Remittance Check | 9814 |
| Remittance Date | 09/08/2014 |

Tabs: Premium, Tax & Fees | Commissions | Down Payment | Comments | Financing 1000A
1000D

Comments | Direct Refund
Premium, Tax & Fees | Commissions

Commission Rate: 10.0%
Broker / General Agent Comm. Share: .0%
Agency Commission Share: 10.0%
Commission Amount: $1,476.50
Broker / General Agent Comm. Amount: $.00
Agency Commission Amount: $1,476.50
Broker/GA Commission & Fees: $.00
Agency Commission & Fees: $1,476.50

Producers
Commission Rate: 50.0%
Commission Amount: $738.25
Fee Rate: 50.0%
Fee Amount: $.00
Commission & Fees: $738.25

Premium, Tax & Fees | Direct Refund
Comments | Commissions

Direct Refund Amount: $13,288.50
Direct Refund Date: 01/10/2015
Direct Refund Document No.: 11015

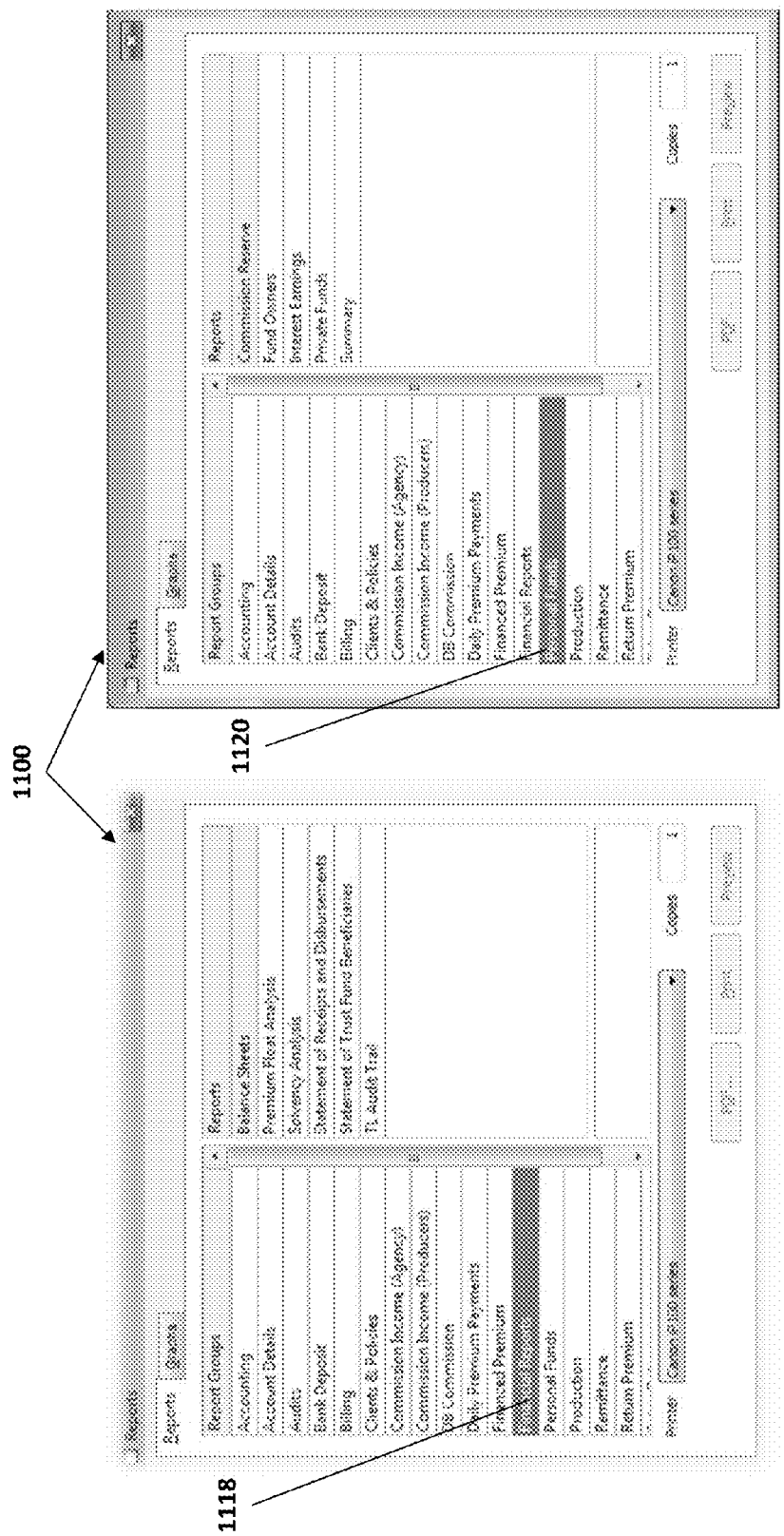

PREMIUM DETAIL

Account No. 115*1
CBest Name Anderson & Anderson Construction
Policy No. QEA 1324
Policy Inception 08/17/2008
Printed 09/05/2012

I. Gross Premiums — 1202A

| | | |
|---|---:|---:|
| Premium | | 1,100.00 |
| Policy Tax | 50.00 | |
| Policy Fee | 25.00 | |
| Inspection Fee | 75.00 | |
| Other Co. Fees | .00 | |
| Total Co. Tax & Fees | | 150.00 |
| Broker Fee | 100.00 | |
| Technology Fee | 50.00 | |
| Other Agency Fees | .00 | |
| Total Agency Fees | | 150.00 |
| Total Tax & Fees | | 300.00 |
| Total Premium | | 1,400.00 |

II. Premium Distribution — 1202B

| | | |
|---|---:|---:|
| Net Premium | 990.00 | |
| Co. Tax & Fees | 150.00 | |
| Outside Broker Commission | .00 | |
| Broker Fee – Outside Broker Share | .00 | |
| Net Premium | | 1,140.00 |
| Agency Commission | 110.00 | |
| Broker Fee – Agency Share | 100.00 | |
| Technology Fee | 50.00 | |
| Other Agency Fee | .00 | |
| Agency Commission & Fees | | 260.00 |
| Total Premium | | 1,400.00 |

III. Producer Commission — 1202C

| | | |
|---|---:|---:|
| Commission: | 20.0% | 22.00 |
| Fees | 25.0% | 37.50 |
| Commission & Fees | | 59.50 |
| Michael Murray | 50.0% | 29.75 |
| Earl Harper | 30.0% | 17.55 |
| Lilian Pinto | 20.0% | 11.90 |

IV. Agency Net Comm & Fees — 1202D

| | |
|---|---:|
| Agency Net Comm & Fees | 260.00 |
| Less: Finding / Referral Fee | (30.00) |
| Total | 230.00 |

Production by Producer

Statement of Trust Fund Beneficiaries
Premium & Return Premium Funds
California Insurance Company Printed: 09/06/2012

Page: 1

1252

| Policy Acct. | Client Name | Coverage | Inception | Premium Float | Due to Company | Due to Agency | Due to Insured | Due to Fin. Co. |
|---|---|---|---|---|---|---|---|---|
| California Insurance Company | | | | | | | | |
| 101*1 | ESP Co. | GL | 02/22/2007 | 630.00 | 510.00 | 120.00 | .00 | .00 |
| 101*2 | ESP Co. | GAR | 02/22/2007 | 1,140.00 | 1,140.00 | .00 | .00 | .00 |
| 102*1 | Sally's Flowers | GL | 02/22/2007 | 1,230.00 | 1,140.00 | 90.00 | .00 | .00 |
| 102*2 | Sally's Flowers | FIRE | 02/22/2007 | 240.00 | 240.00 | .00 | .00 | .00 |
| 103*1 | Polly's Pies | GL | 02/24/2007 | 330.00 | 397.50 | 7.50 | .00 | .00 |
| 103*2 | Polly's Pies | FIRE | 02/24/2007 | 330.00 | 285.00 | 45.00 | .00 | .00 |
| 115*1 | Anderson & Anderson Construction | FIRE | 08/05/2008 | 397.50 | 397.50 | .00 | .00 | .00 |
| 116*1 | Great News | FIRE | 08/07/2008 | 1,165.00 | 1,140.00 | 25.00 | .00 | .00 |
| 117*1 | Anderson & Anderson Construction | FIRE | 08/09/2008 | 711.10 | 707.90 | 3.20 | .00 | .00 |
| | TOTAL | | - | 6,173.60 | 5,957.90 | 290.70 | .00 | .00 |
| | GRAND TOTAL | | - | 6,173.60 | 5,957.90 | 290.70 | .00 | .00 |

Fig. 12J

NOBL BANK DEPOSIT SLIP

Test Agency 5

I. Bank Deposit Summary

Deposit No.    158

Bank           Bank of America
Account No.    29348-1231-21412
Type           Trust Amount         $2,205.73
Date
Processed By

*- Important Note to Users -*
*Verify that ONLY checks listed in Part II are deposited in the bank at this time.*
*Additional checks must be processed and deposited in the bank with the next deposit slip.*

II. List of Deposit Checks

| Account No. | Client Name | Check No. | Amount |
|---|---|---|---|
| 115-1 | Iris Ramirez | 4424 | 2,205.73 |
| | | Total Deposit | 2,205.73 |

_____
Authorized Signature

COMMISSION TRANSFER MEMO

Transfer No. 10 - Printed 08/27/2012

I. Transfer Deposit Summary

| | |
|---|---|
| To Operating Account | $681.60 |
| Commission Reserve Fund | $200.00 |
| Commission Transfer Amount | $881.60 |

From Account
- Bank Name — Bank of America
- Account No. — 29348-1231-21412
- Holder — Test Agency 5

To Operating Account
- Bank Name — Bank of America
- Account No. — 12341-1234-12321
- Holder — Test Agency 5

To Reserve Account
- Bank Name — Bank of America
- Account No. — 29348-1231-21412
- Holder — Test Agency 5

Transfer Completion
- Date
- Processed By
- Type
- Document No.
- Agency Check No.
- Check Date
- Check Amount

I. Detail List of Commission Transfer

(see attached report)

Earned Commission Report

| Acct No | Client Name | Cov | Item | Gross Premium | Commission Rate* | Net Premium | Payment | Bank Deposit | Commission Earned/Loss | Previous Transfer | Transfer Now |
|---------|-------------|-----|------|---------------|------------------|-------------|---------|--------------|------------------------|-------------------|--------------|
| 11571 | Iris Ramirez | FIRE | 0 | 3,305.73 | 10.0% | 1,334.13 | 2,205.73 | 2,205.73 | 881.60 | .00 | 881.60 |
| | | | | 3,305.73 | | 1,334.13 | 2,205.73 | 2,205.73 | 881.60 | .00 | 881.60 |

Summary
Commission Earned This Period 881.60
Commission Loss .00
Commission Transferred 881.60

Remittance Check Voucher

| BILLING MONTH | | TYPE | | | STATEMENT DATE | DUE DATE | TODAY | PAGE | |
|---|---|---|---|---|---|---|---|---|---|
| August | | Monthly | | | 08/27/2012 | 09/15/2012 | 08/27/2012 | 1 | |

PART I: REMITTANCE (REIMBURSEMENT) PREMIUM

| | | | | | | | | | |
|---|---|---|---|---|---|---|---|---|---|
| 1 | 1 | APS12851 | 115*1 | S | Iris Ramirez | FIRE | Down Payment | 1,250.00 | 0% | 1,250.00 |
| 2 | 2 | APS12851 | 115*1 | S | Iris Ramirez | FIRE | Policy Fee | 200.00 | 0% | 200.00 |
| 3 | 3 | APS12851 | 115*1 | S | Iris Ramirez | FIRE | Policy Tax | 156.12 | 0% | 156.12 |
| 4 | 4 | APS12851 | 115*1 | S | Iris Ramirez | FIRE | Inspection Fee | 205.00 | 0% | 205.00 |
| 5 | 5 | APS12851 | 115*1 | S | Iris Ramirez | FIRE | Other Fees | 13.01 | 0% | 13.01 |
| | | Remittance (Reimbursement) Premium Total | | | | | | 1,824.13 | | 1,824.13 |

PART II: DISPUTED PREMIUM
No disputed items .00

PART III: PREVIOUSLY REMITTED (REIMBURSED)
No previously remitted items .00

PART IV: STATEMENT PREMIUM 1,824.13

REMITTANCE (REIMBURSEMENT) CHECK AMOUNT 1,824.13

STATEMENT OF PREMIUM RECEIPTS AND DISBURSEMENTS
Ins Renewal (11511)  Printed: 08/27/2012

PART I: TRANSACTED PREMIUM RECEIPTS

Premium Receipts

| Acct No |  |  |  |
|---|---|---|---|
| 410 | Down Payment | 2,205.73 |  |
| 411 | Annual Premium | .00 |  |
|  | Total Annual Premium and Down Payment |  | 2,205.73 |
| 420 | Installment Premium | .00 |  |
| 421 | Endorsement AP | .00 |  |
| 422 | Re-Invoiced Short Payment | .00 |  |
| 423 | Uncollectible NSF Checks | .00 |  |
| 425 | Financed Premium | .00 |  |
| 426 | Audit Premium | .00 |  |
| 427 | DB Do Payment Premium | .00 |  |
|  | Total Invoiced and Financed Premium |  | .00 |
|  | Total Premium Receipts |  | 2,205.73 |
| 428 | Offset Premium Refund to/from Insured | .00 |  |
| 429 | Offset Premium Refund to/from Finance Company | .00 |  |
|  | Total Offset Premium Refund |  | .00 |
| 440 | Premium Cash Refund to Insured | .00 |  |
| 450 | Premium Cash Refund to Finance Company | .00 |  |
|  | Total Premium Cash Refunds |  | .00 |
|  | Total Premium Offsets & Refunds |  | .00 |
|  | TOTAL PREMIUM RECEIPTS & OFFSETS LESS REFUNDS |  | 2,205.73 |

Outstanding Transacted Premiums

| Acct No |  |  |  |
|---|---|---|---|
| 480 | Outstanding Transacted Premium | .00 |  |
| 481 | Outstanding Endorsement AP | .00 |  |
| 483 | Uncollectible NSF Checks | .00 |  |
| 484 | Unreconciled Endorsement RP | .00 |  |
| 485 | Fin Premium w/ Direct Remittance | 3,750.00 |  |
| 487 | DB Premium | .00 |  |
| 488 | Unrefunded Overpayments | .00 |  |
| 490 | Unrefunded Return Premium | .00 |  |
|  | Total Outstanding Transacted Premium |  | 3,750.00 |
|  | TOTAL TRANSACTED & ENDORSEMENT PREMIUM |  | 5,955.73 |

PART II: TRANSACTED PREMIUM DISBURSEMENTS

Disbursements

| Acct No | | |
|---|---|---|
| 560 | Net Premium Remittance | .00 |
| 561 | Endorsement AP - Net Premium Remittance | .00 |
| 567 | OB On Pmt Remittance | .00 |
| 570 | Commission Income Transfer | .00 |
| 571 | Endorsement AP - Commission Transfer | .00 |
| 573 | Uncollectible NSF Check Commission | .00 |
| 575 | On Pmt to Fin. Co. | .00 |
| 577 | OB On Pmt Commission Transfer | .00 |
| | Total Disbursements | .00 |

Reimbursements

| | | |
|---|---|---|
| 564 | Net Premium Reimbursements (cash or credit) | .00 |
| 574 | Commission Reimbursements (cash or credit) | .00 |
| | Total Reimbursements | .00 |

TOTAL DISBURSEMENTS LESS REIMBURSEMENTS .00

Undisbursed Premium

| Acct No | | |
|---|---|---|
| 580 | Undisbursed Transacted Premium | 2,205.73 |
| 581 | Undisbursed Endorsement Premium | .00 |
| 583 | Uncollectible NSF Check Commission | .00 |
| 584 | Unreconciled Endorsement RP | .00 |
| 585 | Financed Prem Direct Remittance | 3,750.00 |
| 587 | OB Premium | .00 |
| 588 | Outstanding Overpayments | .00 |
| 590 | Unreimbursed Return Premium | .00 |
| | Total Undisbursed Premium | 5,955.73 |

TOTAL TRANSACTED & ENDORSEMENT PREMIUM 5,955.73

PART III: PREMIUM FLOAT

Premium Transactions

| | | |
|---|---|---|
| Total Premium Receipts & Offsets | 2,205.73 | |
| Total Premium Disbursements | .00 | |
| Total Premium Receipts Less Disbursements | | 2,205.73 |
| Total Premium Reimbursements | .00 | |
| Total Premium Refunds | .00 | |
| Total Reimbursements Less Refund | | .00 |

PREMIUM FLOAT 2,205.73

Fig. 13F

Trust Account Balance Sheet

FIDUCIARY ASSETS

Current Premium Assets

| AcctNo | | | |
|---|---|---|---|
| 101 | Cash in Trust Bank Account | 2,205.73 | |
| 103 | Trust Cash on Hand | .00 | |
| | Total Cash Premium Assets | | 2,205.73 |
| 120 | Invoiced Premium Receivable | .00 | |
| 121 | Endorsement Premium Receivable | .00 | |
| 122 | Short Payment Receivable | .00 | |
| 123 | NSF Check Receivable | .00 | |
| 125 | Financed Premium Receivable | .00 | |
| 126 | Audit Premium Receivable | .00 | |
| | Total Premium Receivable | | .00 |
| 130 | Return Net Premium Receivable | .00 | |
| 131 | Return Premium Credit | .00 | |
| 140 | Return Commission Receivable | .00 | |
| 141 | Return Commission Credit Reimbursement | .00 | |
| | Total Return Premium Receivable & Credit | | .00 |
| 150 | Offset Premium Credit from Insured | .00 | |
| 160 | Offset Premium Credit from Finance Co. | .00 | |
| | Total Offset Premium Credit | | .00 |
| | Total Current Premium Assets | | 2,205.73 |

Non-Current Assets

| AcctNo | | | |
|---|---|---|---|
| 170 | Unbilled Premium | .00 | |
| 171 | Unbilled Endorsement Premium | .00 | |
| 172 | Short Payment Premium | .00 | |
| 173 | NSF Check Premium | .00 | |
| 174 | Unreconciled Endorsement RP | .00 | |
| 175 | Financed Premium w/ Remittance to Carrier | .00 | |
| 176 | Adjustment to Estimated Audit Premium | .00 | |
| 177 | OB Premium | .00 | |
| | Total Non-Current Premium Assets | | .00 |

| TOTAL TRUST ACCOUNT ASSETS | 2,205.73 |
|---|---|

FIDUCIARY LIABILITIES

Current Premium Liabilities

| AcctNo | | | | |
|---|---|---|---|---|
| 200 | Net Premium Payable | .00 | | |
| 201 | Net Premium Current | 1,324.13 | | |
| | Total Net Premium Liabilities | | 1,324.13 | |
| 210 | Commission Payable | 881.60 | | |
| 211 | Commission Current | .00 | | |
| 213 | Commission Loss on NSF Checks | .00 | | |
| | Total Current Commission Liabilities | | 881.60 | |
| 220 | Return Premium Credit | .00 | | |
| 230 | Return Financed Premium Credit | .00 | | |
| 260 | Return Premium Due to Insured (Not Payable) | .00 | | |
| 261 | Return Premium Payable to Insured | .00 | | |
| 268 | Overpayment Due to Insured (Not Payable) | .00 | | |
| 270 | Return Premium Due to Financed Co.'s (Not Payable) | .00 | | |
| 271 | Return Premium Payable to Financed Co.'s | .00 | | |
| | Total Return Premium Liabilities | | .00 | |
| | Total Current Premium Liabilities | | | 2,205.73 |

Non-Current Premiums Liabilities

| AcctNo | | | | |
|---|---|---|---|---|
| 240 | Net Premium on Unbilled Premium | .00 | | |
| 241 | Net Premium on Unbilled Endorsements | .00 | | |
| 244 | Unrecorded Endorsement RP (net) | .00 | | |
| 247 | DB Premium Net | .00 | | |
| 250 | Commission on Unbilled Premium | .00 | | |
| 254 | Unrecorded Endorsement RP (commission) | .00 | | |
| 251 | Commissions on Unbilled Endorsements | .00 | | |
| 257 | DB Premium Commission | .00 | | |
| | Total Non-Current Premiums Liabilities | | | .00 |

| TOTAL PREMIUM LIABILITIES | | | | 2,205.73 |

Policy Premium Float Analysis

1312

| Customer Name<br>Iris Ramirez | ACCOUNT NO<br>115*1 | | Producer<br>Fire Liability |
|---|---|---|---|
| Insurance Company<br>California Insurance Company | POLICY NO.<br>APS12851 | | Period<br>06/27/2012 |

A. Receipts & Disbursements

| | |
|---|---|
| Direct Payment | 2,205.73 |
| Installments | .00 |
| Endorsements | .00 |
| Financed Premium | .00 |
| Audit Premium | .00 |
| Short Payment | .00 |
| NSF Checks | .00 |
| Total Premiums Receipts | 2,205.73 |
| Ext. Pmt. to Fin. Co. | .00 |
| Total Premium Remittance | .00 |
| Total Commission Income | .00 |
| Total Return Premium Reimbursements | .00 |
| Total Premium Refund | .00 |
| Premiums Float | 2,205.73 |

B. Net Premiums Liability

| | |
|---|---|
| Net Premiums Current | 1,324.13 |
| Less: Net Premium on Outstanding Invoices or Fin Premium | |
| Premium Invoices | .00 |
| Fin Premium | .00 |
| Audit Premium | .00 |
| Endorsement NP Invoices | .00 |
| Net Premium Payable | .00 |
| Total Net Premium Liability | 1,324.13 |

C. Commission Liability

| | |
|---|---|
| Commission Current | .00 |
| Less: Commission on Outstanding Invoices or Fin Prem | |
| Premium Invoices | .00 |
| Fin Premium | .00 |
| Audit Premium | .00 |
| Endorsement AP Invoices | .00 |
| Commission Payable | 881.60 |
| Total Commission Liability | 881.60 |

D. Return Premium Liability / Overpayment

| | |
|---|---|
| To Insured | .00 |
| To Premium Finance Company | .00 |

| | |
|---|---|
| TOTAL PREMIUM & RETURN PREMIUM LIABILITY | 2,205.73 |

Summary of Premium Float Beneficiaries

| | |
|---|---|
| Premium Float | 2,205.73 |
| Beneficiaries: | |
| California Insurance Company | 1,324.13 |
| Agency | 881.60 |
| Insured | .00 |
| Finance Companies | .00 |
| Total | 2,205.73 |

Fig. 13I

TRUST ACCOUNT SOLVENCY ANALYSIS
Iris Ramirez (115*1)   Printed: 08/27/2013

PART 1: CASH SOLVENCY

AcctNo

| | | | |
|---|---|---|---|
| | Cash and Credit Assets | | |
| 101 | Cash in Trust Bank Account | 2,205.73 | |
| 103 | Trust Cash on Hand | .00 | |
| 131 | Return Premium Credit | .00 | |
| 141 | Return Commission Credit Reimbursement | .00 | |
| | Total Cash and Credit Assets | | 2,205.73 |
| | Premium Payable | | |
| 200 | Net Premium Payable | .00 | |
| 210 | Commissions Payable | 881.60 | |
| 220 | Return Premium Credit | .00 | |
| 230 | Return Financed Premium Credit | .00 | |
| 261 | Return Premium Payable to Insured | .00 | |
| 271 | Return Premium Payable to Financed Co.'s | .00 | |
| | Total Premium Payable | | 881.60 |
| | TRUST ACCOUNT CASH FUNDS SURPLUS (DEFICIT) | | 1,324.13 |

Fig. 13J

PART II: ACCOUNT CURRENT SOLVENCY

Current Assets

| | | |
|---|---:|---:|
| Cash and Credit Assets | 2,205.73 | |
| Premium Receivable | .00 | |
| Return Premium Receivable | .00 | |
| Total Current Assets | | 2,205.73 |

Current Liabilities

| AcctNo | | | |
|---|---|---:|---:|
| 200 | Net Premium Payable | .00 | |
| 210 | Commissions Payable | 881.60 | |
| 220 | Return Premium Credit | .00 | |
| 230 | Return Financed Premium Credit | .00 | |
| 261 | Return Premium Payable to Insured | .00 | |
| 271 | Return Premium Payable to Financed Co.'s | .00 | |
| | Total Premium Payable | | 881.60 |
| 201 | Net Premium Current | 1,324.13 | |
| 211 | Commission Current | .00 | |
| 213 | Commission Loss on NSF Checks | .00 | |
| 260 | Return Premium Due to Insured (Not Payable) | .00 | |
| 268 | Overpayment Due to Insured (Not Payable) | .00 | |
| 270 | Return Premium Due to Financed Co.'s (Not Payable) | .00 | |
| | Total Account Current Premium | | 1,324.13 |
| | Total Current Liabilities | | 2,205.73 |
| | TRUST ACCOUNT FUNDS SURPLUS (DEFICIT) | | .00 |

DATABASE MANAGEMENT SYSTEM

CROSS-REFERENCE TO RELATED APPLICATIONS

The present application claims priority benefit under 35 U.S.C. §119(e) to U.S. Provisional Application No. 62/348,072, titled DATABASE MANAGEMENT SYSTEM, filed Jun. 9, 2016, which is hereby incorporated by reference herein in its entirety.

BACKGROUND OF THE INVENTION

Field of the Invention

The disclosure relates generally to the field of database management, and more specifically to systems, methods, and devices for management of databases used in insurance and accounting systems, for example, in property and casualty insurance and accounting systems.

Description of the Related Art

Database management systems can generally be implemented to monitor, track, measure and/or calculate various information and data. Many current database management systems are limited to a single database that may not accurately account for all data entered into, monitored, tracked, measured, and/or calculated by the system.

Further, with the development of new technologies, various types and kinds of database management systems are available today. However, many database management systems may not be suitable for accurately tracking, monitoring, and/or storing account data including insurance policy or premium data, for example, property and casualty ("P&C") insurance policy or premium data. As such, various database management systems are not customized according to certain regulations and do not sufficiently account for all data monitored, tracked, measured, entered into, and/or calculated in the systems. In other words, the P&C insurance accounting industry, for example, lacks any standard or base database management system that can be adapted to accommodate the laws and/or regulations governing the P&C insurance accounting industry. Accordingly, many database management systems generally do not properly account for all data and do not have multiple databases for storing related data and generating financial solvency reports based on the related data stored in the databases.

SUMMARY OF THE INVENTION

The disclosure herein provides systems, methods, and devices that enable various forms of database management systems. According to some embodiments, a computer-implemented database management method for identifying account records in response to input received via an interactive user interface to automatically calculate symbolic data based on the account records and to monitor and present the account records in a useful configuration for the management of property and casualty insurance policy premium data. The computer-implemented method comprises: receiving, through the interactive user interface, a plurality of electronic data associated with a first insurance policy and an insurance premium transaction, the plurality of electronic data comprising one or more account records; applying, by a computer system, a first database identifier to each account record of the one or more account records, wherein the first database identifier comprises a customer number and a policy number associated with the first insurance policy; storing, by the computer system, each account record of the one or more account records and the first database identifier as a first index of a first database, wherein the first index includes a plurality of database fields and a plurality of database records, and wherein a first database record of the plurality of database records corresponds to the first insurance policy; automatically translating the first database into a second database, wherein the automatic translating further comprises: accessing, by the computer system, the first index of the first database; retrieving, by the computer system, each account record of the one or more account records from the first index of the first database; generating, by the computer system, in response to retrieving each account record associated with the insurance premium transaction, a plurality of symbolic data records based on the one or more account records, wherein the symbolic data includes a net premium and a commission; applying, by the computer system, a second database identifier to each symbolic data record of the plurality of symbolic data records, wherein the second database identifier comprises the first database identifier and a trust ledger account record identifier, the trust ledger account record identifier configured to indicate an instruction for generating a report; and storing, by the computer system, the plurality of symbolic data records in the second database according to the second database identifier; and generating, using the computer system, one or more reports based on at least a first symbolic data record of the plurality of symbolic data records stored in the second database according to the second database identifier applied to the at least a first symbolic data record, wherein the computer system comprises a computer processor and electronic memory.

In some embodiments, the method further comprises recording the insurance premium transaction in the second database as a transacted premium, wherein recording further comprises applying a transaction premium second database identifier to the insurance premium transaction.

In some embodiments, the insurance premium transaction includes a down payment, and wherein the method further comprises: applying, by the computer system, a first database identifier to the down payment; and storing, by the computer system, the down payment and the first database identifier of the down payment in the first database.

In some embodiments, the method further comprises adjusting the transacted premium, wherein the adjusting comprises: accessing, by the computer system, the down payment from the first database; matching, by the computer system, the first database identifier of the down payment with the transaction premium second database identifier; and generating, by the computer system an updated transacted premium, the generating comprising reducing, by the computer system, the transacted premium by the down payment; and storing the down payment in the second database as a cash in trust record, wherein recording further comprises applying a cash in trust second database identifier to the down payment and storing the cash in trust record in the second database according to the cash in trust second database identifier.

In some embodiments, the method further comprises recording the down payment in the second database as a transacted premium receipt record, wherein recording further comprises applying a transacted premium receipt second database identifier to the down payment and storing the transacted premium receipt record in the second database according to the transacted premium receipt second database identifier; and generating, by the computer system, a premium float based on the transacted premium receipt record.

In some embodiments, the method further comprises generating, by the computer system, a premium commission record based on the down payment; and applying, by the computer system, a premium commission second database identifier to the premium commission record; and storing, by the computer system, the premium commission record in the second database according to the premium commission second database identifier.

In some embodiments, the method further comprises adjusting the cash in trust record, wherein the adjusting comprises: accessing, by the computer system, the premium commission record from the second database; matching, by the computer system, the premium commission second database identifier with the cash in trust second database identifier; and generating, by the computer system, an updated cash in trust record, the generating comprising reducing, by the computer system, an amount of cash in trust stored in the cash in trust record by an amount of premium commission stored in the premium commission record; and storing the premium commission record in the second database as a commission transfer, wherein storing further comprises applying a commission transfer second database identifier to the premium commission record and storing the commission transfer in the second database according to the commission transfer second database identifier.

In some embodiments, the method further comprises adjusting the premium float, wherein the adjusting comprises: accessing, by the computer system, the commission transfer from the second database; matching, by the computer system, the commission transfer second database identifier of the commission transfer with the premium float second database identifier; and generating, by the computer system, an updated premium float, the generating comprising reducing, by the computer system, an amount of the premium float by an amount of commission transfer; and storing the updated premium float in the second database as premium float, wherein storing further comprises applying the premium float second database identifier to the updated premium float and storing the updated premium float in the second database according to the premium float second database identifier.

In some embodiments, the method further comprises verifying, using the computer system, that no errors have occurred in the database management system, the verifying comprising: accessing the premium float from the second database according to the premium float second database identifier; accessing the cash in trust record from the second database according to the cash in trust second database identifier; comparing the premium float to an amount stored in the cash in trust record; and determining that the premium float is equal to the amount stored in the cash in trust record.

In some embodiments, each index of the plurality of indexes is configured to store insurance premium data and return premium data. In some embodiments, each index of the plurality of indexes is configured to store account data records that correspond to an account of a different type. In some embodiments, the generating comprises automatically generating the one or more reports when an account record is stored in the first database. In some embodiments, the generating comprises automatically generating the one or more reports when a trust ledger account data record is stored in the second database.

In some embodiments, the method further comprises verifying, using the computer system, that a first account record of a first report is equal to a second account record of a second report. In some embodiments, the first account record includes a fiduciary assets record and the second account record includes a trust fiduciary liabilities record. In some embodiments, the first report includes a trust balance sheet and the second report includes a trust balance sheet. In some embodiments, the first account record includes a trust cash bank account balance record and the second account record includes a premium float record. In some embodiments, the first report includes a trust balance sheet and the second report includes a premium float statement. In some embodiments, the second database is stored in a location remote to the location of the first database. In some embodiments, the symbolic data records are temporarily stored in the second database and wherein the symbolic data records are configured to be removed from the second database.

BRIEF DESCRIPTION OF THE DRAWINGS

The foregoing and other features, aspects and advantages are described in detail below with reference to the drawings of various embodiments, which are intended to illustrate and not to limit the disclosure. The drawings comprise the following figures in which:

FIGS. 2A-2B is an embodiment of an index of the database management system.

FIGS. 3A-3N is an embodiment of an index of the database management system.

FIGS. 7A-7H show example reports according to an embodiment of the database management system.

FIGS. 9A-9H are example user interfaces of an embodiment of the database management system.

FIGS. 10A-10G are example user interfaces of an embodiment of the database management system.

FIGS. 11A-11M are example user interfaces of an embodiment of the database management system.

FIGS. 12A-12J are example reports according to an embodiment of the database management system.

FIGS. 13A-13K are example reports according to an embodiment of the database management system.

DETAILED DESCRIPTION

Figure 1A:
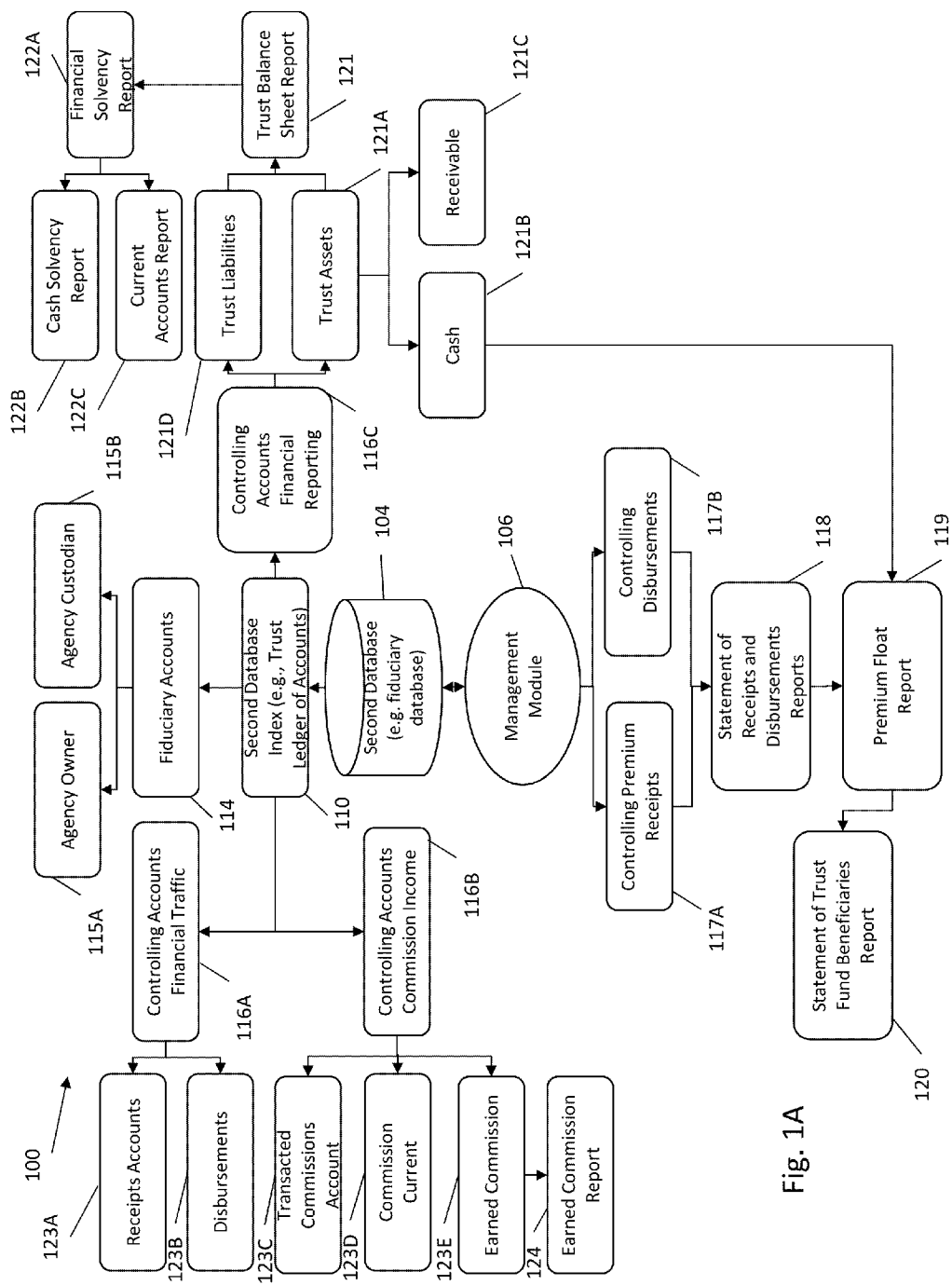
FIGS. 1A-1B illustrate an embodiment of the database management system.

Although several embodiments, examples, and illustrations are disclosed below, it will be understood by those of ordinary skill in the art that the invention described herein extends beyond the specifically disclosed embodiments, examples, and illustrations and includes other uses of the invention and obvious modifications and equivalents thereof. Embodiments of the invention are described with reference to the accompanying figures, wherein like numerals refer to like elements throughout. The terminology used in the description presented herein is not intended to be interpreted in any limited or restrictive manner simply because it is being used in conjunction with a detailed description of certain specific embodiments of the invention. In addition, embodiments of the invention can comprise several novel features and no single feature is solely responsible for its desirable attributes or is essential to practicing the inventions herein described.

The disclosure herein provides systems, methods, and devices that enable various forms of database management systems. The database management system described herein can include a plurality of databases. Each of the databases can be stored locally and/or remotely. The databases can advantageously store data according to certain account data entered into the database management system. To store the account data in a proper database and/or location, the system can assign a plurality of identifiers. To more accurately and quickly associate related account data stored in different databases, the system can assign a first identifier to a plurality of account data stored in a first database and a second identifier to a plurality of data stored in a second database. The second identifier can include the first identifier in addition to a third identifier. This can be desirable to seamlessly and more efficiently convert the data stored in the first database into the data stored in the second database.

Further, in some embodiments, the database management system can automatically reconcile account records (also referred to herein as "account data") stored in the first and/or the second databases. In some embodiments, the systems, methods, and devices described herein can improve company statement processing through automatic reconciliation. Thus, a self-auditing system can be desirably implemented. The self-auditing system can determine where various account records stored in a plurality of databases are equal and/or where there are discrepancies. In some embodiments, the self-auditing system can verify various account records automatically as the account records are entered into the system and/or at various stages of operation. In some embodiments, the self-auditing system can desirably verify account records automatically upon the generation of a report, which can be based on the account records. Thus, the self-auditing system can allow the user to determine whether there are any errors in the system and if there are errors, when and/or where the errors occurred. Determining whether there are errors can desirably speed up an automated report generation process, in which the reports are automatically generated upon entry of a data record, storage of a data record, and/or calculation of a data record.

In some embodiments, the first database and/or the second database of the data management system can include a single index and/or a plurality of indexes. In some embodiments, the first database preferably includes a plurality of indexes relating to a plurality of policies and/or accounts. However, in some embodiments, it is desirable to have a single index in the first database. The database management system can include a single index in which all data records associated with a policy account are stored. For example, data, such as both insurance premium and/or return premium data can be desirably stored in a single index. In typical systems, insurance premium data and return premium data are generally not stored in a single index and are generally stored in separate locations in a database and/or in a different database. Thus, the database management system can cause the monitoring of account data and generation of reports to be more efficient and data can be processed more quickly.

Generally, in the fiduciary accounting context, a business invoice is not relevant. As a result it can be desirable to monitor and/or track data related to an insurance policy. Generally, the sale of insurance products is consummated upon the binding of insurance policies. Thus, the premium invoice would only serve as a reminder for an insured to pay a premium the insured already agreed to when the policy was signed. The disclosure herein provides systems, methods, and devices that provide a fully automated database management system. It can be desirable to use the database management system in the context of fiduciary accounting and/or insurance premium accounting. For example, the database management system can cause the database system to be more efficient and accurate.

In some examples described herein, the database management system automates premium billing and follow up processes. Thus, in some embodiments, the system receives entered data, and based on the entered data, the system automatically provides premium invoice reminders at various stages of the accounting process. In some embodiments, the system automatically determines and reports an agency earned commission for full control over the commission funds transfer to the operating account. This can be desirable to avoid financial insolvency, as the system can help to avoid mismanagement of agency commission income.

In some embodiments, the database management system can desirably reconcile cancellation endorsements and automatically process and/or calculate premium refunds to insured and/or finance companies. Similarly, in some embodiments, the database management system desirably reconciles direct bill commission statements, which may not be possible without use of the database management system.

In some embodiments, the database management system can desirably automatically generate reports for each policy, for each insurance company and/or an entire agency trust. The reports can quickly display an accurate depiction of the financial status of a company. For example, the user would be able to quickly determine whether the company premium is financially solvent, whether all entries have been properly entered, whether there are any errors in a company's finances, and/or whether the company premium is compliant with local laws or regulations.

Generally, the database management system can control receivables and generate company statements automatically. Thus, the database management system can desirably eliminate delinquent premium remittance, which can in turn reduce a company's operating time and operating costs.

General

As discussed above, the database management system can include a plurality of databases. For example, the plurality of databases can include at least a first database and a second database.

In some embodiments, the first database is defined as an insurance premium database system (also referred to herein as "IP-DBMS"). In some embodiments, the second database is defined as an insurance fiduciary database system (also referred to herein as "IF-DBMS"). In some embodiments, the first database is converted into and/or otherwise merged with the second database through various methods described in more detail below.

In some embodiments, the database management system operates automatically and updates in real-time when the system 100 receives, retrieves, and/or calculates additional data and/or information. For example, the database management system can automate insurance trust accounting to quickly and accurately calculate and maintain data relating to insurance premium transactions and according to certain laws and regulations.

In some embodiments, the database management system 100 is configured to account for at least one or more of parties participating in closing a policy transaction, multiple premium payment terms, or changes of coverage and premium amount during the policy term. For example, the closing of the insurance policy transaction can include a plurality of parties, including a customer (e.g., an insured or buyer of insurance products), a producing agency (e.g., selling insurance products), an insurance company (e.g., underwriter of the insurance policy), general managing agency ("MGA") (e.g., wholesaler of insurance products), and/or premium finance company (e.g., finances policy unpaid balance), among others. According to several embodiments described herein, a user can refer to an independent insurance agency, for example, and/or any other user of the database management system that can provide a plurality of data to the database management system 100.

Accordingly, managing a premium transaction can be complex. For example, an insurance company can offer customers multiple payment terms, such as full payment at policy inception data, down payment with balance scheduled in installments, down payment with policy unpaid balance financed, down payment with balance paid in installments audited by the insurance company, and/or down payment with unpaid balance paid in installments and final audit, among others. Thus, tracking, monitoring, and/or calculating premium payments can be difficult. As a result, insurance premiums and policies are calculated, monitored, tracked, and/or reported via computer systems. Therefore, many typical database systems used in insurance and accounting systems, for example, in property and casualty insurance and accounting systems, are flawed and do not accurately track, monitor and/or calculate insurance premiums and policies. Rather, examples of the database management system 100 described herein can help to ensure accurate tracking and calculating of insurance premiums and/or premium refunds. For example, policy endorsements, such as additional premium or premium reduction, may be difficult to monitor and/or calculate. In particular, a premium reduction, such as a cancellation endorsement, may result in a return premium due to either an insured and/or a premium finance company. The database management system 100 can advantageously calculate the cancellation endorsements according to methods described herein.

FIG. 1A illustrates an embodiment of the database management system 100. The database management system can control, monitor, and/or report all stages of insurance trust account financial solvency. The system can advantageously enable users (e.g. insurance retailers and wholesalers) to comply with insurance code fiduciary mandates. As described above, the database management system 100 can include a second database 110 (e.g., a fiduciary database). In some embodiments, for example in the fiduciary accounting context, a trust custodian is identified to be in charge of trust and/or fiduciary accounts 114. The trust custodian can include an agency owner 115A and/or an agency custodian 115B.

In some embodiments, the agency owner 115A is authorized by insurance carriers to receive and maintain a plurality of transacted premiums and agency on trust bank accounts, for example. The agency custodian 115B may be required by law to monitor, control, and/or report a trust fund's financial solvency. In some embodiments, the database management system 100 includes a plurality of controlling account modules. For example, the plurality of controlling account modules can include controlling account financial traffic module 116A, the controlling account commission income module 116B and/or the controlling account financial reporting module 116C, among others.

As will be described in more detail below, a management module 106 of the second database 110 can generate a plurality of reports. In some embodiments, the management module 106 can generate the plurality of reports through a controlling premium receipts module 117A and/or a controlling disbursements module 117B. The controlling premium receipts module 117A and/or the controlling disbursements module 117B can be configured to enable control over a trust premium float and/or a trust bank account cash balance. In some examples, the plurality of reports can include a statement of receipts and disbursements reports 118, a premium float report 119, and/or a statement of trust beneficiaries report 120, among others. The statement of premium receipts and disbursements report 118 can be configured to enable the agency owner to analyze an agency business structure. In some embodiments, the statement of premium receipts and disbursements report 118 can be configured to enable the agency custodian 115B to determine the trust premium float. In some embodiments, the management module 106 can calculate the trust premium float as a difference between receipts and disbursements of premium and return premium funds. In some embodiments, the statement of trust funds beneficiaries report 120 displays the trust cash balance ownership by an insurance company and/or according to each insurance policy, for example.

In some embodiments the trust balance sheet 121 can be generated by the database management system 100. The trust balance sheet 121 can display trust assets 121A including trust cash 121B and trust receivables 121C, and/or trust liabilities 121D. As will be described in more detail below, trust assets 121A and/or trust liabilities 121D can be grouped according to due and payable and/or due and not payable, in order to easily report cash solvency and/or account current solvency.

In some embodiments, account current solvency includes receivables and/or related payables. In some embodiments, the management module 106 of the database management system 100 generates a plurality of financial solvency reports 122A, based at least in part on the trust balance sheet 121 and/or the underlying data displayed in the trust balance sheet. For example, the financial solvency reports 122A can include a cash solvency report 122B and/or a current accounts report 122C.

In some embodiments, the controlling accounts financial traffic module can be implemented to generate a statement of receipts and disbursements 118. The statement of receipts and disbursements 118 can be generated based, at least in part on, premium receipts accounts 123A and/or disbursements accounts 123B. In some embodiments, the management module 106 can be configured to implement the controlling accounts commission income module 116B to generate an earned commission financial solvency report 124. The earned commission report 124 can be based, at least in part on transacted commission account records 123C, commissions current account records 123D, and/or earned commission account records 123E. In some embodiments, the transacted commission account records 123C are created when insurance policies are bound. In some embodiments, the account current commission records 123D are created when premiums are invoiced and/or paid. In some embodiments, earned commission records 123E are created when premium payments are deposited in a trust bank account.

In some embodiments, the earned commission report 124 indicates an amount of commission the agency can transfer from a trust bank account to an agency business operating account. In some embodiments of a self-auditing system of the database management system described below, the premium float 119 can be implemented to verify the trust cash balance 121B.

Figure 1B:
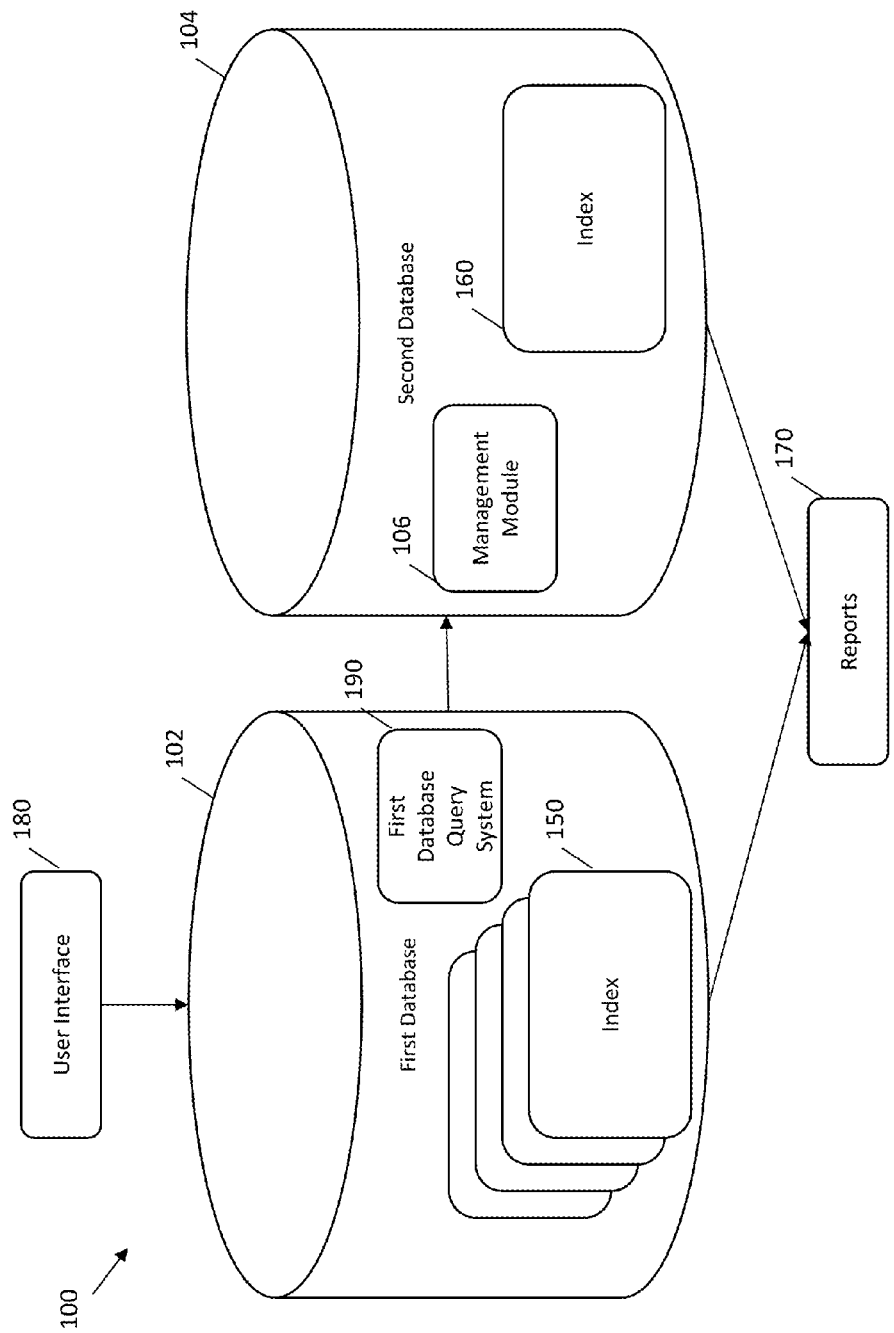

FIG. 1B illustrates an embodiment of the database management system 100. The database management system can include a plurality of databases, including the first database 102 and the second database 104. The first database can include a plurality of database tables 150 and/or indexes for storing account data records and a plurality of associated first database identifiers. In some embodiments, the first database 102 includes a first database query system 190. The second database 104 can include a second database index 160 configured to store a plurality of symbolic data. In some embodiments, the second database 104 includes a management module 106 for calculating symbolic data to be stored in the second database index 160 and/or for generating a plurality of reports 170, among other things. In some embodiments, the management module 106 and/or the first database query system 190 are stored in separate databases and/or servers. In some embodiments, the management module 106 and/or the first database query system 190 are stored in the same databases and/or servers. In some embodiments, the first database is stored locally while the second database is stored in a remote server. In some embodiments, the first database and the second database are stored on local servers. In some embodiments, the first database and the second database are stored on remote servers. In some embodiments, the management module 106 and/or the first database query system 190 are the same module and/or system and can perform similar functions. In some embodiments, the second database is temporarily stored in RAM. For example, in such configurations, all or a portion of the second database may be removed or deleted. In some instances, all or a portion of the second database may be removed or deleted once a report is generated by the database management system and/or a calculation is performed. In some embodiments, the data is stored long enough to allow the self-verification system to verify the data, as discussed below.

Example First Database Structure

In some embodiments, the first database includes a relational database management system (e.g. the first database query system). The relational database management system can store, retrieve and/or access, calculate, and/or query certain data and information. For example, the data can include insurance premium and/or return premium data.

In some embodiments, the data includes a plurality of physical data, a plurality of symbolic data, and/or any combination of the physical data and symbolic data. In some embodiments, the physical data includes entered data and/or electronic data. In some embodiments, the entered data includes data that is retrieved and/or accessed from another location. For example, the physical data can include data that is entered by the user, entered by the database management system 100, and/or retrieved from another database, among other locations. The physical data can be stored in the first database using an index or table, for example, including any number of arrangements, described in more detail below (See FIGS. 2A-2B). The physical data can be entered into the management database system through a user interface 180, for example.

In some embodiments, the plurality of symbolic data can be derived and/or calculated by the data management system 100. For example, the symbolic data can be calculated at least in part based on the physical data. The symbolic data can be stored in the first database. In some embodiments, the symbolic data can be stored in the second database. In some embodiments, the symbolic data can be stored in the first database using at least one index or table, for example, including any number of arrangements, described in more detail below (See, e.g., FIG. 2A-2B). In some embodiments, the symbolic data can be stored in the second database using an index or table, for example, including any number of arrangements, described in more detail below (See, e.g., FIG. 2A-2B).

As discussed above, the first database 102 can include a plurality of database tables 150 that can be configured to store and/or display data, including policy premium data and/or the return premium data. For example, the first database can include a plurality of indexes showing field names, including at least ABOUT_INFORMATION, ARCHIVE_POLICIES, BANK_ACCOUNT_STATEMENTS, BANK_ACCOUNT_TRANS, BANKS, BILLING, BILLING_CALC, BILLING_UPDATES, BROKER_CD_TBL, BUS_CODE_TBL, COMM_REFUNDS, COMM_REIMBURSEMENTS, COMMISSION_RESERVE, COMMISSION_TXFR, COMMISSIONS, COMPANIES, CORPORATE_REPORTS, COVERAGE, CUSTOMERS, DAILY_PMTS, DB_COMM_STATEMENTS, DEAD_BILLING, DEAD_BILLING_UPDATES, DEAD_CUSTOMERS, DEAD_DUE_DATES, DEAD_ENDORSEMENTS, DEAD_POLICIES, DEPOSITORS, DEPOSITS, DEPOSITS_TEMP, DISPUTE_REASON_CODES, DUE_DATES, EFT_REMITTANCES, ENDORSEMENTS, FINANCE_COMPANIES, FUND_OWNERS, FUNDS_ACCOUNT_TRANS, INTEREST_EARNINGS, IPA_WORK_TIME, LATE_PMTS, LETTERS, PERSONAL_FUNDS, PMT_RPT, POLICIES, PREM_REFUNDS, PREMIUM_CREDIT_MEMOS, PREMIUM_OFFSET_MEMOS, PREMIUM_RECEIPTS, PRINT_FILE, PRINT_FILE_HISTORY, PRODUCERS, PRODUCTION_REPORTS, QTABLE, REASONS, RELATED_ITEM_CODES, REPRINT_BILLING, RP, STATEMENTS, TL_ACCOUNTS, and/or WIRE_TRANSFERS, among other indexes, to store and/or display data. Each of the data tables 150 can be implemented to store and/or display particular corresponding data. The tables 150 can be configured according to the indexes shown in FIGS. 2A-2B and/or FIGS. 3A-3N, for example. In some embodiments, the indexes and/or tables are all stored and/or displayed in a single index and/or table of the first database 102.

The data stored in the plurality of indexes 150 can relate to for example, an archive of policies, bank account statements, bank account information, bank account transfer information, bank information, billing data, billing calculations, billing updates, policy information, billing updates, billing due dates, endorsements, financial information, fund account data, earnings data, interest data, refund data, premium credit, late payments, premium offset memos, premium receipts, and/or other data. The system can advantageously store the data in corresponding indexes using, for example one or more specific identifiers associated with each index and/or particular data.

In typical database systems, in the P&C insurance accounting industry, for example, database systems implement separate databases or indexes to store, display, and/or calculate certain data related to premium data and return premium data. In some embodiments of the database management system 100 described herein, the first database can advantageously include both premium and return premium data. Thus, the database management system 100 can be more efficient than typical systems since in some embodiments, the database management system as described herein would not need to locate return premium data that corresponds to the premium data in a separate index or database. Rather, in this example, the management database system 100 would be able to retrieve both the premium data and corresponding return premium data within the same index and/or database. For example, the first database can include both audit premium data and return premium data. This can speed up data retrieval, calculation of symbolic data from physical data, and/or conversion to the symbolic data in the second database 104. Additionally, this can help to reduce errors in the database management system 100 and/or more accurately track and/or calculate the data within the database management system 100. Accordingly, the system 100 can create more accurate reports 170 for the user.

In some embodiments, policy premium data is entered according to any one of the plurality of indexes described above, such the CUSTOMERS Table, BILLING Table, ENDORESEMENTS Table, and/or the COMPANIES Table. In some embodiments, an insured data (e.g., customer data), is entered, stored, and/or displayed in the CUSTOMERS Table (See FIGS. 2A-2B). The insured data can include a type of policy, a business name, a first and/or last name, a billing address, a billing email, a contact name, an email address, and/or a phone number, among other types of data.

Figure 3A:
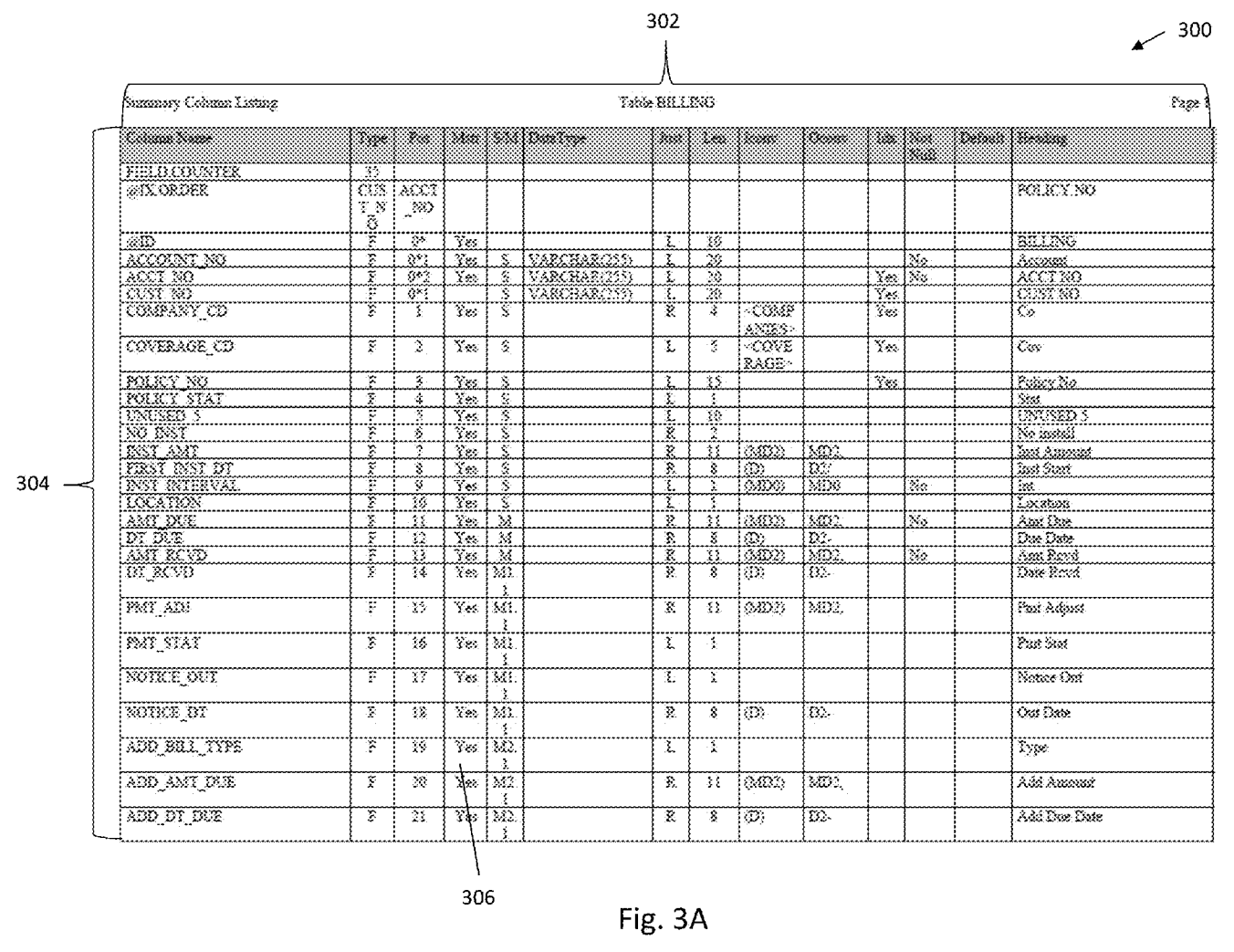
Figure 3B:
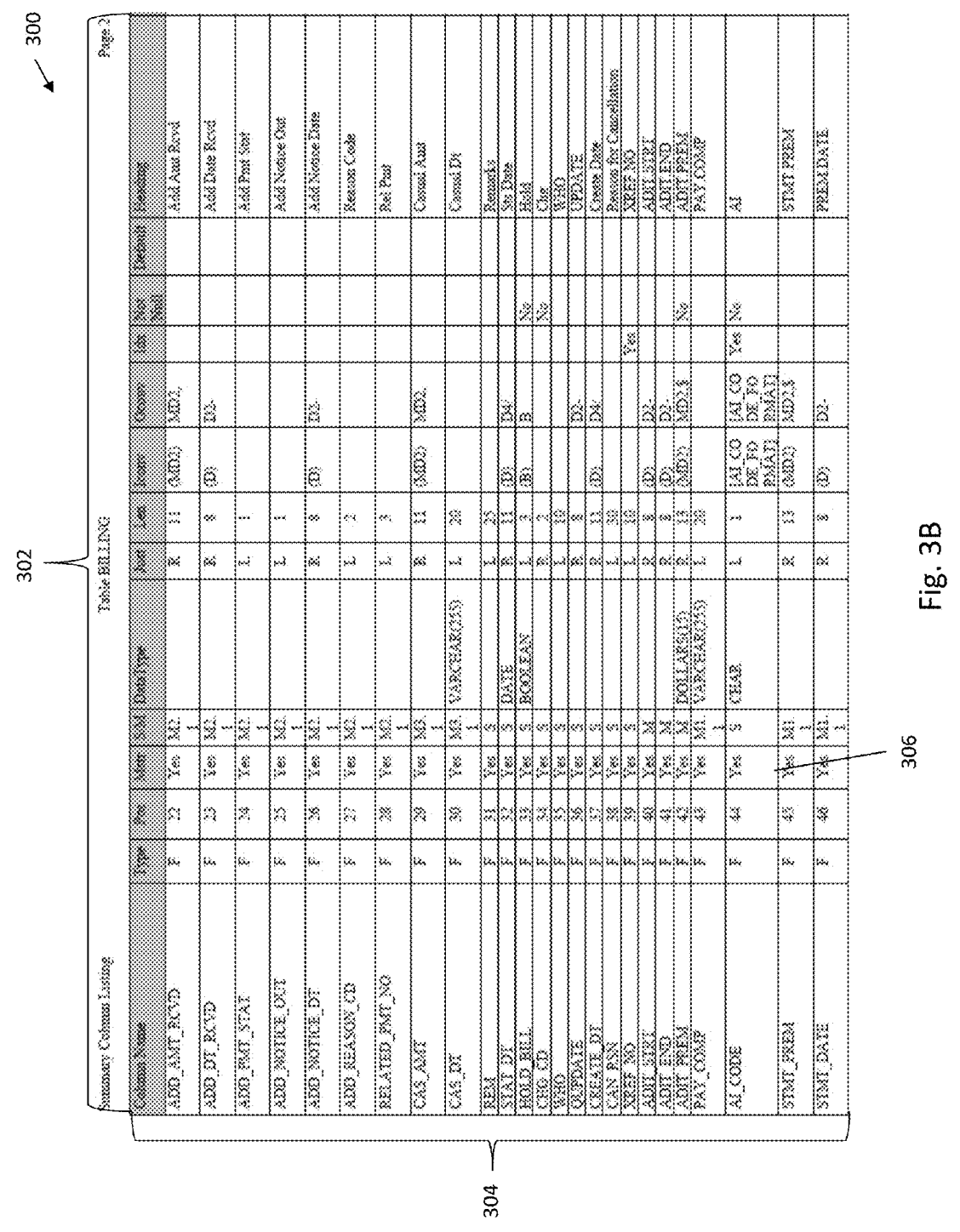
Figure 3C:
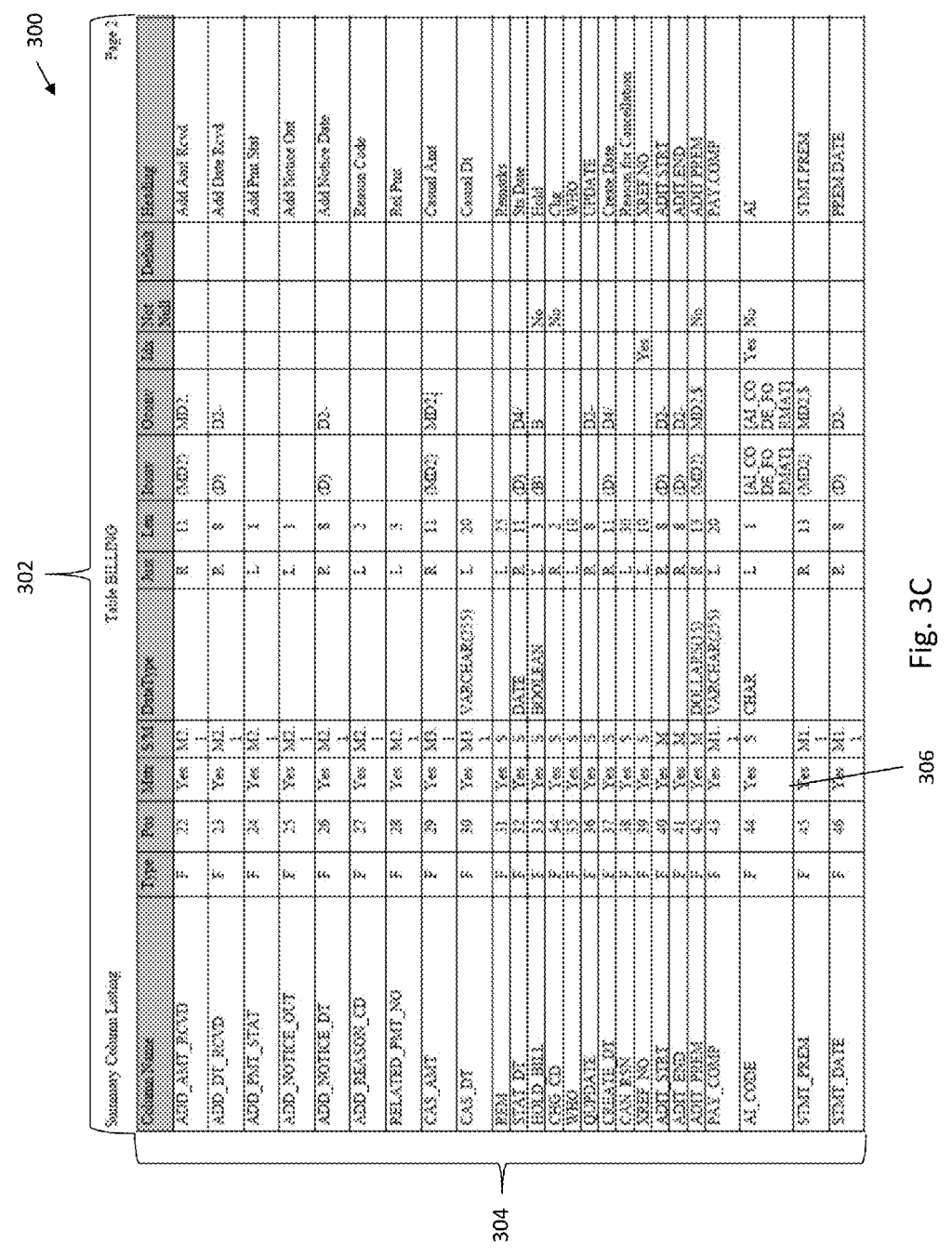
Figure 3D:
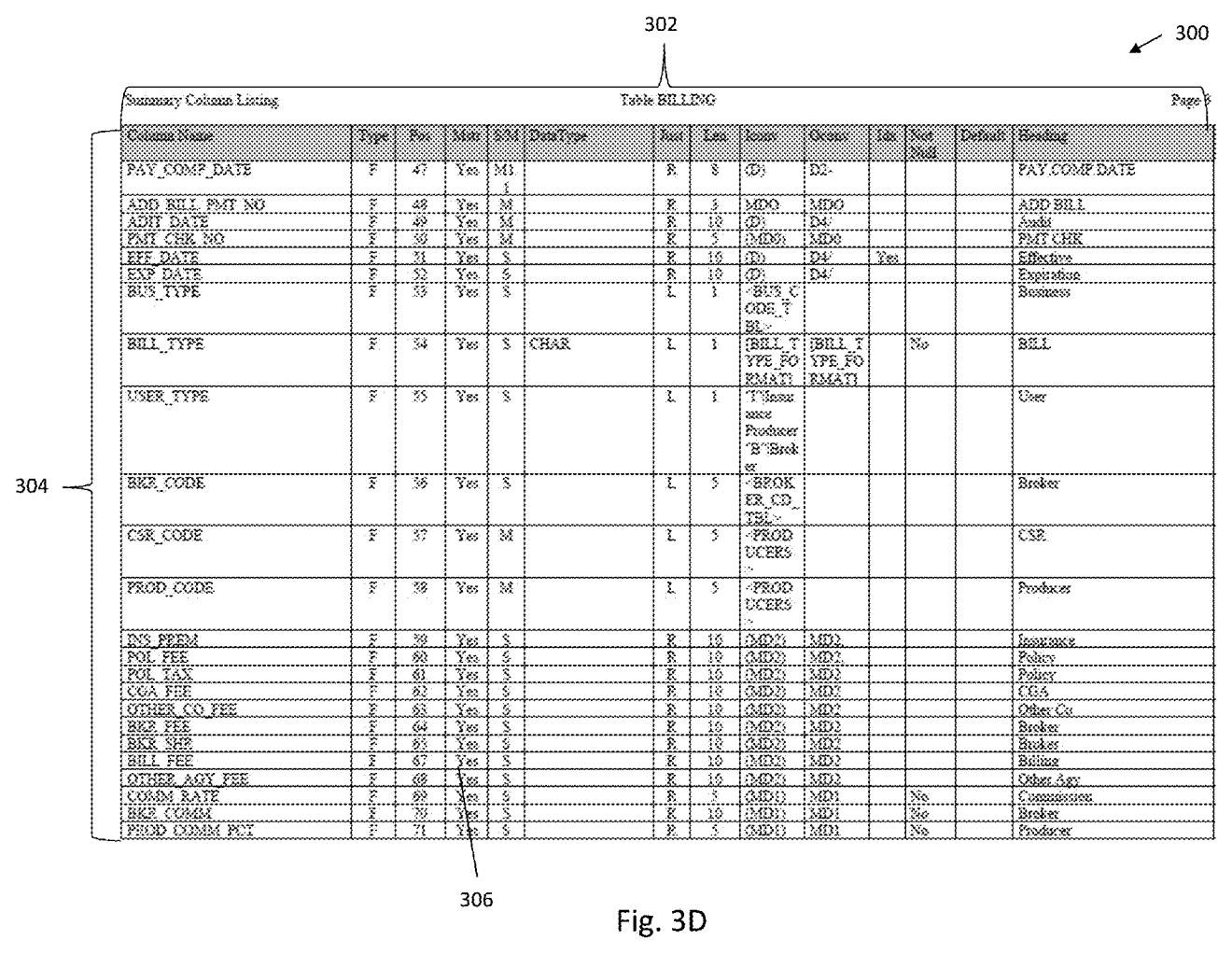
Figure 3E:
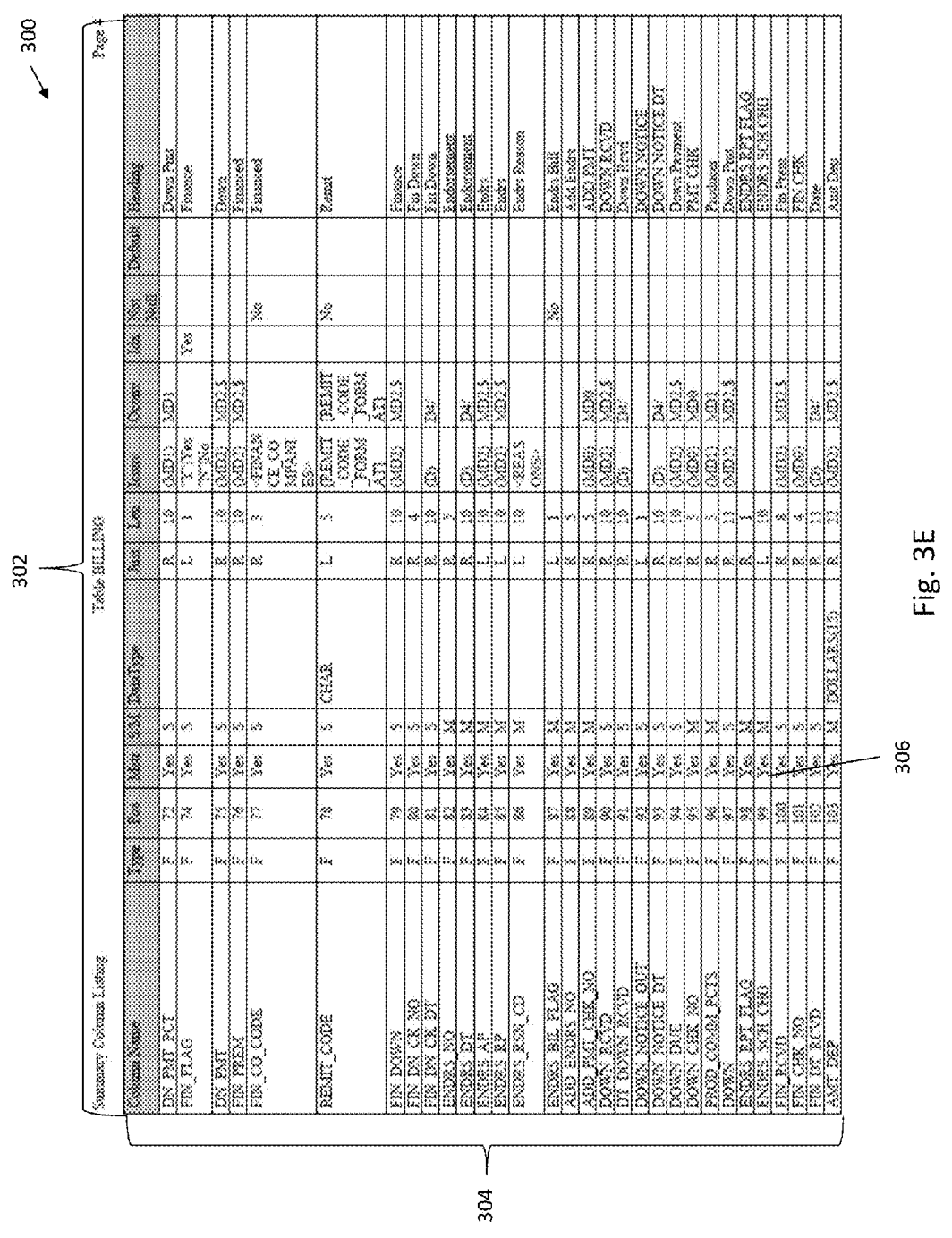
Figure 3F:
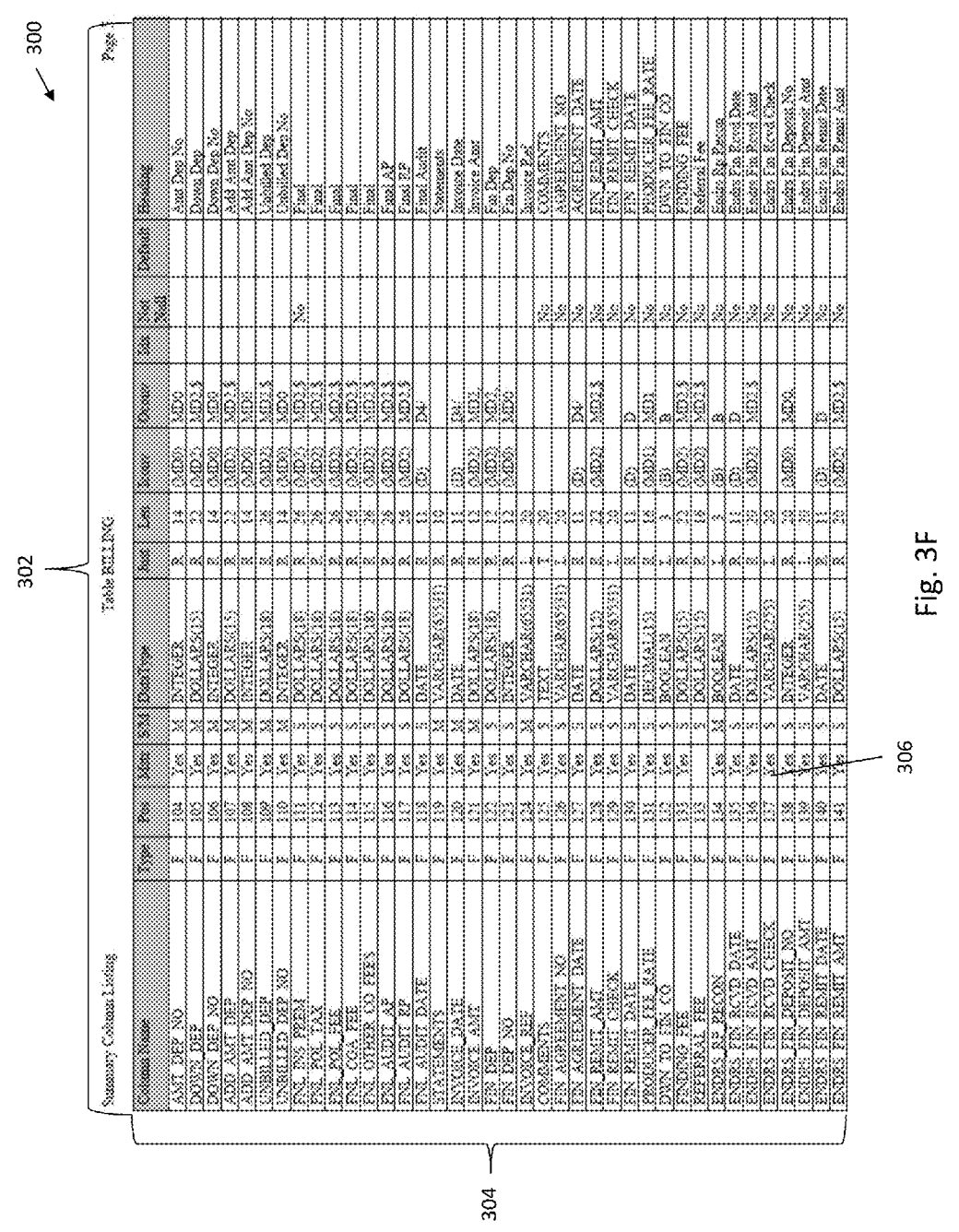
Figure 3G:
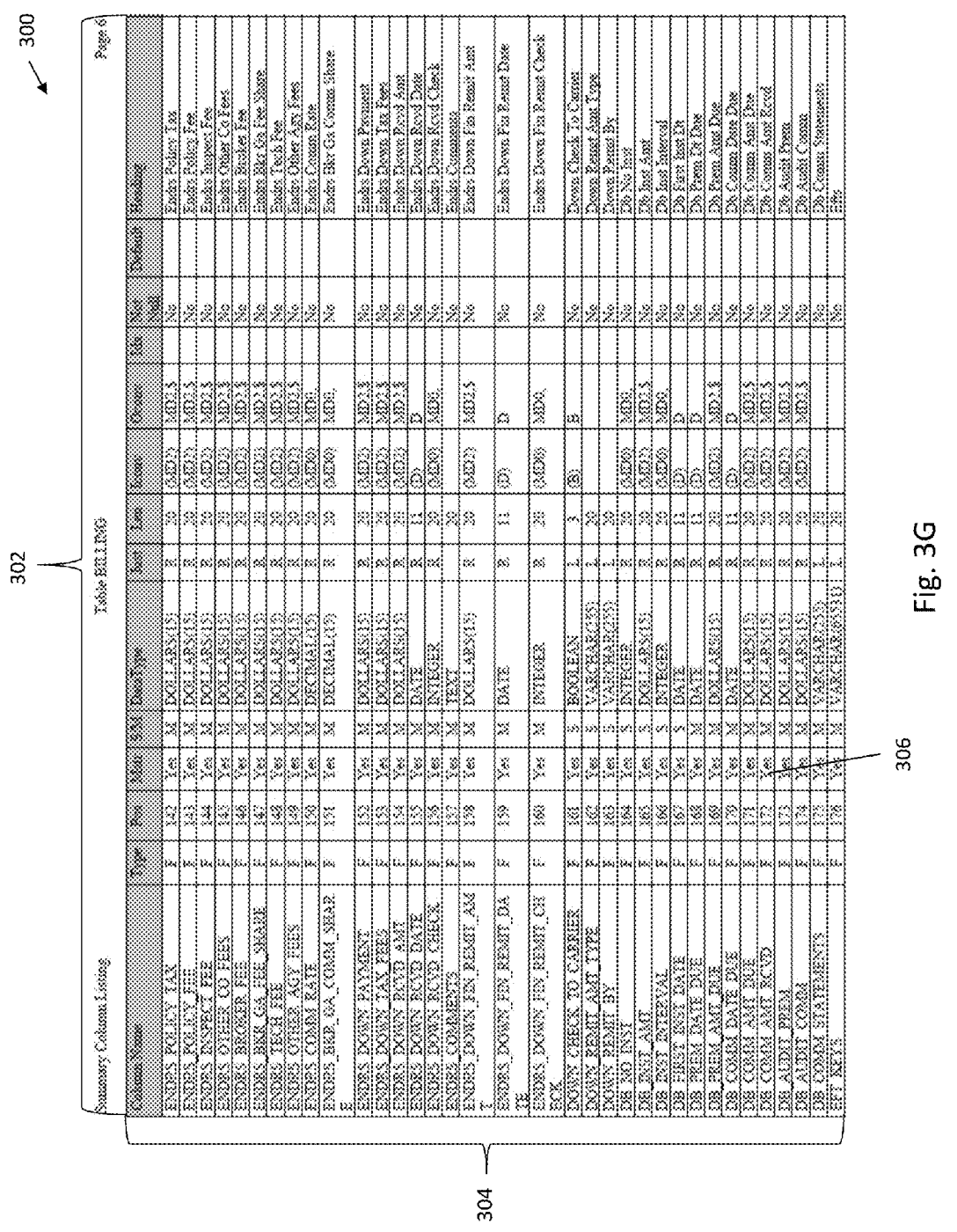
Figure 3H:
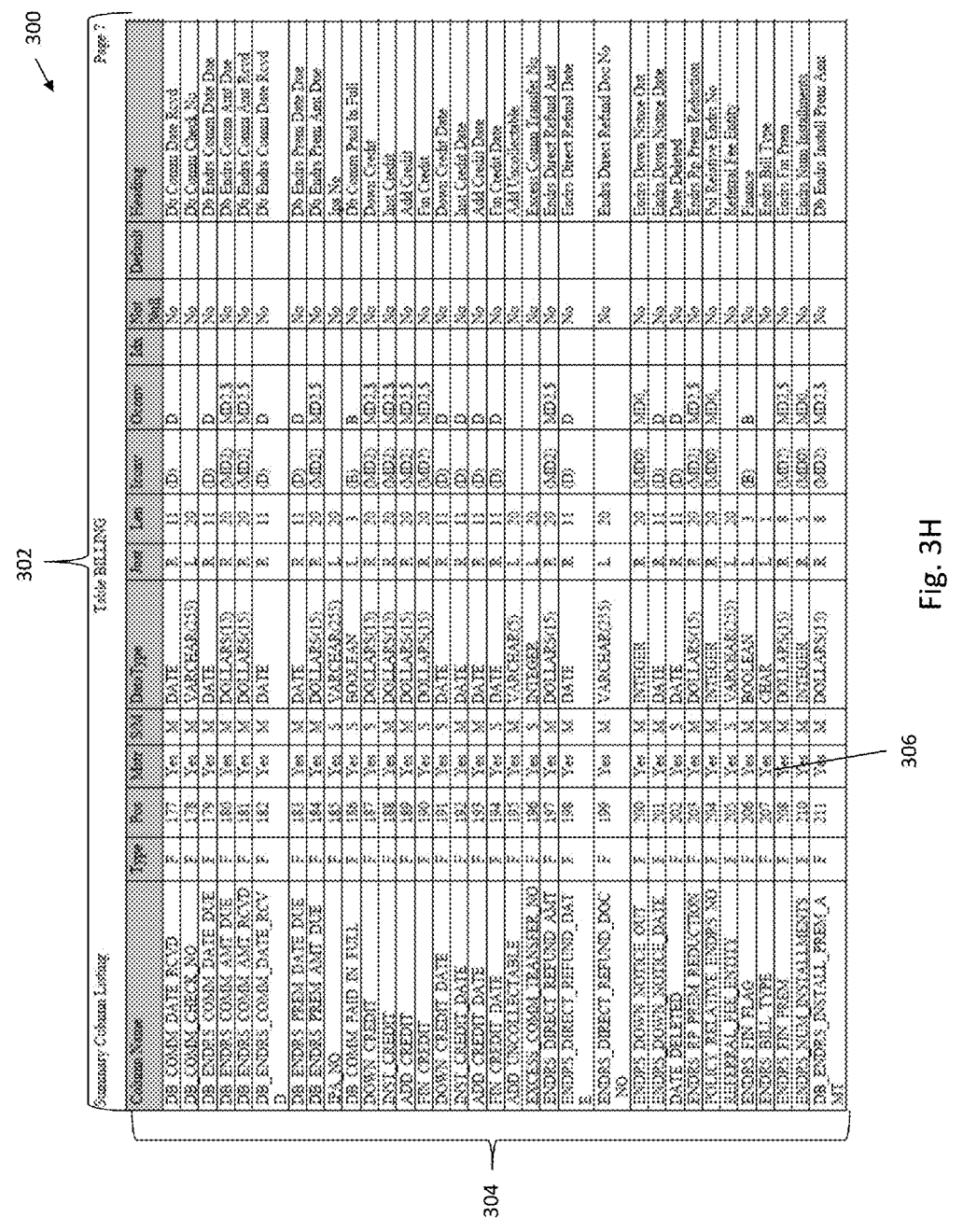
Figure 3J:
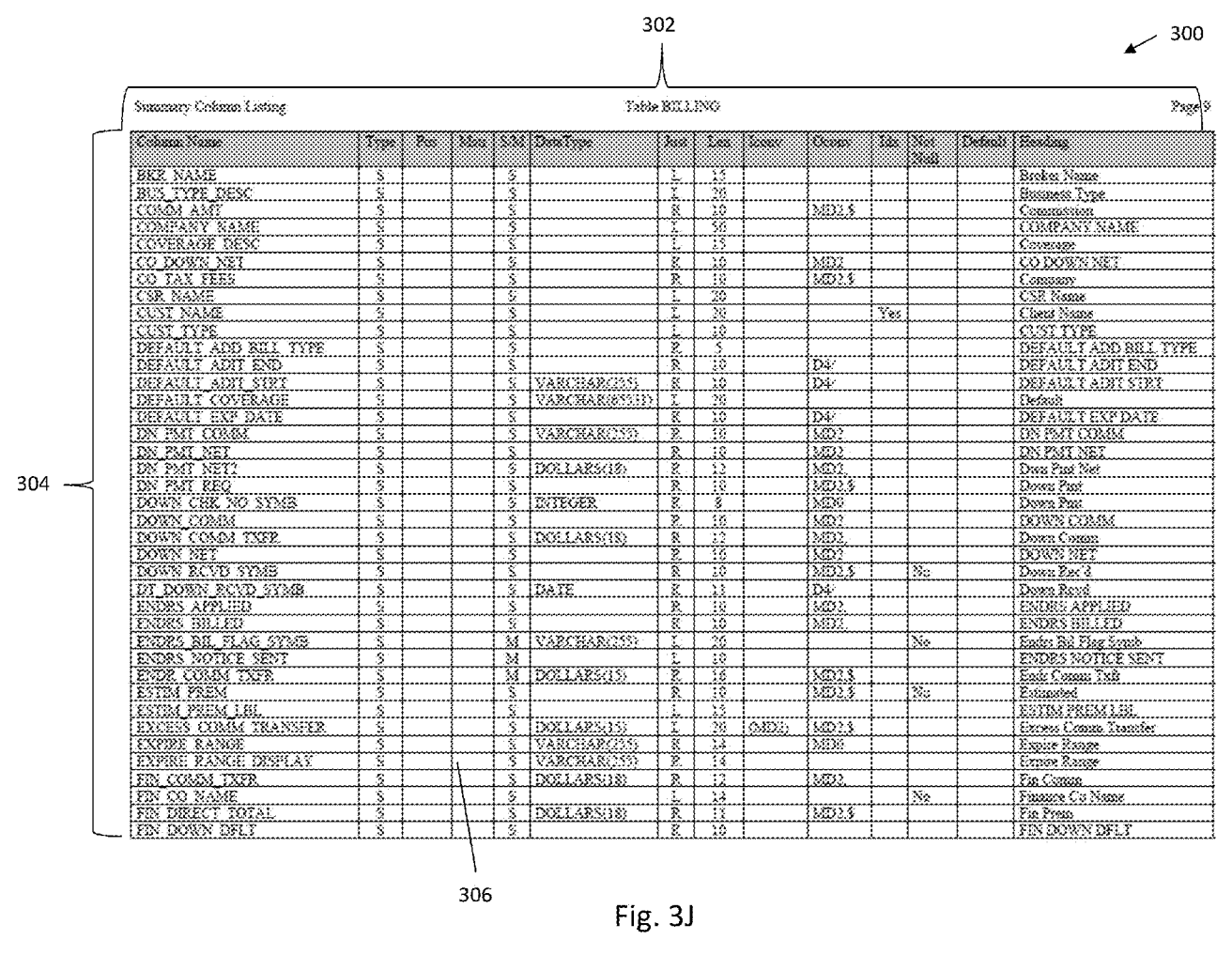
Figure 3K:
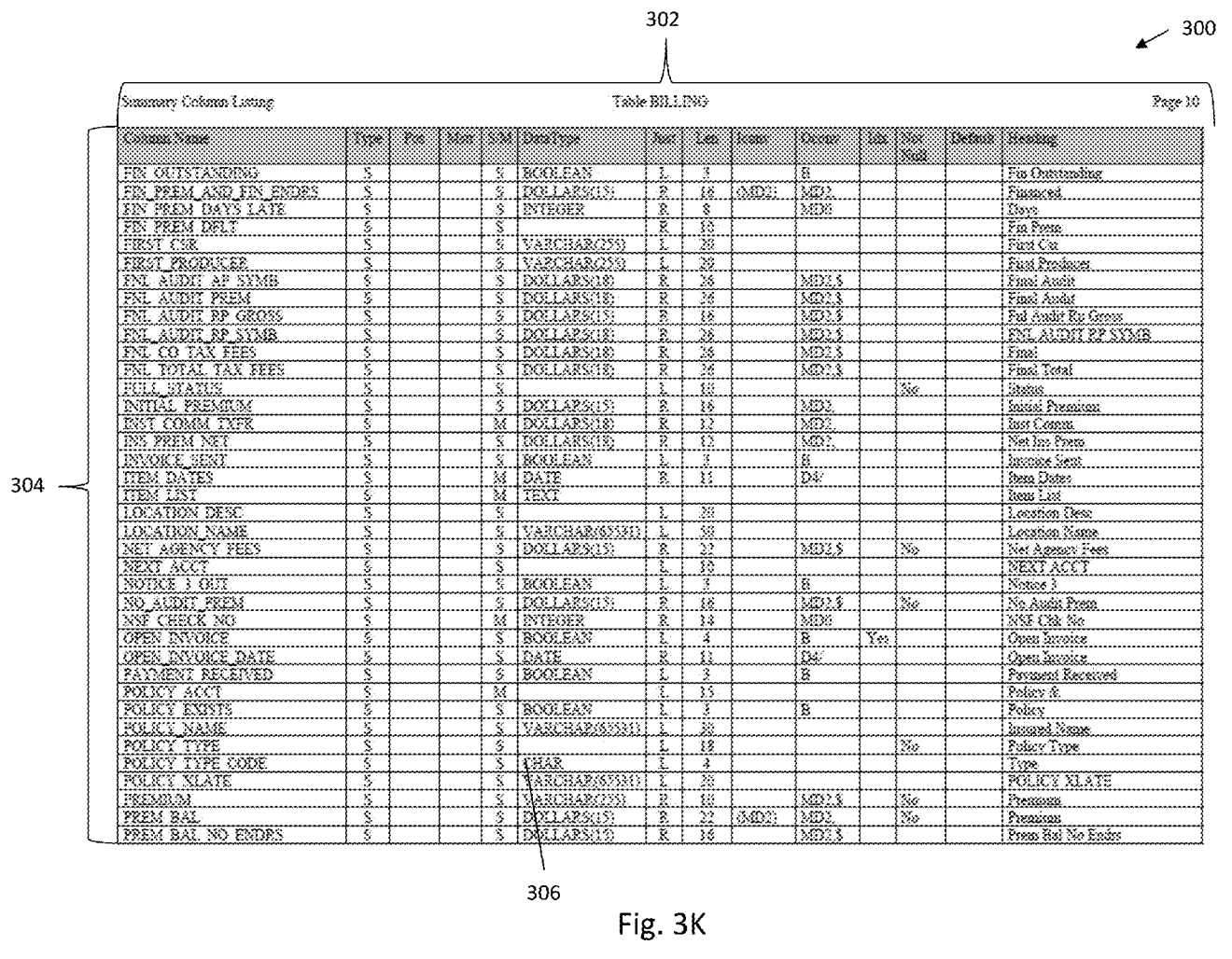
Figure 3L:
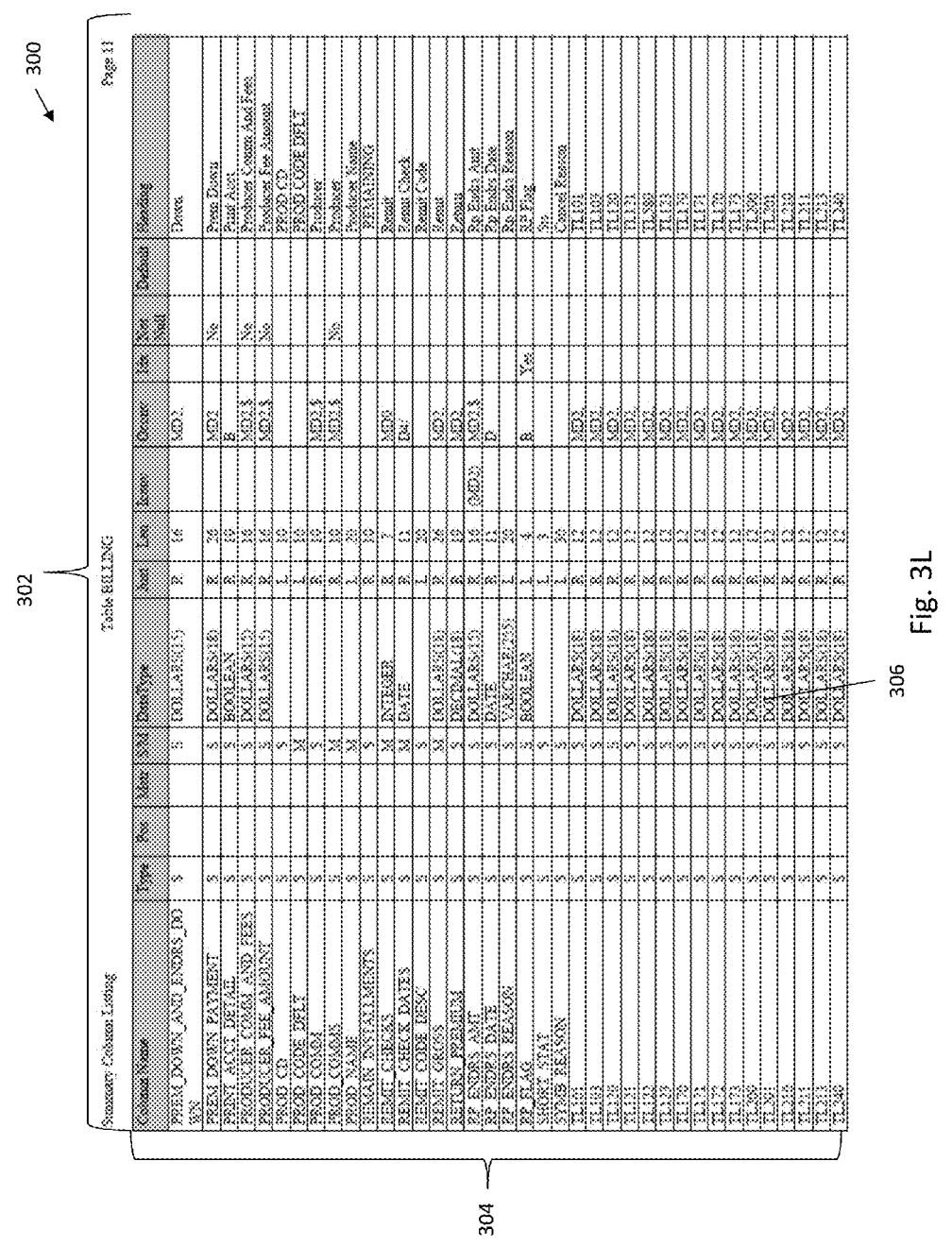
Figures 3M, 3N:
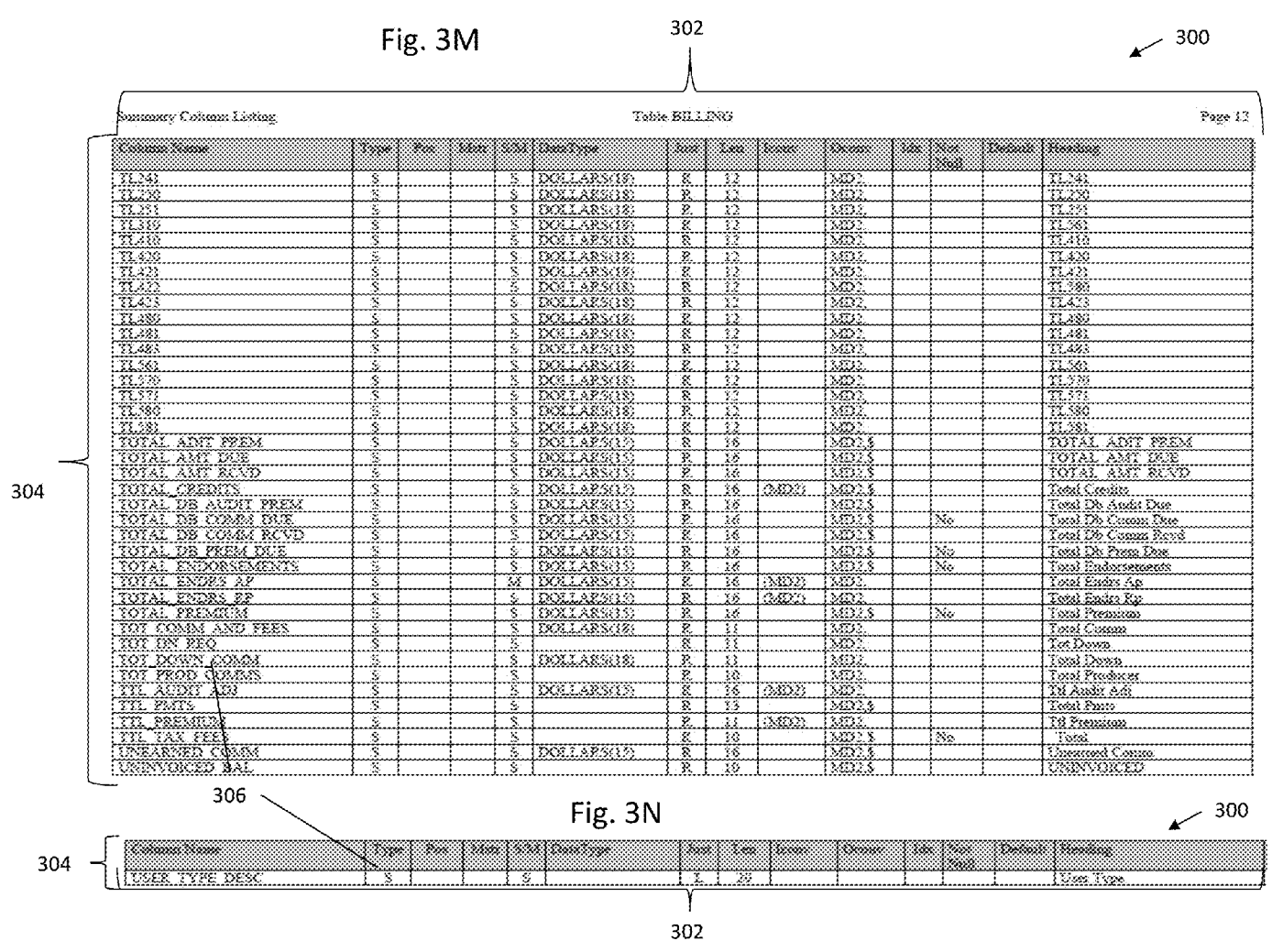

In some embodiments, a plurality of premium transaction data can be entered, stored, and/or displayed according to the BILLING Table (See FIGS. 3A-3N). The premium transaction data can include a policy number, insurance company, a policy effective date, a policy expiration date, and agency bill, a direct bill, coverage, transaction type such as new or renewal, a general agency name, a policy producer name, a policy CSR, a referral fee, a premium amount, a company tax and/or fees such as policy fee, policy tax, inspection fee, among others, producing agency fees such as broker fee, technology fee, among others, policy commission rate, required down payment amount, unpaid balance installment plan such as installment amount, number of installments, first installment due date, unpaid balance premium financing such as finance company, remitted to the company, remitted to agency, finance agreement date, finance agreement number, among others, producer commission rate, producer theory, installment audits, final audits and/or the like.

In some embodiments, symbolic data, such as a premium symbolic data can be entered, stored and/or displayed in or according to the BILLING Table (See FIGS. 3A-3N) and/or indexes of the BILLING Table. The premium symbolic data can include total company fees, total policy fees, total premium, tax and fees, total premium, total agency commission and fees, total producer commission and fees, unpaid premium balance, and/or the like.

In some embodiments endorsement premium physical data can be entered, stored, and/or displayed in or according to the ENDORSEMENTS Table and/or indexes of the ENDORSEMENTS Table. Endorsement premium physical data can include a customer ID, a policy number, policy coverage, an endorsement date, an endorsement type such as additional premium or premium reduction, an endorsement premium, company taxes and fees such as a policy fee, a policy tax, and an inspection fee, producing agency fees such as a broker fee, and a technology fee, an endorsement down payment such as whether there is financing, a financed amount to a company or agency, down payment amount, an endorsement commission rate, a premium financing such as a financed amount, a finance agreement number, a finance agreement date, a finance amount remittance, a remittance check date, a remittance check, a producer commission rate, a producer fee rate, and/or the like.

In some embodiments endorsement symbolic data can be entered, stored, calculated and/or displayed in or according to the ENDORSEMENTS Table and/or indexes of the BILLING Table. Endorsement symbolic data can include an endorsement tax and fees, endorsement net premium, and endorsement commission fees, total down payment tax and fees, a producer commission and fees, and/or the like.

In some embodiments, company statement data can be entered, stored, and/or displayed in or according to the COMPANIES Table and/or indexes of the COMPANIES Table. Company statement data can include a company name, a statement number, a statement date, a statement gross premium, a statement net premium, a plurality of statement items including an insurance policy number, a statement item down payment, a statement item installment, a statement item gross premium, and/or a statement item net premium, and/or the like.

Figure 2A:
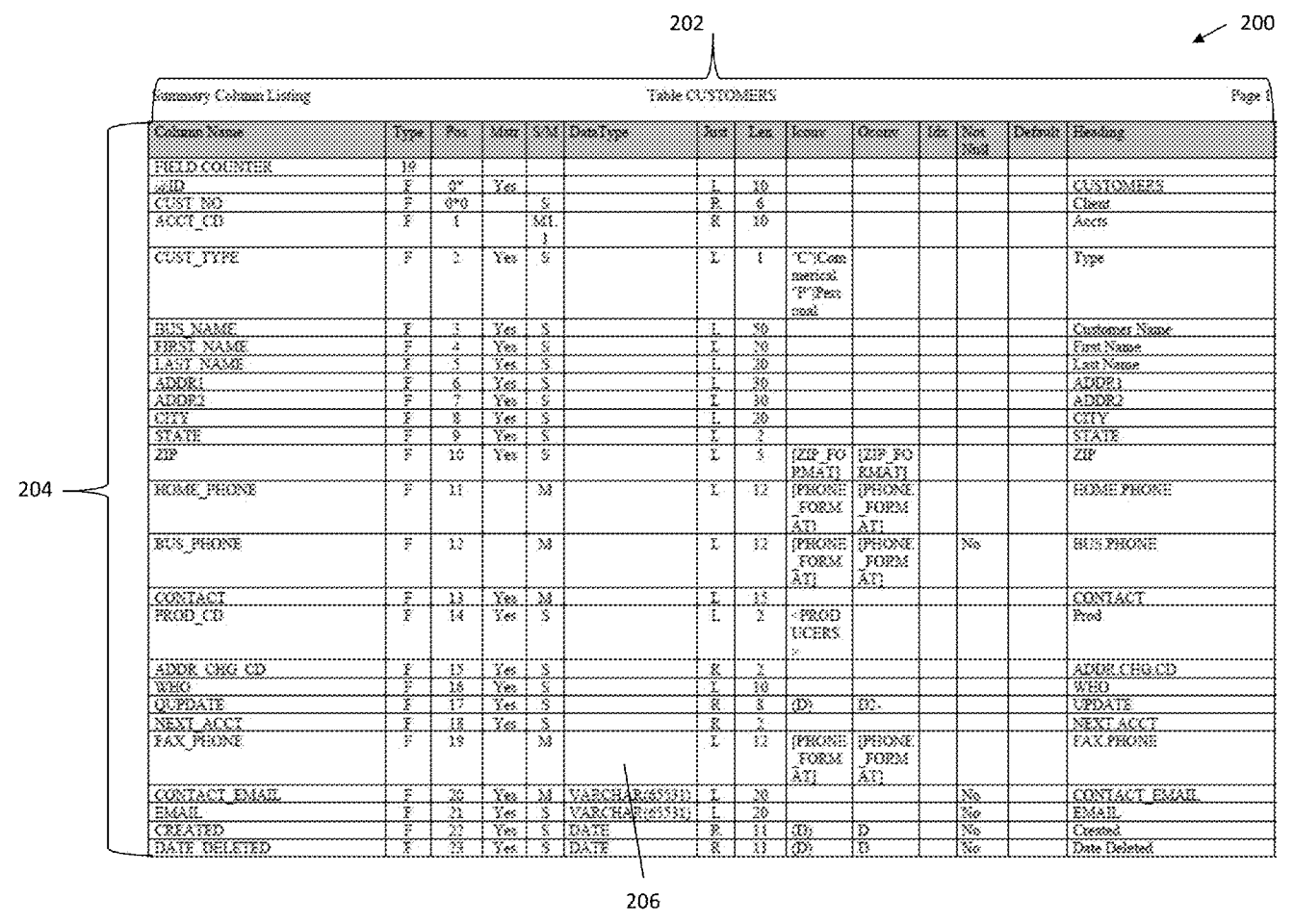
Figure 2B:
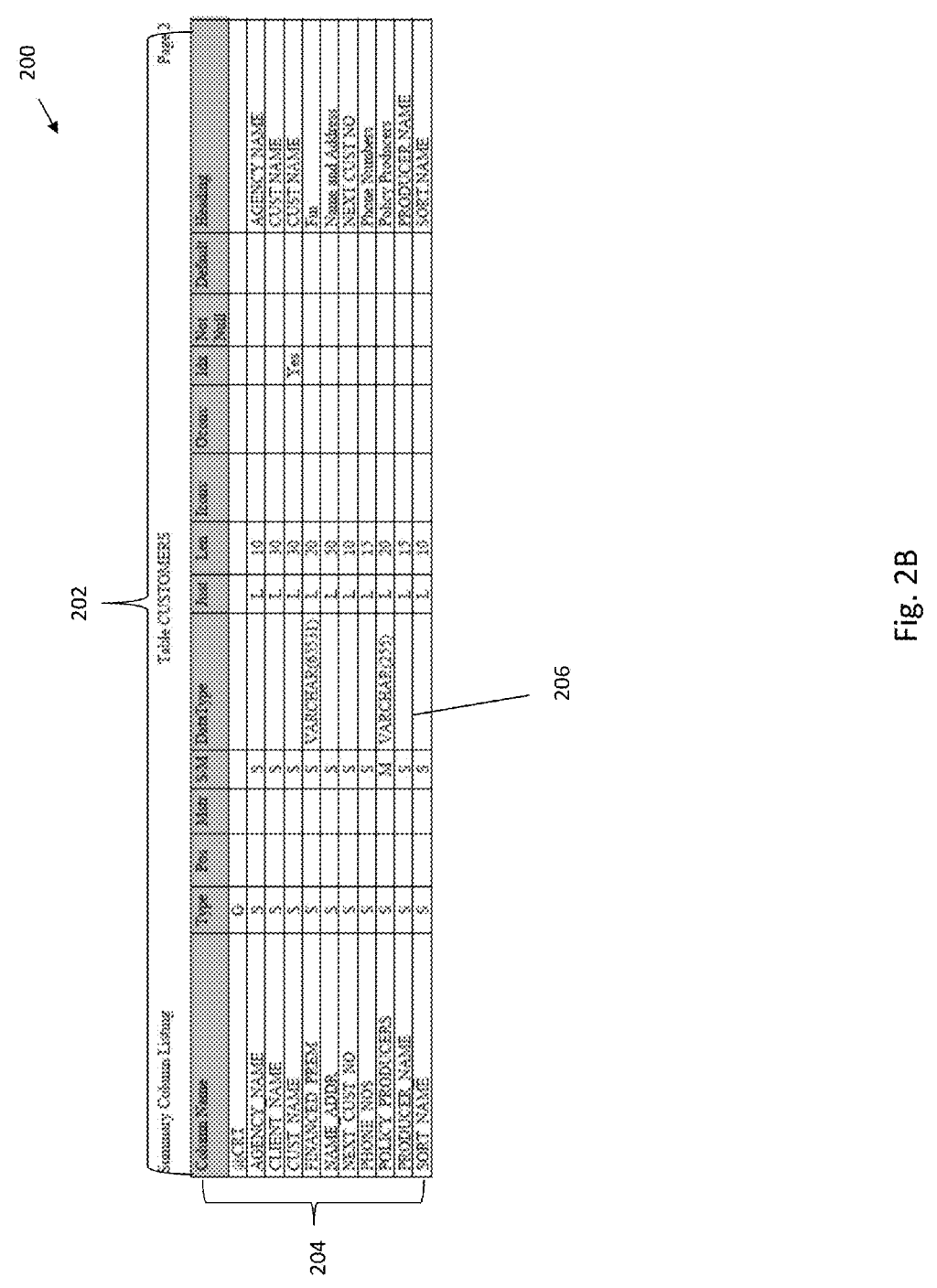

FIGS. 2A-2B illustrate an example of a first index. The first index can be stored on the first database 102. For example, the CUSTOMERS Table 200 can include certain customer data, such as a customer's name and address, billing address, and/or contact information. In some embodiments, the CUSTOMERS TABLE 200 can provide instructions for storing the premium data and return premium data in a database table. In the illustrated embodiment, the data can be stored and/or displayed in a plurality of rows (e.g., records) 204 and a plurality of columns (e.g., fields) 202. In particular, the plurality of data can be stored in cells 206 formed by the intersection of the fields 202 and the records 204.

FIGS. 3A-3N illustrate an example of a second index that is stored on the first database 102. For example, the BILLING Table 300 can include certain billing data, such as premium data and return premium data. In some embodiments, the BILLING TABLE 300 can provide instructions for storing the premium data and return premium data in a database table. In the illustrated embodiment, the data can be stored and/or displayed in a plurality of rows 304 (e.g., records) and a plurality of columns (e.g., fields) 302. In particular, the plurality of data can be stored in cells 306 formed by the intersection of the fields 302 and the columns 304. As shown in FIGS. 3A-3N, each record of the plurality of records 304 corresponds to a single insurance policy. In some embodiments, each record of the plurality of records 304 includes multiple policies. As shown in FIGS. 3A-3N, each field 302 includes a plurality of data relating to each policy. For example, the data relating to each policy can include insurance premiums, taxes and fees, required down payments, premium payments, bank deposits, endorsements, and/or the like.

The cells 206, 306 can include physical data and/or symbolic data. In some embodiments, the cells 206, 306 refer to data that is stored in a different index and/or a different database table and/or a different database. In some embodiments, the cells 206, 306 include data that is retrieved from a different cell of the same index or database table. In some embodiments, the cells 206, 306 include data that is retrieved from a user interface. In some embodiments, the cells 206, 306 include data that is calculated by the database management system 100.

In some embodiments, the database management system 100 can identify particular data using a plurality of identifiers. The plurality of identifiers can include a first database identifier and a second database identifier. The plurality of identifiers can be numeric, alpha numeric, and/or symbolic. Each identifier can identify a single policy, a row 204, 304, a column 202, 302, and/or a cell 206, 306. Each identifier of the plurality of identifiers can refer to a customer number and/or a customer's policy number for example. For example, in the CUSTOMER Table, numerical identifiers can be implemented, such as 101, 102, 103, and/or the like. In some embodiments, such as in the BILLING Table, for example, a two-part identifier can be implemented. The two-part identifier can include a reference to both the customer number and the customer's policy number. In some examples, if a first customer is assigned a numerical identifier 101, the identifier of the first customer's first policy record would be 101-1. In this example, the identifier of the first customer's second policy record would be 101-2. In typical database systems, such as systems implemented in the P&C insurance accounting industry, identifiers include an invoice ID to refer to certain records and/or data. Rather, some embodiments of the database management system 100 can implement a two-part identifier including the customer number and the customer's policy number. In typical database management systems, a premium invoice may not be assigned an identifier since the invoice may not have any analytical value, other than to serve a customer a notice that a premium payment is coming due. Additionally, typical systems may use only a premium invoice number as an identifier. Those systems may not implement a policy number in the identifier because the policy is not stored in the corresponding database. Thus, the second database 104 may not be able to be implemented in typical database systems as the second database would not be able to refer to the first database 102 and properly and/or quickly locate stored data.

Examples Second Database Structure

In some embodiments, the database management system 100 includes the second database 104 (e.g., the IF-DBMS). In some embodiments, the second database 104 includes a single index and/or table 160. In some embodiments, the index 160 includes only symbolic data (e.g., data that is calculated and/or determined by the database management system 100). However, in some embodiments, the index 160 includes both physical data and symbolic data. In some embodiments, the second database includes a plurality of indexes and/or tables.

In some embodiments, the second database 104 includes a management module 106. The management module 106 can include a plurality of modules. For example, the management module 106 can include a reporting module and/or a calculation module. In some embodiments, the reporting module is configured to generate a plurality of database management reports, financial reports, and/or ledgers based on the data stored in the first database and/or second database. In some embodiments, the management module 106 is configured to calculate and/or otherwise determine symbolic data based on one or more of the physical data stored in the first database 102, the symbolic data stored in the first database 102, the physical data stored in the second database 104, the symbolic data stored in the second database 104, and/or other data that is entered by a user and/or otherwise determined by the database management system 100.

In some embodiments, the symbolic data that is stored in the second database 104 can include account data records. The account data records can generally support financial management of an insurance trust account. For example, the account data records include Cash in Trust Bank Account, Personal Funds in Trust Account, Trust Cash on Hand, Invoiced Premium Receivable, Endorsement Premium Receivable, Short Payment Receivable, NSF Check Receivable, Financed Premium Receivable, Audit Premium Receivable, Return Net Premium Receivable, Return Premium Credit, Return Commission Receivable, Return Commission Credit Reimbursement, Offset Premium Credit from Insured, Offset Premium Credit from Finance Co., Unbilled Premium, Unbilled Endorsement Premium, Short Payment Premium, NSF Check Premium, Unreconciled Endorsement RP, Financed Premium w/Remittance to Carrie, Adjustment to Estimated Audit Premium, DB Premium, Net Premium Payable, Net Premium Current, Commission Payable, Commission Current, Commission Loss on Uncollectible Invoice, Return Premium Credit, Losses Due to Uncollectible NSF Checks, Return Financed Premium Credit, Net Premium on Unbilled Premium, Net Premium on Unbilled Endorsements, Unreconciled Endorsement RP (net), DB Premium Net, Commission on Unbilled Premium, Commission on Unbilled Endorsements, Unreconciled Endorsement RP (commission), DB Premium Commission, Return Premium Due to Insured (Not Payable), Return Premium Payable to Insured, Overpayment Due to Insured (Not Payable), Return Premium Due to Financed Co.'s (No, Return Premium Payable to Financed Co.'s, Private Funds, Commission Reserve Fund, Interest Earnings, Down Payment, Annual Premium, Less Down Payment to Finance Company, Installment Premium, Endorsement AP, Re-Invoiced Short Payment, Uncollectible NSF Checks, Financed Premium, Audit Premium, DB Dn Payment Premium, Offset Premium Refund to/from Insured, Offset Premium Refund to/from Finance Co, Premium Cash Refund to Insured, Premium Cash Refund to Finance Company, Outstanding Transacted Premium, Outstanding Endorsement AP, Uncollectible NSF Checks, Unreconciled Endorsement RP, Fin Premium w/Direct Remittance, DB Premium, Unrefunded Overpayments, Unrefunded Return Premium, Net Premium Remittance, Endorsement AP—Net Premium Remittance, Net Premium Reimbursements (cash or cred, DB Dn Pmt Remittance, Commission Income Transfer, Endorsement AP—Commission Transfer, Recovered Uncollectible NSF Check Loss, Commission Reimbursements (cash or credit, On Pmt to Fin. Co., DB Dn Pmt Commission Transfer, Undisbursed Transacted Premium, Undisbursed Endorsement Premium, Uncollectible NSF Check Loss, Unreconciled Endorsement RP, Financed Prem Direct Remittance, DB Premium, Outstanding Overpayments, Unreimbursed Return Premium, and/or Unrecovered Uncollectible NSF Check Loss, and/or the like. In some embodiments described herein, the account data records of the second database 104 can be referred to as "TL accounts" (e.g., trust ledger accounts, as described in more detail herein).

In some embodiments, the second database 104 can be integrated with, merged with, and/or otherwise translated from the index 160 of the second database 104 into a second database ledger. The second database ledger can include a trust accounting ledger, for example (e.g., a fiduciary ledger, and/or a trust ledger) to store symbolic data.

In some embodiments, the management module 106 of the second database 104 can generate and/or be configured to generate reports, such as financial reports, based on the data stored in the first database 102 and/or the data stored in the second database 104. For example, the management module 106 of the second database 104 can generate at least one or more of a trust balance sheet, and/or a trust statement of receipts and disbursements (also referred to herein as "Statement R&D" or "Premium Float Statement"). In some embodiments, the financial reports are generated for each policy, for each insurance company, and/or for each agency trust account. This can help to comply with insurance code fiduciary mandates, as the user would be able to view accurate information calculated and/or displayed by the database management system 100. In some embodiments, other financial reports can be generated based on at least one or more of the trust balance sheet, and/or the trust statement of receipts and disbursements. For example, the management module 106 can generate financial reports based at least in part on the trust balance sheet, including a financial solvency analysis report, a premium float analysis report, a statement of trust funds beneficiaries report, and/or a monthly statement of agency commission and fees report, among others.

Figure 4:
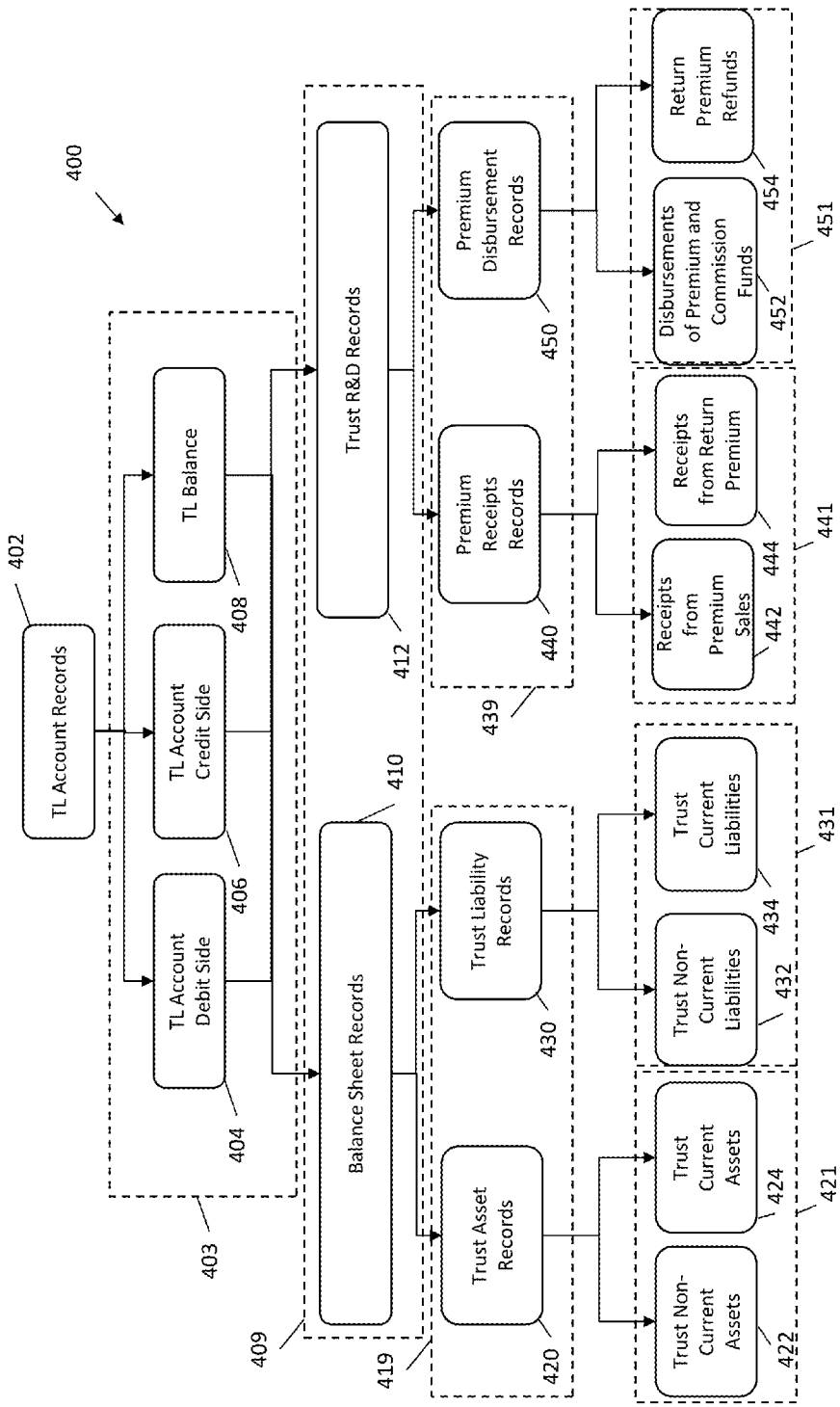
FIG. 4 is an example hierarchy of records according to an embodiment of the database management system.

As described above, in some embodiments, the second database 104 can include the index and/or table 160. FIG. 4 illustrates an example hierarchy 400 of groupings and/or locations the management module 106 can store a Trust Ledger ("TL") account record 402. The index 160 can include a plurality of rows and a plurality of columns, similar to the index 200, 300. In some embodiments, each row of the second database index 160 corresponds to a data record of the plurality of account data records. For example, each row of the second database index 160 corresponds to a particular TL Account record 402. The second database index 160 can generally have any number of rows and/or columns 403. In some embodiments, the second database index 160 includes 88 rows. In this embodiment, each row of the 88 rows corresponds to each TL Account record of the 88 TL accounts. In some embodiments, the second database index 160 includes three columns. For example, in such configurations, the second database index 160 includes a TL account debit side 404, a TL credit side 406, and a TL balance 408. In some examples, depending on the type of data included in a TL account record, the TL account record can be displayed in one or more of the columns 403. In some examples, the management module 106 can determine, based on a second database identifier associated with the TL account record, the appropriate column to store the TL account record. In some embodiments, the second database index 160 includes one, two, three, four, five, six, seven, and/or eight or more columns. Each of the columns of the second database index can correspond to one of a plurality of sections of the trust accounting ledger.

For example, after an account record is retrieved and/or calculated, the management module 106 can analyze the content of the TL account record and/or autonomously store the TL account record in the corresponding column. In some embodiments, depending on the underlying data associated with the TL account record and/or if a second database identifier has not been previously assigned, the management module can assign a second database identifier to the TL account record. In some embodiments, the second database identifier is at least partially based on a previously assigned first database identifier (described above).

For example, the second database identifier can include a three-part identifier. In this example, the second database identifier includes the two-part first database identifier (e.g., including the first database identifier assigned to the data records stored in each of the plurality of indexes 150 of the first database 102), and a TL account identifier. Similar to the first database identifier, the second database identifier can be numeric, alphanumeric, and/or any combination thereof. The TL account identifier can identify a proper location or identifier for the TL account record. In some embodiments, the TL account record identifier indicates an instruction for generating a report. For example, the instruction can indicate to the management module 106 what operation to perform on the TL account record. In this example, the TL account identifier can indicate whether to add and/or subtract the TL account record and the proper location or identifier and/or other TL account record to perform the operation on.

In some embodiments, the TL account identifier is based on at least the content included in the TL account record. For example, the trust cash record can be assigned a second database account record: 101-1-TL 101. In this example, 101-1 represents the first database identifier and TL 101 indicates the TL account identifier. As another example, the trust cash-on-hand record can be assigned a second database account record: 101-1-TL-103. In this example, 101-1 represents the first database identifier and TL-103 indicates the TL account identifier.

In some embodiments, the TL account identifiers can be associated with one or more financial reports, such as the trust balance sheet and/or the statement of receipts and disbursements. For example, numbers in the 100s and/or 200s can be implemented to indicate that the TL account record should be stored in the second database index 160 with other related trust balance sheet records. The trust balance sheet can correspond to any number of rows of the second database index. In some embodiments, the trust balance sheet corresponds to 44 rows and/or TL records stored in the second database index. The statement of receipts and disbursements can correspond to any number of rows of the second database index. In some embodiments, the trust balance sheet corresponds to 41 rows and/or TL records stored in the second database index. As another example, numbers in the 400s and/or 500s can be implemented to indicate that the TL account record should be stored in the second database index 160 with related statement of receipts and disbursements records. As a third example, numbers in the 300s can indicate that the TL account record should be stored in the second database index with related personal funds (e.g., non-premium and/or non-fiduciary funds). The personal funds can correspond to any number of rows and/or TL account records of the second database index. In some embodiments, the personal funds corresponds to 3 rows and/or TL account records stored in the second database index. In some examples, the personal funds include agency personal funds, interest earnings, and/or earned commission reserve funds, among others.

In some embodiments, the second database identifier is at least partially based on the content of the TL account record. For example, to store a TL account record in an appropriate column, the management module can determine the proper location or identifier to store with the TL account record based on the assigned second database identifier. However, in some embodiments, in which a second database identifier has not been assigned, the management module 106 can assign and/or apply a second database identifier to a second database record after each grouping stage (described below). In such embodiments, the management module can analyze the content of the TL account record to determine the proper location to store the TL account record. If a second database identifier has already been assigned to the TL account record, the management module will store the TL account record in the appropriate location.

In some embodiments, the management module 106 further analyzes each TL account record and determines an appropriate location to store the TL account record. For example, the management module 106 can store the TL account record in one or more financial records at block 409, including a balance sheet record 410 and/or a trust r&d record 412.

At block 419, the management module can store the TL account record within a plurality of sub-groupings of the balance sheet records 410, including trust asset records 420 and/or trust liability records 430, among others. At block 421, the management module can store the TL account record within a plurality of sub-sub-groupings of the trust asset records 420, including trust non-current assets 422 (e.g., due and payable to an agency) and/or trust current assets 424 (e.g., due, but not payable to an agency), among others. At block 431, the management module 106 can store the TL account record within a plurality of sub-sub-groupings of the trust liability records 430, including trust non-current liabilities 432 (e.g., due and payable by an agency) and/or trust current liabilities 434 (e.g., due, but not payable by an agency), among others. In some embodiments, based on the groupings, sub-groupings, and sub-sub groupings described herein, the management module 106 can generate a plurality of financial solvency reports 170, including reports on a cash based and/or an accrual basis (e.g., account current basis). The reports on an accrual basis can include premium receivables and related payables, for example.

At block 439, the management module can store the TL account record within a plurality of sub-groupings of the trust r&d records 412, including premium receipts records 440 and/or premium disbursement records 450, among others. At block 441, the management module can store the TL account record within a plurality of sub-sub-groupings of the premium receipts records 440, including receipts from premium sales 442 and/or receipts from return premium 444, among others. At block 451, the management module can store the TL account record within a plurality of sub-sub-groupings of the premium disbursement records 450, including disbursements of premium and commission funds 452 and/or return premium refunds 454, among others. In some embodiments, based on the groupings, sub-groupings, and sub-sub groupings described herein, the management module 106 can generate financial solvency reports, including the trust premium float report.

Example Core Logic

Figure 5:
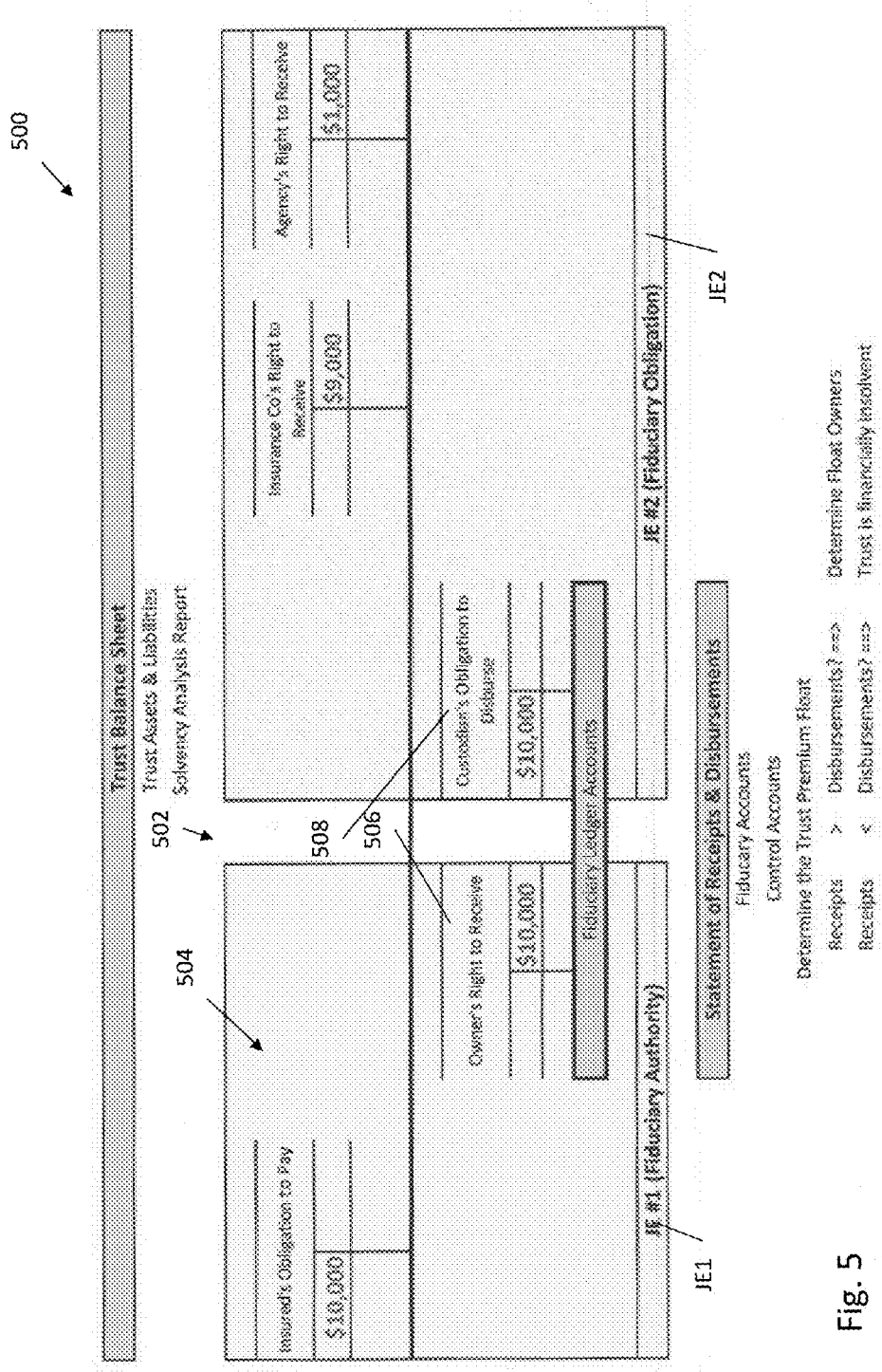
FIG. 5 is an example embodiment of a report generated according to an embodiment of the database management system.

FIG. 5 illustrates an example trust balance sheet 500. The trust balance sheet report can include many of the same features as described herein regarding trust balance sheet reports. The trust balance sheet can be used in financial solvency analysis. As shown in FIG. 5, an insurance premium transaction 504 is entered into a trust ledger 502. When the insurance premium transaction is entered into the trust ledger 502, two account records are entered and/or displayed—JE1 and JE2, for example. In this example, two fiduciary accounts are introduced in the trust ledger 502 to enable an agency owner to control both receivables and/or disbursements processes, including for example, the owner's right to receive 506 and a custodian's obligation to disburse 508. The location of JE1 and JE2 within the trust ledger 502 allows the management module 106 to generate a trust balance sheet and/or a statement of receipts and disbursements. In some embodiments, trust asset and/or trust liability account records support the generation of financial solvency reports. In some embodiments, receipts and disbursements account records support the calculation of premium float and/or generation of premium float reports. In some embodiments, the database management system 100 can record the physical data associated with the insurance premium transaction in a first index of the first database. Based on the physical data associated with the insurance premium transaction, the database management system can calculate symbolic data, such as amounts of the insured's obligation to pay, the owner's right to receive, the custodian's obligation to disburse, the insurance company's right to receive, and/or the agency's right to receive, among others, assign a second database identifier to the symbolic data, and store the symbolic data relating to the trust balance sheet in the second database in the appropriate location according to the second database identifier.

As illustrated in FIG. 5, based on the statement of receipts and disbursements records, the database management system 100 can determine whether a trust is financially solvent. For example, the database management system 100 can compare the total receipts account records to the total disbursements records. If the total disbursements records is less than the total receipts records, the system 100 can determine float owners. If the total disbursements records is greater than the total receipts records, the system 100 determines and/or displays that the trust is financially insolvent.

Figure 6A:
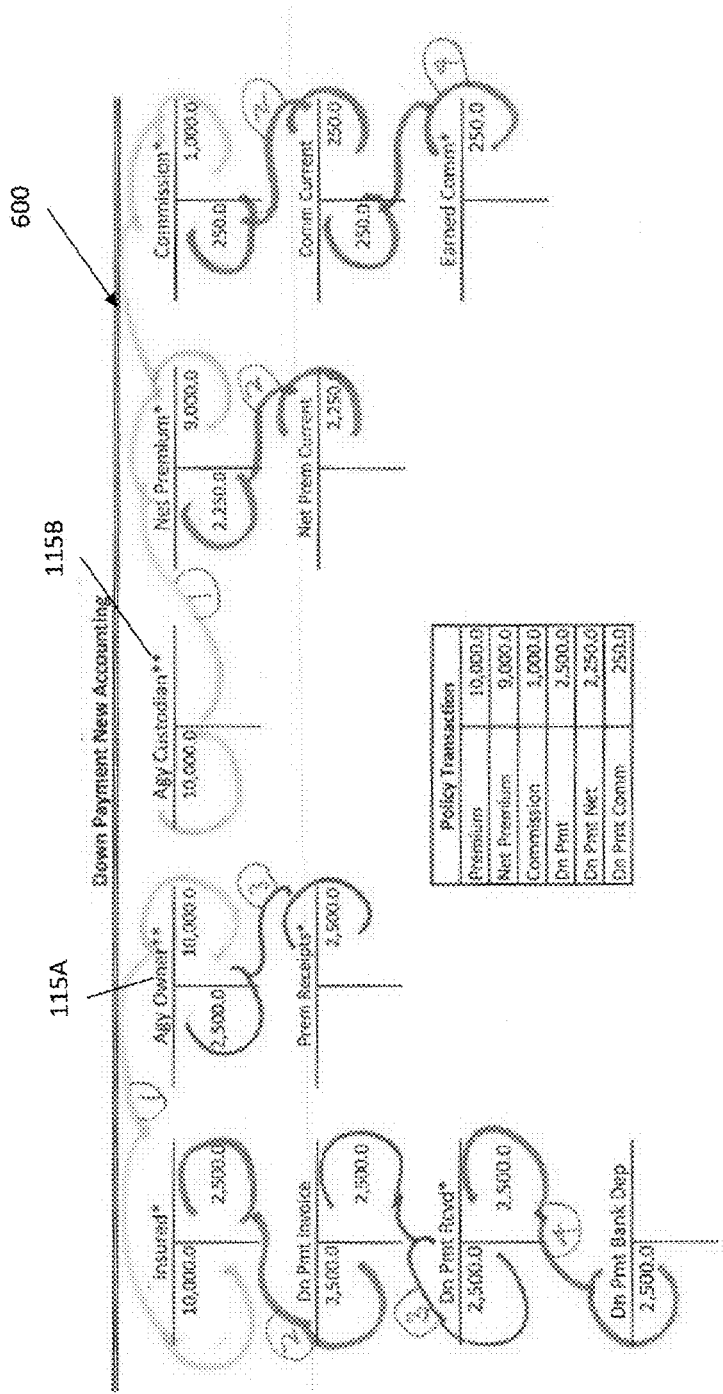
FIGS. 6A-6B show an example architecture of an embodiment of the database management system.

FIG. 6A illustrates an example of an insurance fiduciary accounting architecture, including a $10,000 premium transaction 1 and a $2,500 down payment 2. In this example, the premium transaction 1 is recorded in a ledger 600. As shown in the illustrated example, premium transaction 1 is transacted as a receivable and a liability. At the same time, an invoice net premium of $2250 and a commission $250 become due but not payable (e.g., account current). An invoice payment 3 of $2500 is received. At the same time, and agency owner confirms receipt of the invoice payment 3. A bank deposit 4 of $2500 is made. At the same time, the commission is earned and becomes due and payable. In this example, an earned commission transfer or a down payment net premium is not shown in the ledger.

As shown in FIG. 6A, the ledger 600 includes a plurality of ledger accounts and/or indexes. For example, the ledger accounts include an insured account, a down payment received account a net premium account, a commission account, and/or an earned commission account, among others. As shown in FIG. 6A, the ledger includes a plurality of fiduciary ledger accounts, including the agency owner account 115A and the agency custodian account 115B. In some embodiments, the database management system 100 updates the ledger 600 when the premium transaction 1 is entered into and/or received by the database management system 100. In typical database management systems for accounting, the premium transaction 1 is not entered in the ledger 600. Accordingly, a down payment is not typically invoiced against the premium transaction 1. Although in typical database systems in the P&C accounting industry may record a down payment commission as income, the down payment commission may not yet be "earned." Therefore, there may not be any record of any "earned" commission. However, the general database management system 100 described herein can account for the entry of the premium transaction 1 and records an "earned" commission.

Figure 6B:
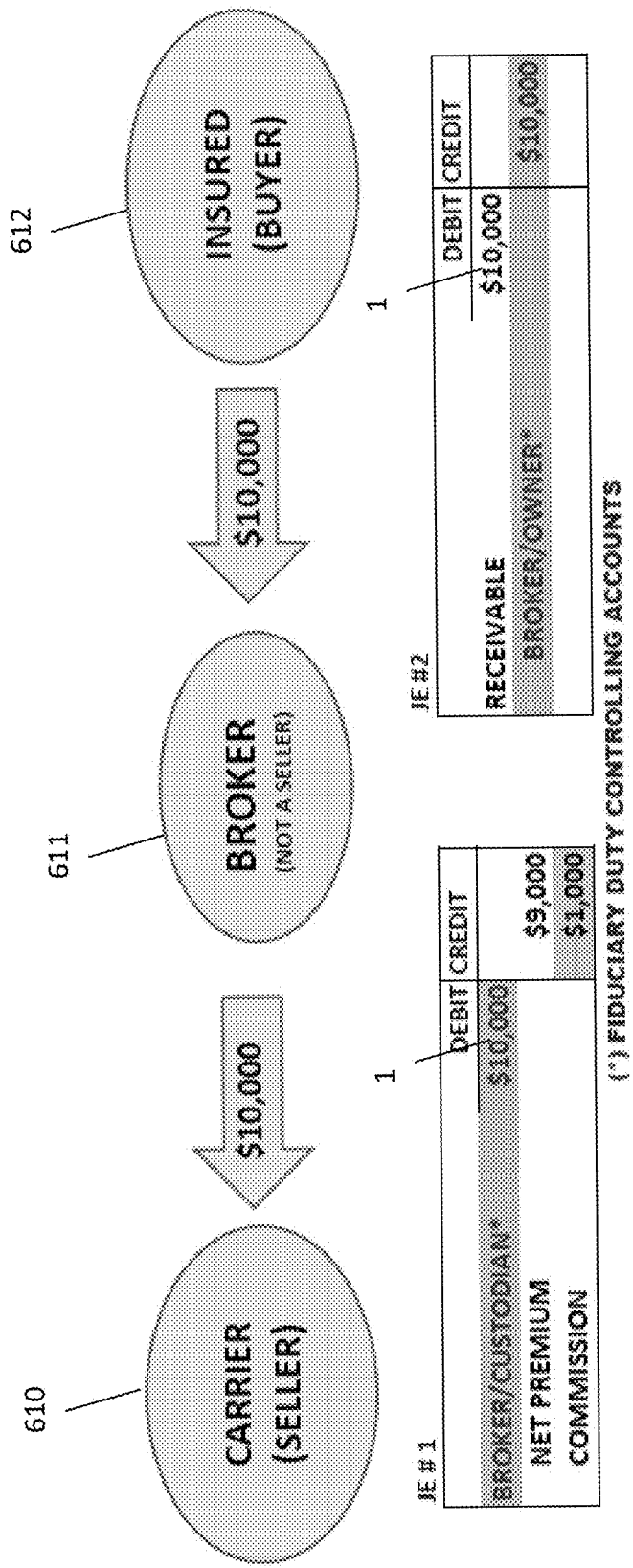

FIG. 6B illustrates an example of a fiduciary accounting concept. For example, a broker 611 can be an intermediary between a seller 610 (e.g., an insurance carrier) and a buyer 612 (e.g., an insured). In the illustrated example, the broker 611 obligation is to receive a premium transaction 1 of $10,000 and provide the seller 610 with $9,000 and an agency business operating account with $1000. Thus, the insurance broker 611 may act as a trustee or custodian of funds. Typical systems however may not record the premium transaction 1. Rather, only an income of $1,000 is recorded, leaving the agency with no record of the premium transaction 1.

Figure 7A:
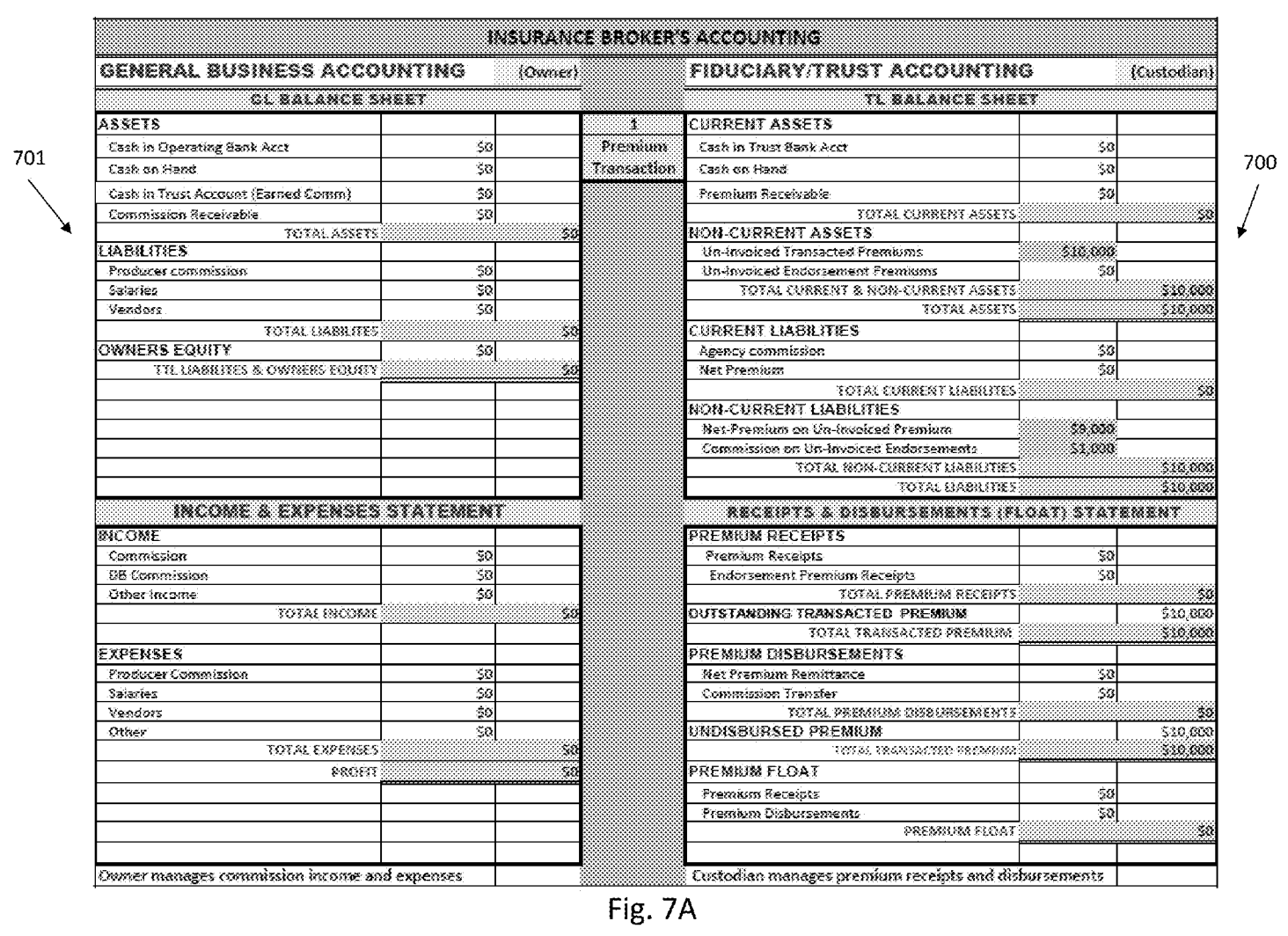

FIGS. 7A-7H illustrate an example TL Balance Sheet and Float Statement 700 generated by the management module 106 of the second database and statements 701 generated by typical accounting database systems. The management module 106 can calculate the transactions and can update the account records as described below. For example, as shown in FIGS. 7A-7H, the management module can calculate various data, including various totals. As shown in FIGS. 7A-7H, numbers shown in parentheses indicates subtraction, while numbers shown without being surrounded by parentheses indicates addition or a total value. The management module can perform any of the operations shown in FIGS. 7A-7H for example. The TL Balance Sheet and Float Statement reflect the second database index 160 of the second database. FIG. 7A illustrates an example of a $10,000 policy transaction. When the $10,000 policy transaction is received by the database management system 100, the management module 106 can update the second database 104 with symbolic data and calculated entries to reflect the policy transaction. Thus, the management module 106 of the second database can convert the physical data stored on the first database into the second database index 160 of the second database 104, matching, for example, the first database identifiers with the second database identifiers. Based on the second database identifiers, the management module 106 can store the symbolic data in the second database 104 in proper locations according to the second database identifiers, which as described herein can indicate a content of each data record. Based on the second database index 160 of the second database 104, the system can generate the TL Balance Sheet and Float Statement including the data records stored in the second database index.

In this example, the $10,000 policy transaction was closed and recorded as noncurrent assets and liabilities. As shown in FIG. 7A, the $10,000 policy transaction is outstanding in the float statement. In the typical database system shown in FIG. 7A, the $10,000 policy transaction is not recorded.

FIG. 7B illustrates a $2500 down payment receipt record in the trust balance sheet. In this example, the total trust assets continue to remain $10,000. As shown in the float statement, the $2500 is recorded as received in the Statement 700. Additionally, the $250 down payment commission is recorded as cash in statement 701 in trust account and income. FIG. 7C illustrates the $250 commission transfer. When the $250 commission occurs, the management module can reduce the trust account record cash by $250. As shown in the illustrated example, the commission transfer is recorded in the float statement. Accordingly, a premium float becomes $2250. In the typical database system shown in FIG. 7C, the $250 is illustrated in an operating account.

Figure 7D:
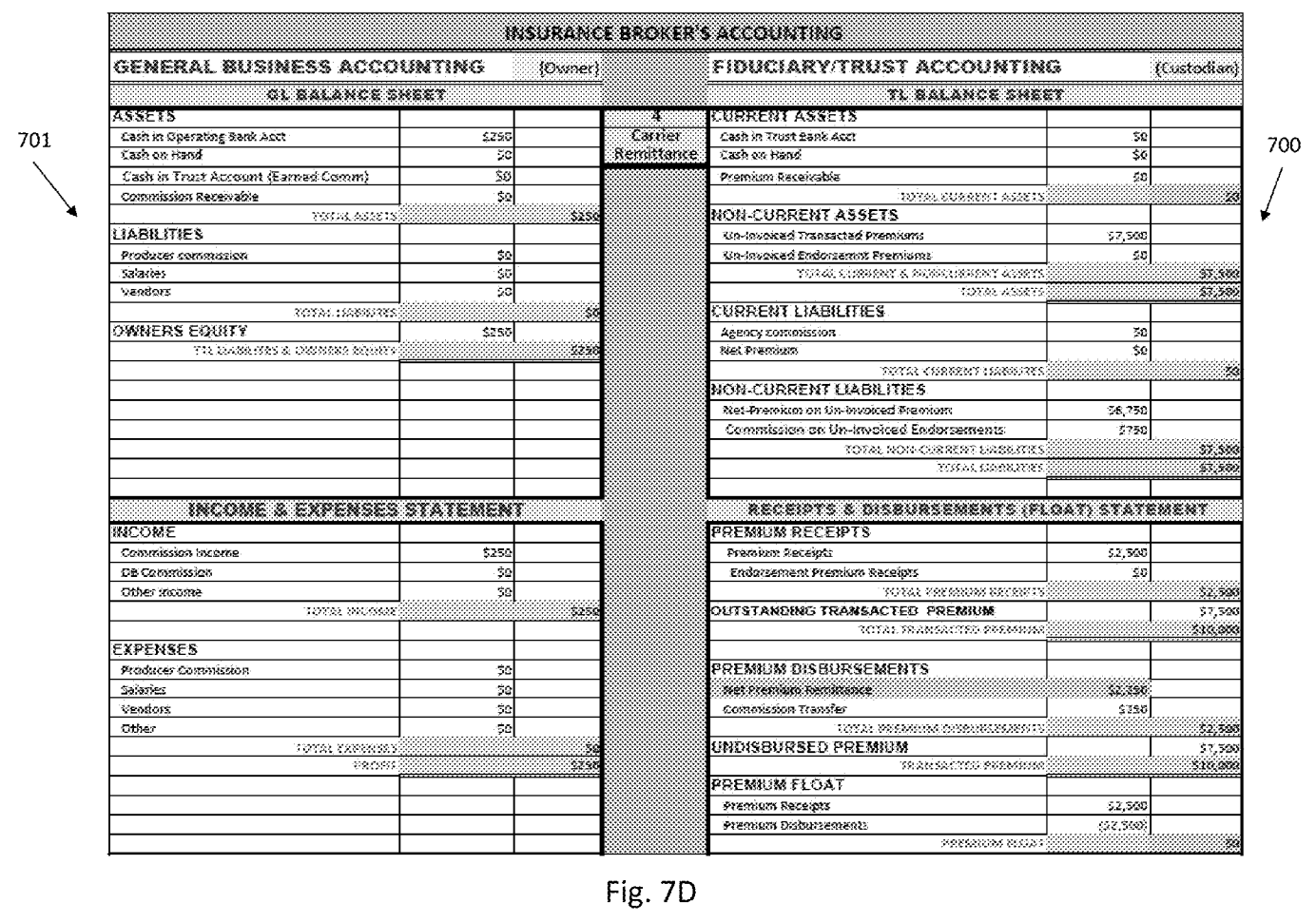

FIG. 7D illustrates a down payment remittance of $2250. As shown in the illustrated example, a cash balance is $0. As shown in the illustrated example, the premium float is $0. In the typical database system statement 701 shown in FIG. 7D, there is no activity.

Figure 7E:
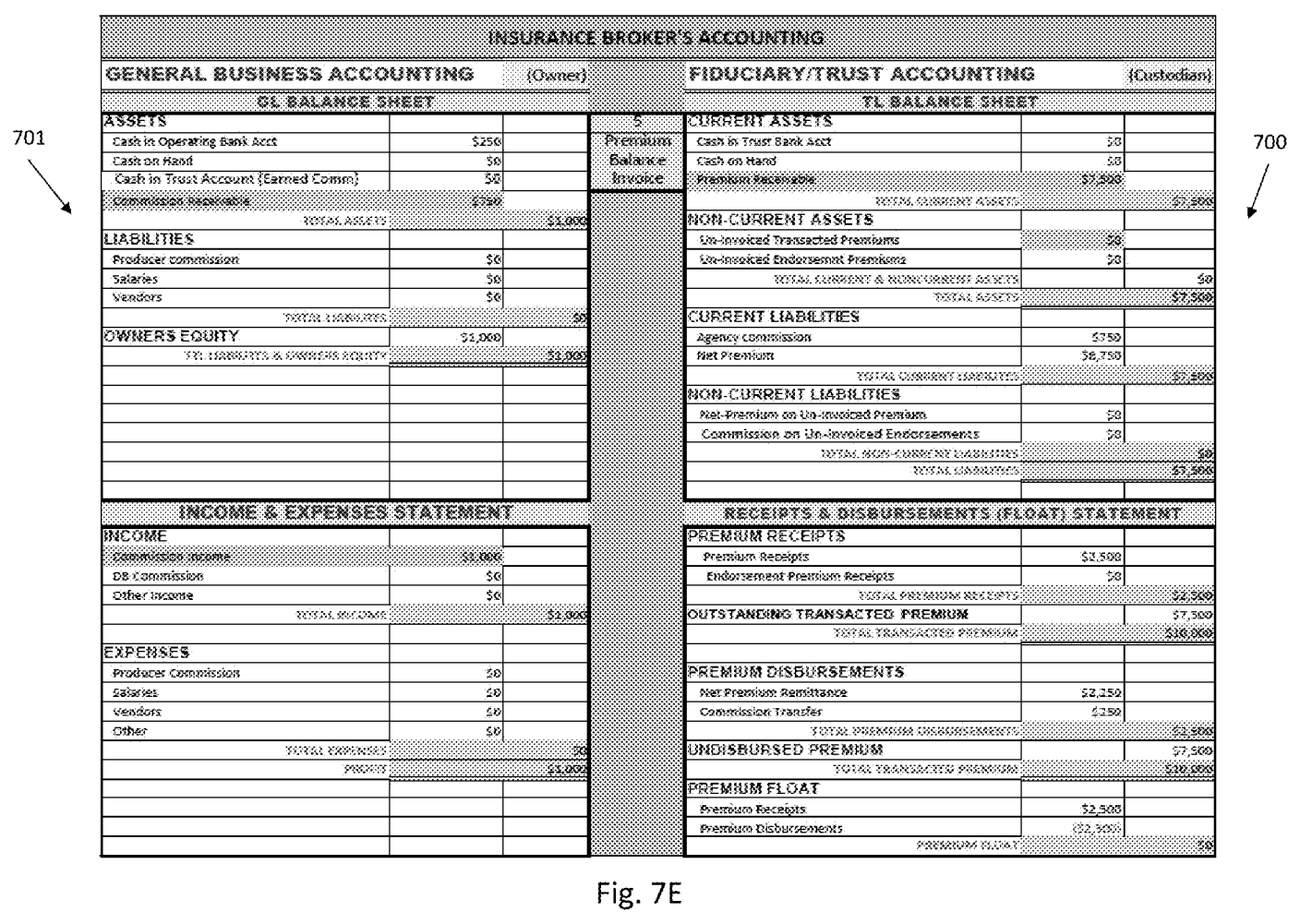

FIG. 7E illustrates a $7500 unpaid balance invoice. The unpaid balance invoice is shown as a receivable in the trust balance sheet. In the typical database system 701 shown in FIG. 7E, a $750 commission associated with the unpaid balance invoice is listed as a receivable. Thus in the typical database system, an agency commission income becomes $1000.

Figure 7F:
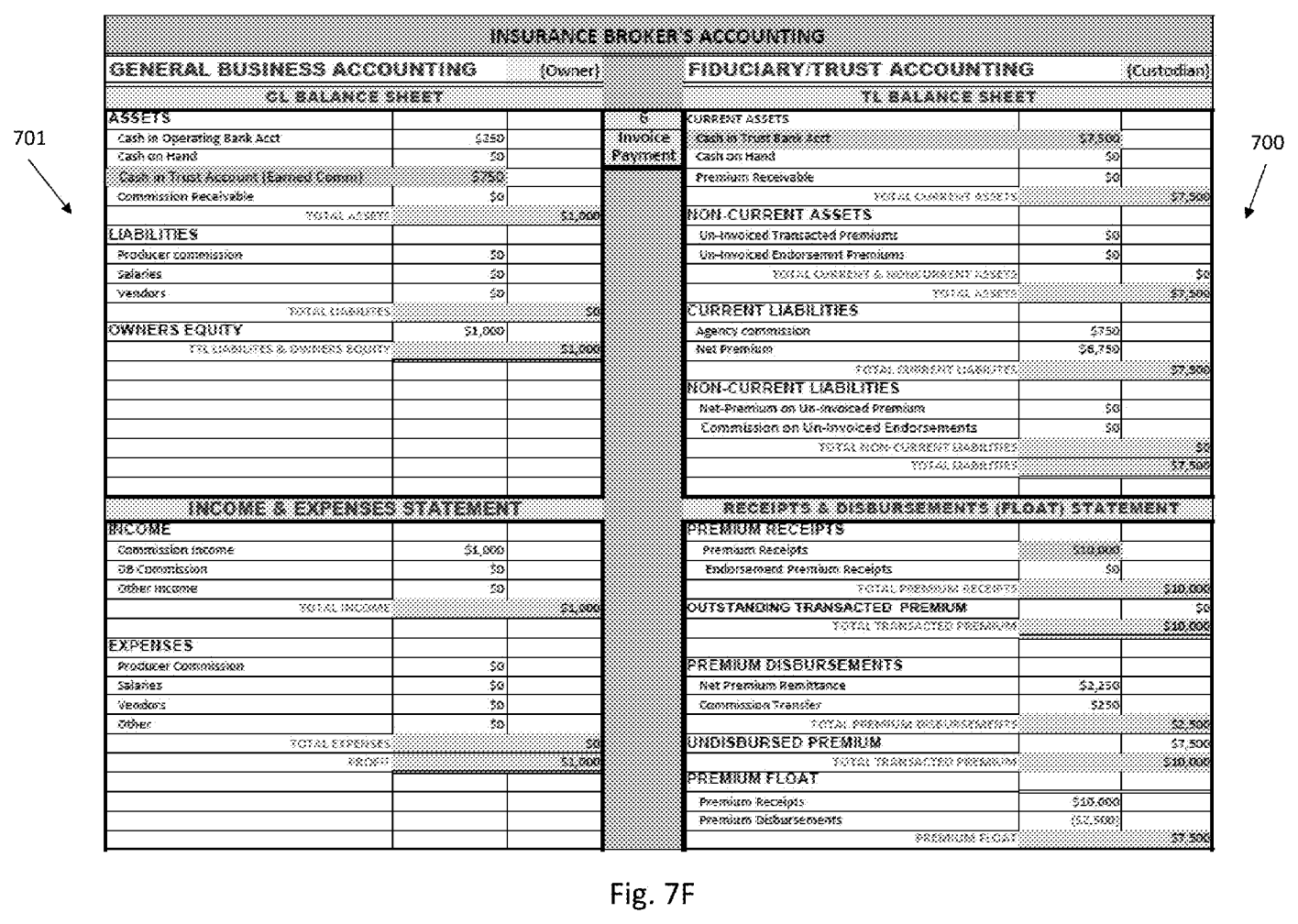

FIG. 7F illustrates a $7500 invoice payment. As shown in the illustrated example, cash in trust becomes $7500. In the illustrated example, premium receipts becomes $10,000. In addition the illustrated example, premium float becomes $7500. The typical database system shown in FIG. 7F shows a $750 commission as cash and trust account.

FIG. 7G illustrates a $750 commission transfer to an agency operating account. The management module has a reduced the trust cash balance to $6750. As a result, the premium float becomes $6750. At the same time, a commission transfer amount increases to $1000 and disbursements amount becomes $3250. The typical database system shown in FIG. 7G shows the cash in the bank account as $1000.

FIG. 7H illustrates is $6750 company remittance. As a result the management module reduces the trust cash balance to $0. In the illustrated example, the premium float also becomes $0. Thus, the management module causes the trust assets and liabilities total to become $0. The typical database system shown in FIG. 7H shows no activity.

Computing System

Figure 8A:
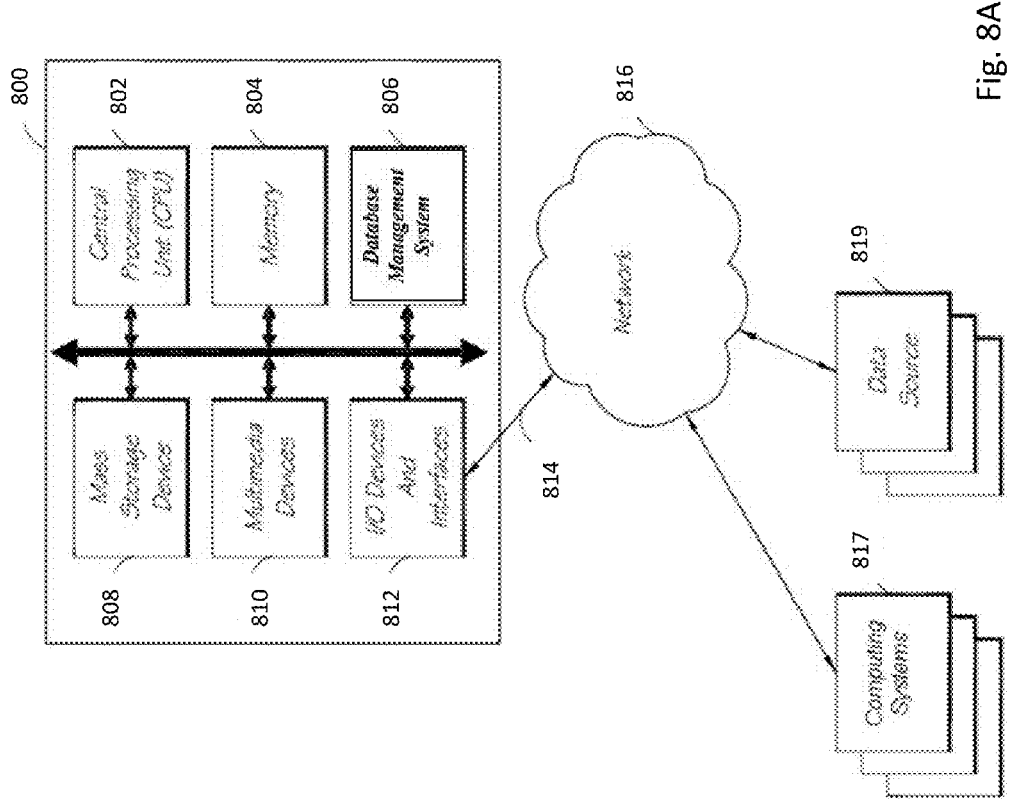
FIG. 8A is a block diagram depicting an overview of one embodiment of a system configured to run software for controlling one or more embodiments of the database management system described herein.

FIG. 8A is a block diagram depicting an embodiment of a computer hardware system configured to run software for implementing one or more embodiments of the database management systems described herein.

In some embodiments, the computer clients and/or servers described above take the form of a computing system 800 illustrated in the above figure, which is a block diagram of one embodiment of a computing system that is in communication with one or more computing systems 817 and/or one or more data sources 819 via one or more networks 816. The computing system 800 may be used to implement one or more of the systems and methods described herein. In addition, in one embodiment, the computing system 800 may be configured to manage access or administer a software application. While the above figure illustrates one embodiment of a computing system 800, it is recognized that the functionality provided for in the components and modules of computing system 800 may be combined into fewer components and modules or further separated into additional components and modules.

Database Management System Module

In one embodiment, the computing system 800 comprises a database management system 806 that carries out the functions described herein with reference to management of databases, including any one of techniques described above. The database management system 806 and/or other modules may be executed on the computing system 800 by a central processing unit 802 discussed further below.

In general, the word "module," as used herein, refers to logic embodied in hardware or firmware, or to a collection of software instructions, possibly having entry and exit points, written in a programming language, such as, for example, COBOL, CICS, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage.

Computing System Components

In one embodiment, the computing system 800 also comprises a mainframe computer suitable for controlling and/or communicating with large databases, performing high volume transaction processing, and generating reports from large databases. The computing system 800 also comprises a central processing unit ("CPU") 802, which may comprise a conventional microprocessor. The computing system 800 further comprises a memory 804, such as random access memory ("RAM") for temporary storage of information and/or a read only memory ("ROM") for permanent storage of information, and a mass storage device 808, such as a hard drive, diskette, or optical media storage device. Typically, the modules of the computing system 800 are connected to the computer using a standards based bus system. In different embodiments, the standards based bus system could be Peripheral Component Interconnect (PCI), Microchannel, SCSI, Industrial Standard Architecture (ISA) and Extended ISA (EISA) architectures, for example.

The computing system 800 comprises one or more commonly available input/output (I/O) devices and interfaces 812, such as a keyboard, mouse, touchpad, and printer. In one embodiment, the I/O devices and interfaces 812 comprise one or more display devices, such as a monitor, that allows the visual presentation of data to a user. More particularly, a display device provides for the presentation of GUIs, application software data, and multimedia presentations, for example. In one or more embodiments, the I/O devices and interfaces 812 comprise a microphone and/or motion sensor that allow a user to generate input to the computing system 800 using sounds, voice, motion, gestures, or the like. In the embodiment of the above figure, the I/O devices and interfaces 812 also provide a communications interface to various external devices. The computing system 800 may also comprise one or more multimedia devices 810, such as speakers, video cards, graphics accelerators, and microphones, for example.

Computing System Device/Operating System

The computing system 800 may run on a variety of computing devices, such as, for example, a server, a Windows server, a Structure Query Language server, a Unix server, a personal computer, a mainframe computer, a laptop computer, a tablet computer, a cell phone, a smartphone, a personal digital assistant, a kiosk, an audio player, an e-reader device, and so forth. The computing system 800 is generally controlled and coordinated by operating system software, such as z/OS, Windows 95, Windows 98, Windows NT, Windows 2000, Windows XP, Windows Vista, Windows 7, Windows 8, Linux, BSD, SunOS, Solaris, Android, iOS, BlackBerry OS, or other compatible operating systems. In Macintosh systems, the operating system may be any available operating system, such as MAC OS X. In other embodiments, the computing system 800 may be controlled by a proprietary operating system. Conventional operating systems control and schedule computer processes for execution, perform memory management, provide file system, networking, and I/O services, and provide a user interface, such as a graphical user interface ("GUI"), among other things.

Network

In the embodiment of the above figure, the computing system 800 is coupled to a network 816, such as a LAN, WAN, or the Internet, for example, via a wired, wireless, or combination of wired and wireless, communication link 814. The network 816 communicates with various computing devices and/or other electronic devices via wired or wireless communication links. In the embodiment of the above figure, the network 816 is communicating with one or more computing systems 817 and/or one or more data sources 819.

Access to the database management system 806 of the computer system 800 by computing systems 817 and/or by data sources 819 may be through a web-enabled user access point such as the computing systems' 817 or data source's 819 personal computer, cellular phone, smartphone, laptop, tablet computer, e-reader device, audio player, or other device capable of connecting to the network 816. Such a device may have a browser module that is implemented as a module that uses text, graphics, audio, video, and other media to present data and to allow interaction with data via the network 816.

The browser module may be implemented as a combination of an all points addressable display such as a cathode-ray tube (CRT), a liquid crystal display (LCD), a plasma display, or other types and/or combinations of displays. In addition, the browser module may be implemented to communicate with input devices 812 and may also comprise software with the appropriate interfaces which allow a user to access data through the use of stylized screen elements such as, for example, menus, windows, dialog boxes, toolbars, and controls (for example, radio buttons, check boxes, sliding scales, and so forth). Furthermore, the browser module may communicate with a set of input and output devices to receive signals from the user.

The input device(s) may comprise a keyboard, roller ball, pen and stylus, mouse, trackball, voice recognition system, or pre-designated switches or buttons. The output device(s) may comprise a speaker, a display screen, a printer, or a voice synthesizer. In addition a touch screen may act as a hybrid input/output device. In another embodiment, a user may interact with the system more directly such as through a system terminal connected to the score generator without communications over the Internet, a WAN, or LAN, or similar network.

In some embodiments, the system 800 may comprise a physical or logical connection established between a remote microprocessor and a mainframe host computer for the express purpose of uploading, downloading, or viewing interactive data and databases on-line in real time. The remote microprocessor may be operated by an entity operating the computer system 800, including the client server systems or the main server system, an/or may be operated by one or more of the data sources 819 and/or one or more of the computing systems 817. In some embodiments, terminal emulation software may be used on the microprocessor for participating in the micro-mainframe link.

In some embodiments, computing systems 817 who are internal to an entity operating the computer system 800 may access the database management system 806 internally as an application or process run by the CPU 802.

User Access Point

In an embodiment, a user access point or user interface comprises a personal computer, a laptop computer, a tablet computer, an e-reader device, a cellular phone, a smartphone, a GPS system, a Blackberry® device, a portable computing device, a server, a computer workstation, a local area network of individual computers, an interactive kiosk, a personal digital assistant, an interactive wireless communications device, a handheld computer, an embedded computing device, an audio player, or the like.

Other Systems

In addition to the systems that are illustrated in the above figure, the network 816 may communicate with other data sources or other computing devices. The computing system 800 may also comprise one or more internal and/or external data sources. In some embodiments, one or more of the data repositories and the data sources may be implemented using a relational database, such as DB2, Sybase, Oracle, CodeBase and Microsoft® SQL Server as well as other types of databases such as, for example, a flat file database, an entity-relationship database, and object-oriented database, and/or a record-based database.

Example Agency Operation Models

Generally, P&C insurance agencies sell and/or service insurance policies. The P&C insurance agencies can be referred to as retail agencies since they generally sell insurance products to consumers. The insurance products can include commercial line products and/or personal line products, among others. Some retailing agencies sell insurance but do not receive premium payments. These examples of retailing agencies transact directly with insurance companies and/or general managing agencies (e.g., MGA wholesalers). These examples of retailing agencies can be referred to as direct bill agencies. Other examples of retailing agencies include retailing agencies that receive transacted premiums and/or maintain transacted premiums and insurance trust bank accounts. These examples of retailing agencies can be referred to as agency-bill agencies.

Following an agency-bill model, an insurance owner may become a trustee and/or a custodian for a plurality of premium data received and maintained in the agency trust bank account. Accordingly, payments received under an insurance policy or premium finance agreement becomes a fiduciary fund that should be maintained separately from the agency business operating funds.

Generally, insurance policies include single location and/or multiple locations. An agency can receive the plurality of types of premium payments. For example, an agency can receive a down payment at policy inception with balance scheduled in installments. In some embodiments, an agency receives a down payment with balance financed by a premium finance company. The amount of the balance financed may be remitted directly to the insurance company or MGA and/or be paid to the producing agency. In some embodiments, an agency receives a down payment with a balance audited by the insurance company. An audited balance can include installment audits or final audits, for example.

Generally, transacted policies can be placed directly with a carrier or with an MGA. In several instances insurance coverage may be placed with a plurality of carriers or a plurality of MGAs. In such examples, a separate policy is produced for each of the plurality of carriers or each of the plurality of MGA's. Each of the plurality of policies can be subject to cancellation during the term of the policy.

Figure 8B:
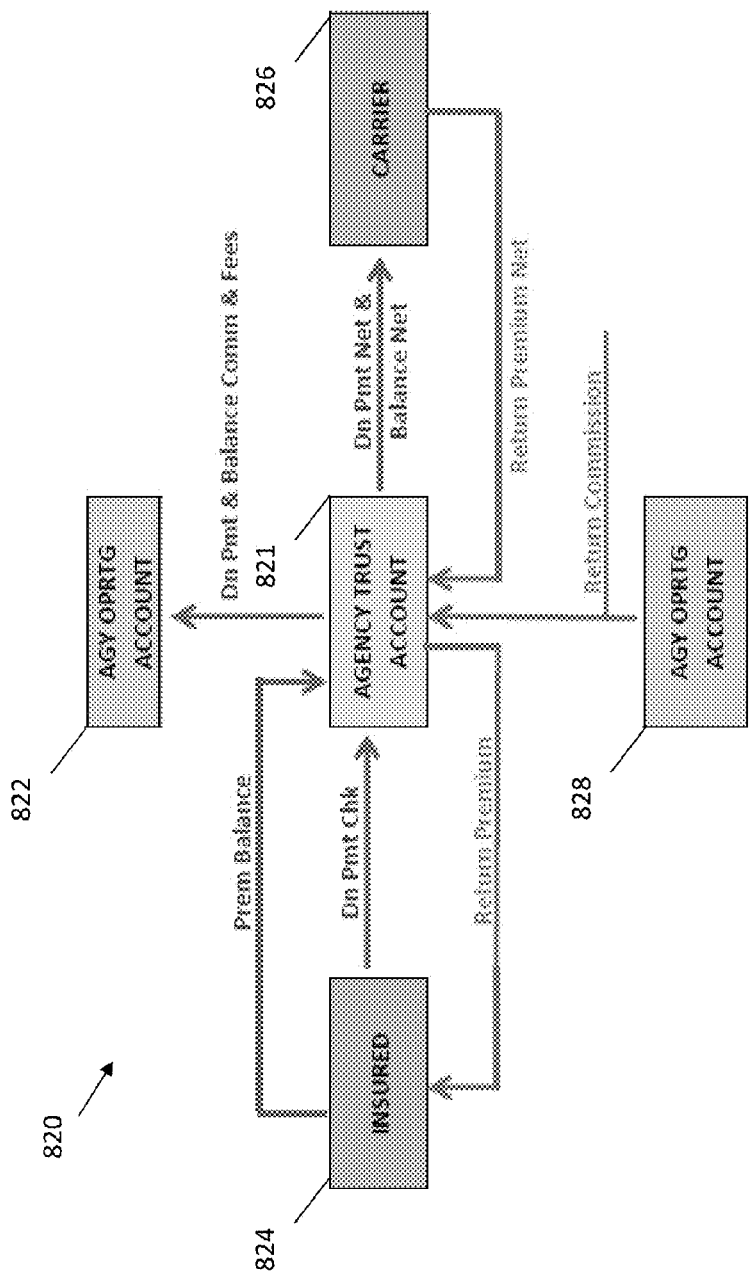
FIGS. 8B-8G are embodiments of a policy financial management according to an embodiment of the database management system.
Figure 8C:
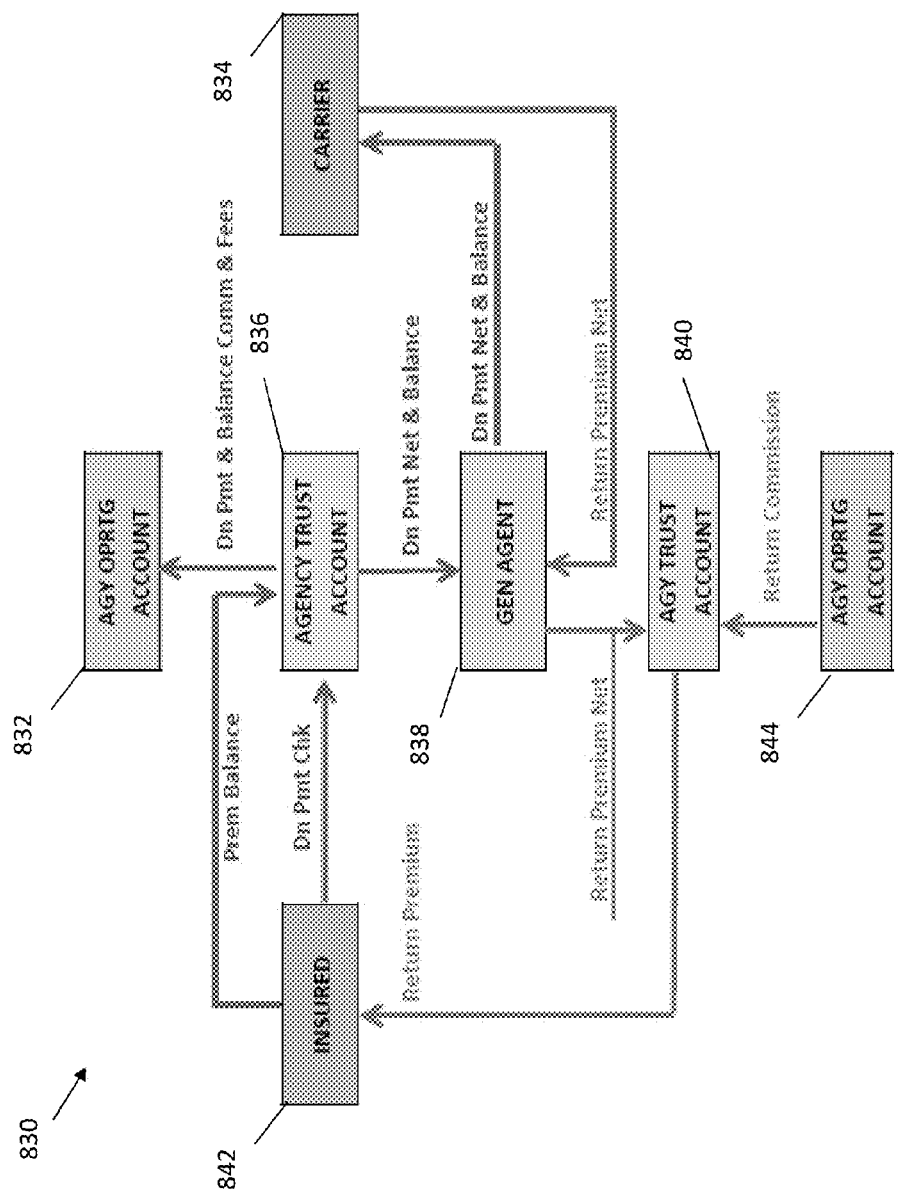
Figure 8D:
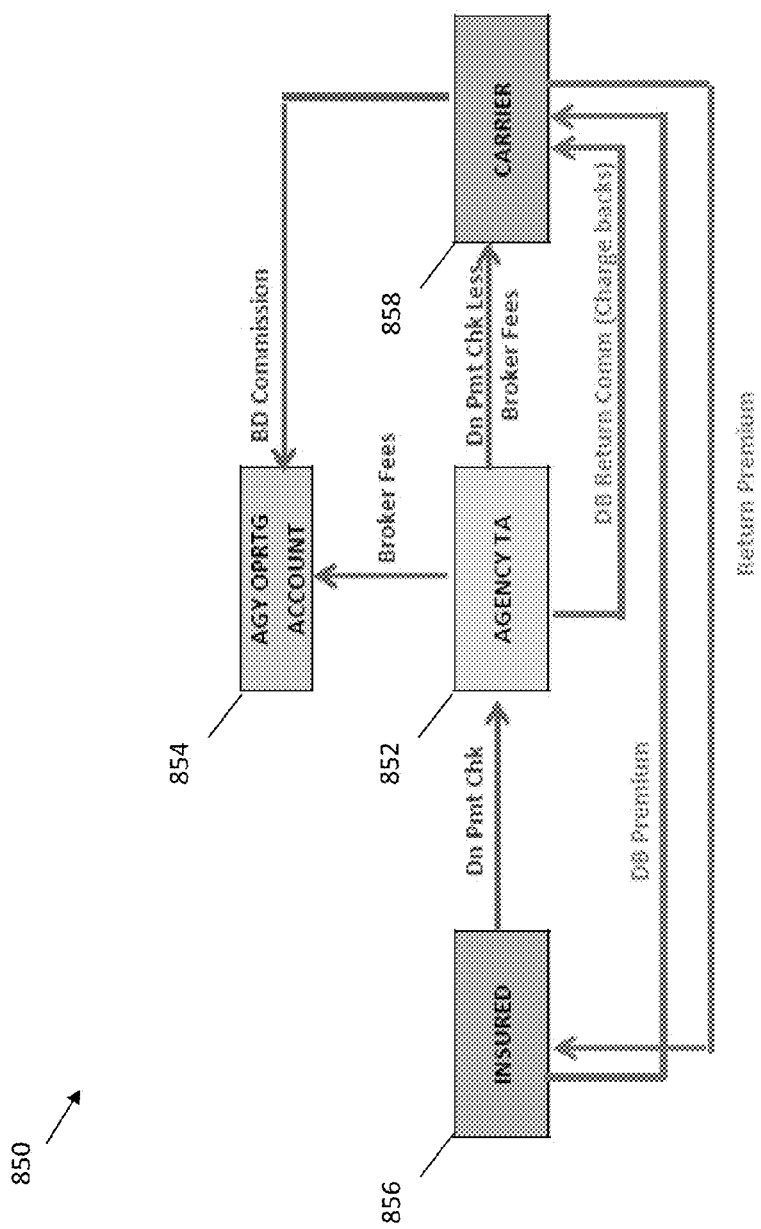
Figure 8E:
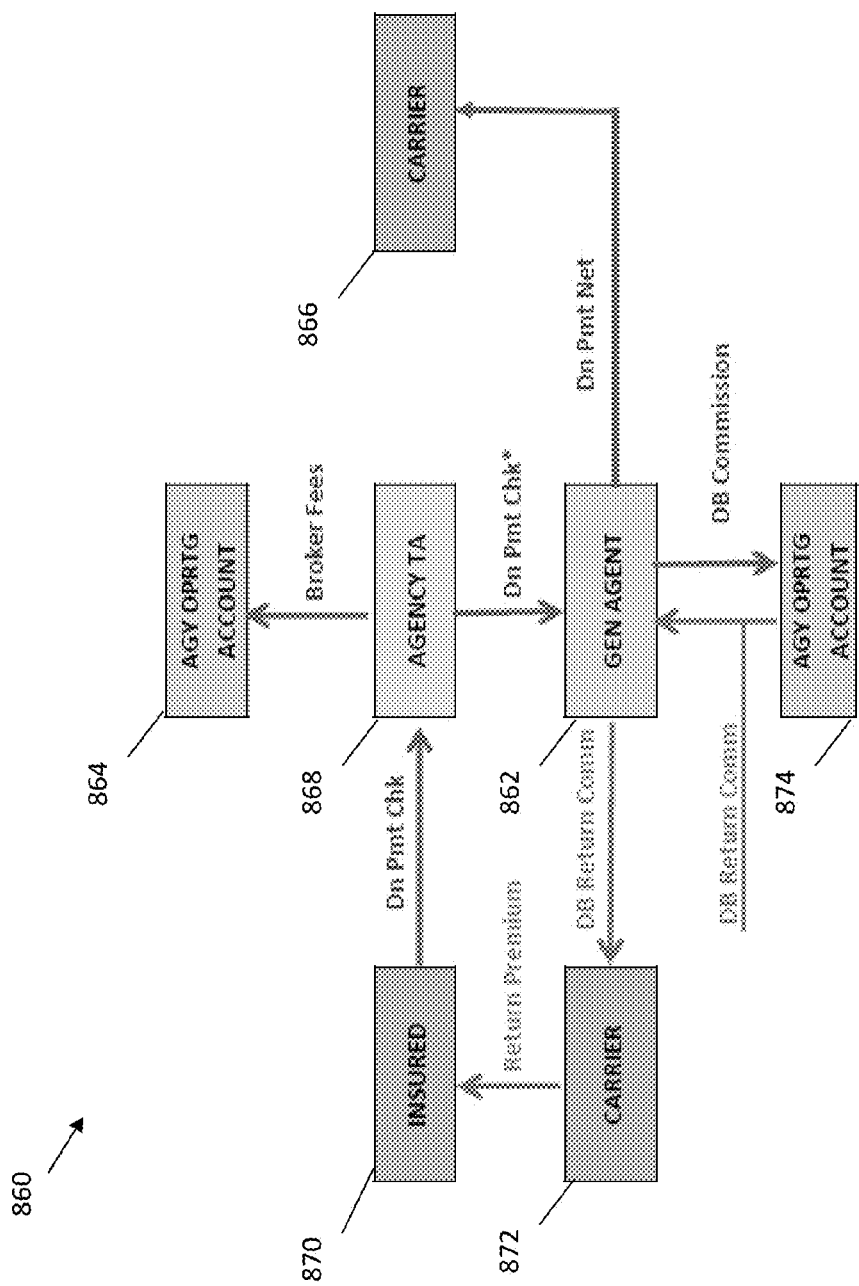

Policy financial management can include agency bill policies, such as policies placed with a carrier (see FIG. 8B) or policies placed with an MGA (see FIG. 8C), or direct bill policies, such as policies placed with a carrier (see FIG. 8D) or policies placed with an MGA (see FIG. 8E).

FIG. 8B illustrates an example of an agency bill policy 820 placed with a carrier. In this example, an agency trust account 821 receives a down payment check and a premium balance from an insured 824. The database management system 100 can store a plurality of data associated with the down payment check and the premium balance in the first database. In some embodiments, the management module can calculate a down payment and balance commission and fees based on the data stored in the first database. The database management system 100 can transfer the down payment and balance commission and fees to an agency operating account 822 (e.g. an index of the first database). In some embodiments, the management module can calculate a net down payment and net commission balance, for example. The database management system 100 can remit the net down payment and net commission balance to a carrier 826. As shown in FIG. 8B, the database management system can receive from the carrier 826 a return premium net. The database management system can store the return premium net in the first database, for example. In some embodiments, the database management system retrieves a return commission from an agency operating account 828 and stores the return commission in the first database, for example. In some embodiments, the management module can determine a return premium based on the return premium net and the return commission and can transfer the return premium to the insured 824 from the agency trust account 821.

FIG. 8C illustrates an example of an agency bill policy 830 placed with an MGA 838. In this example, an agency trust account 836 receives a down payment check and a premium balance from an insured 842. The database management system 100 can store a plurality of data associated with the down payment check and the premium balance in the first database. In some embodiments, the management module can calculate a down payment and balance commission and fees based on the data stored in the first database. The database management system 100 can transfer the down payment and balance commission and fees to an agency operating account 832 (e.g. an index of the first database). In some embodiments, the management module can calculate a net down payment and net commission balance, for example. The database management system 100 can remit the net down payment to the MGA 838. The MGA 838 can then transfer the net down payment and net commission balance to a carrier 834. As shown in FIG. 8C, the MGA 838 can receive from the carrier 834 a return premium net. In this example, the database management system can receive the return premium net from the MGA 838 and store the return premium net in the first database, for example in an agency trust account 840. In some embodiments, the database management system retrieves a return commission from an agency operating account 844 and stores the return commission in the first database, for example. In this example, the management module can determine a return premium based on the return premium net and the return commission and can transfer the return premium to the insured 842 from the agency trust account 840.

FIG. 8D illustrates an example of a direct bill policy 850 placed with a carrier 858. In this example, an agency trust account 852 receives a down payment check from an insured 856. The database management system 100 can store a plurality of data associated with the down payment check in the first database. In some embodiments, the management module can calculate a broker fee based on the data stored in the first database. The database management system 100 can transfer the broker fee to an agency operating account 854 (e.g. an index of the first database). In some embodiments, the management module can calculate a gross down payment (e.g., a down payment check less the broker fee), for example. The database management system 100 can transfer the gross down payment to the carrier 858. The agency operating account 854 can receive and store a direct bill commission from the carrier 858. As shown in FIG. 8D, the management module can calculate a direct bill return commission (e.g., a charge back), based on the down payment check and/or the direct bill commission, among other data for example. The database management system 100 can transfer the direct bill return commission to the carrier 858. At the same time or before, the carrier 858 can receive a direct bill premium directly from the insured 856. Thus, the carrier 858 can provide a return premium directly to the insured 856.

Figure 8F:
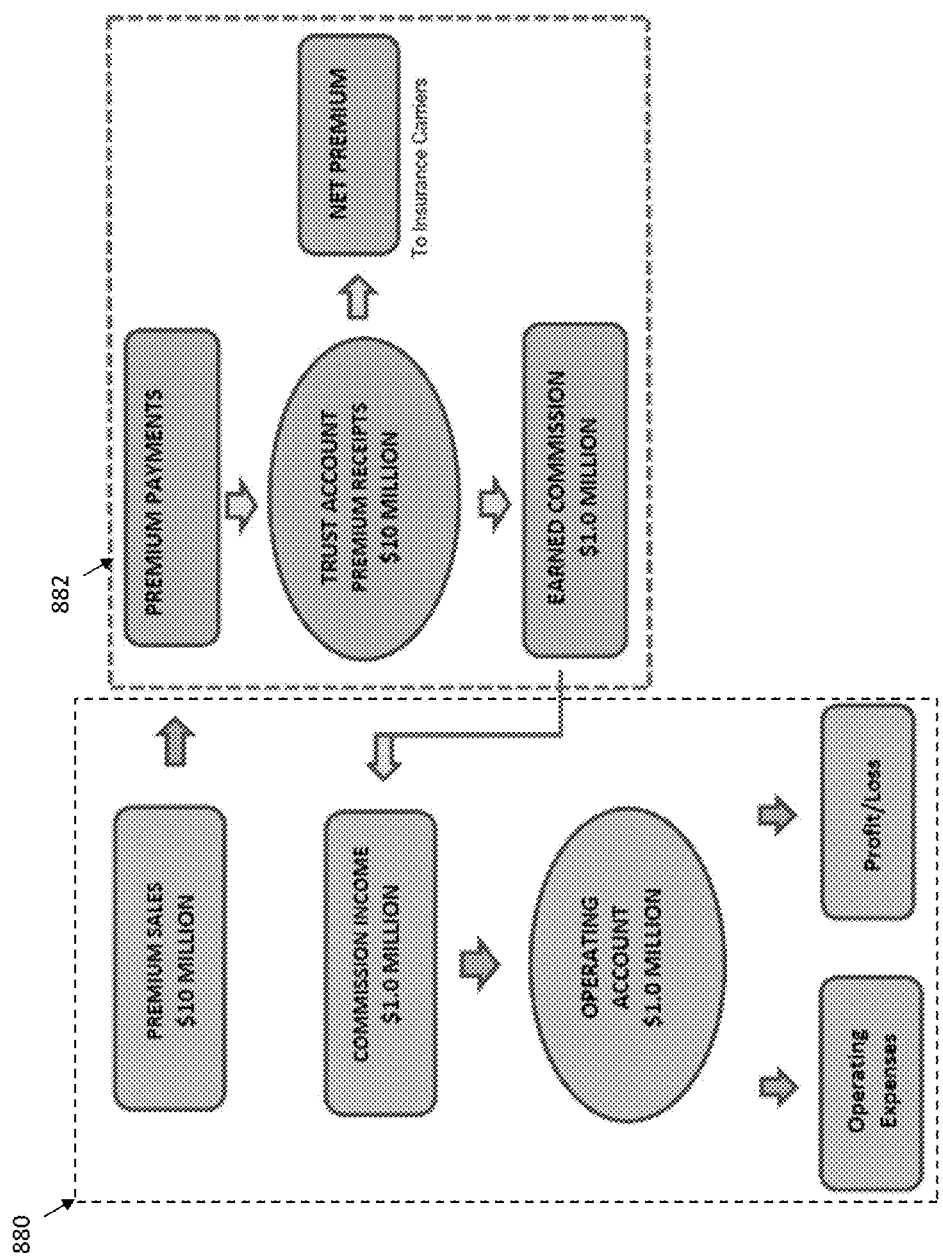

FIG. 8E illustrates an example of a direct bill policy 860 placed with an MGA 862. In this example, an agency trust account 868 receives a down payment check from an insured 870. The database management system 100 can store a plurality of data associated with the down payment check in the first database. In some embodiments, the management module can calculate a broker fee based on the data stored in the first database. The database management system 100 can transfer the broker fee to an agency operating account 864 (e.g. an index of the first database). The database management system 100 can provide the down payment check from the agency trust account 868 to an MGA 862. In this example, the MGA provides a net down payment to a carrier 866. As shown in FIG. 8F, an agency operating account 874 of the database management system 100 can receive a direct bill commission from the MGA 862. In some embodiments, the database management system 100 provides a direct bill return commission from the agency operating account 874 to the MGA 862. Upon receipt of the direct bill return commission from the database management system 100, the MGA can provide the direct bill return commission to a carrier 872, which can then provide the return premium to the insured 870.

Figure 8G:
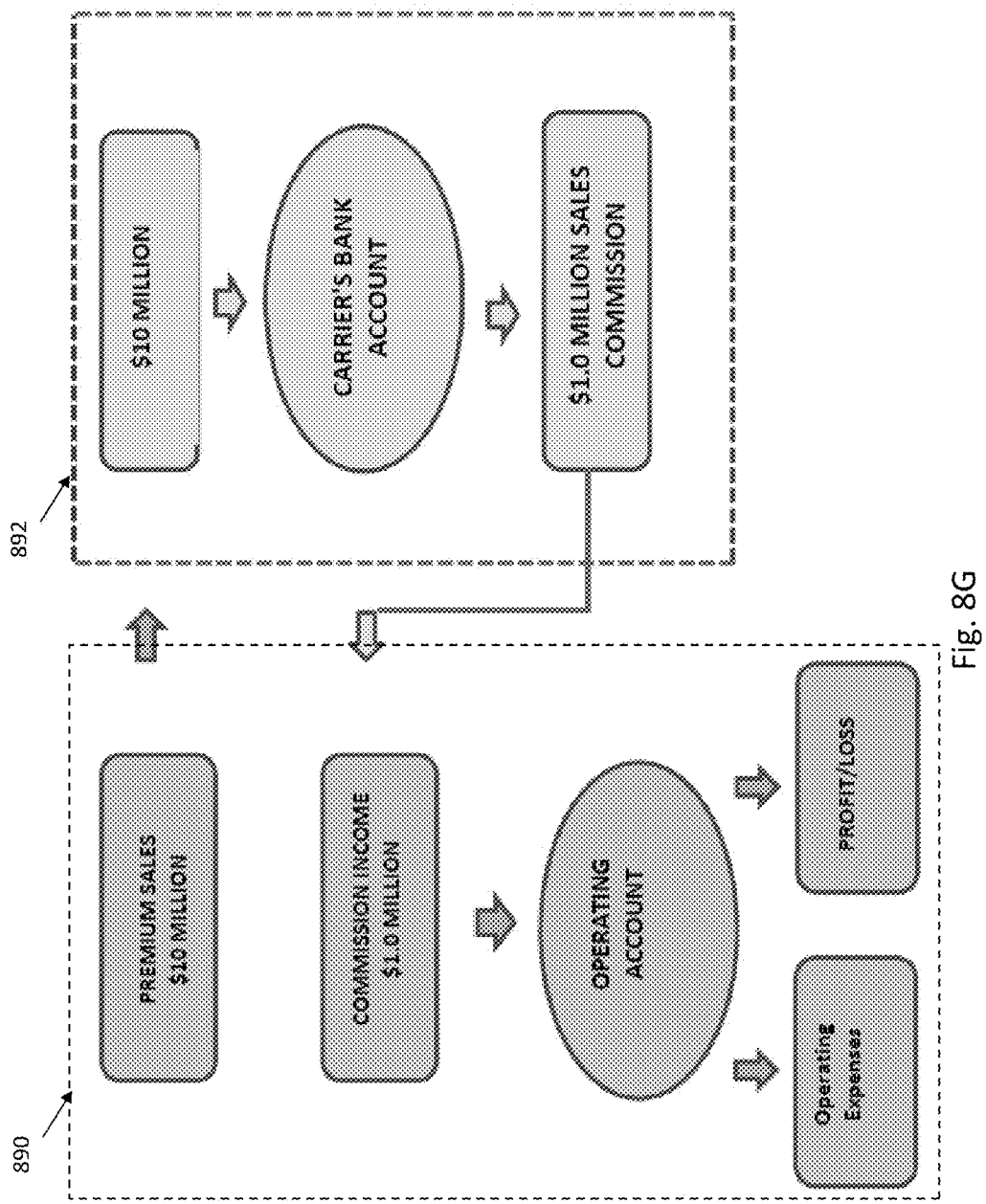

General systems and methods of insurance trust account management described herein can incorporate at least three areas of insurance policy management, including premium and endorsements receivable from customers or premium finance companies, premium remittance to carriers or MGA's, and/or agency commission payable to agency operating account. As shown in FIGS. 8F and 8G, trust account management can be separated from agency business management. Accordingly, an agency business can be separated into a plurality of operations, including sales and service operations and/or trust account operations, among others. In some embodiments, trust account operation is managed using fiduciary accounting methods described herein (e.g., trust accounting). In some embodiments, the sales and service operation is managed through conventional financial accounting methods.

As shown in FIG. 8F, a plurality of conventional financial accounting methods 880 can interact with a plurality of fiduciary accounting methods 882 in agency-bill policy examples. As shown in FIG. 8G, for example, a plurality of conventional financial accounting methods 890 can interact with a plurality of fiduciary accounting methods 892 in direct-bill policy examples.

Example User Interfaces

Figures 9A, 9B:
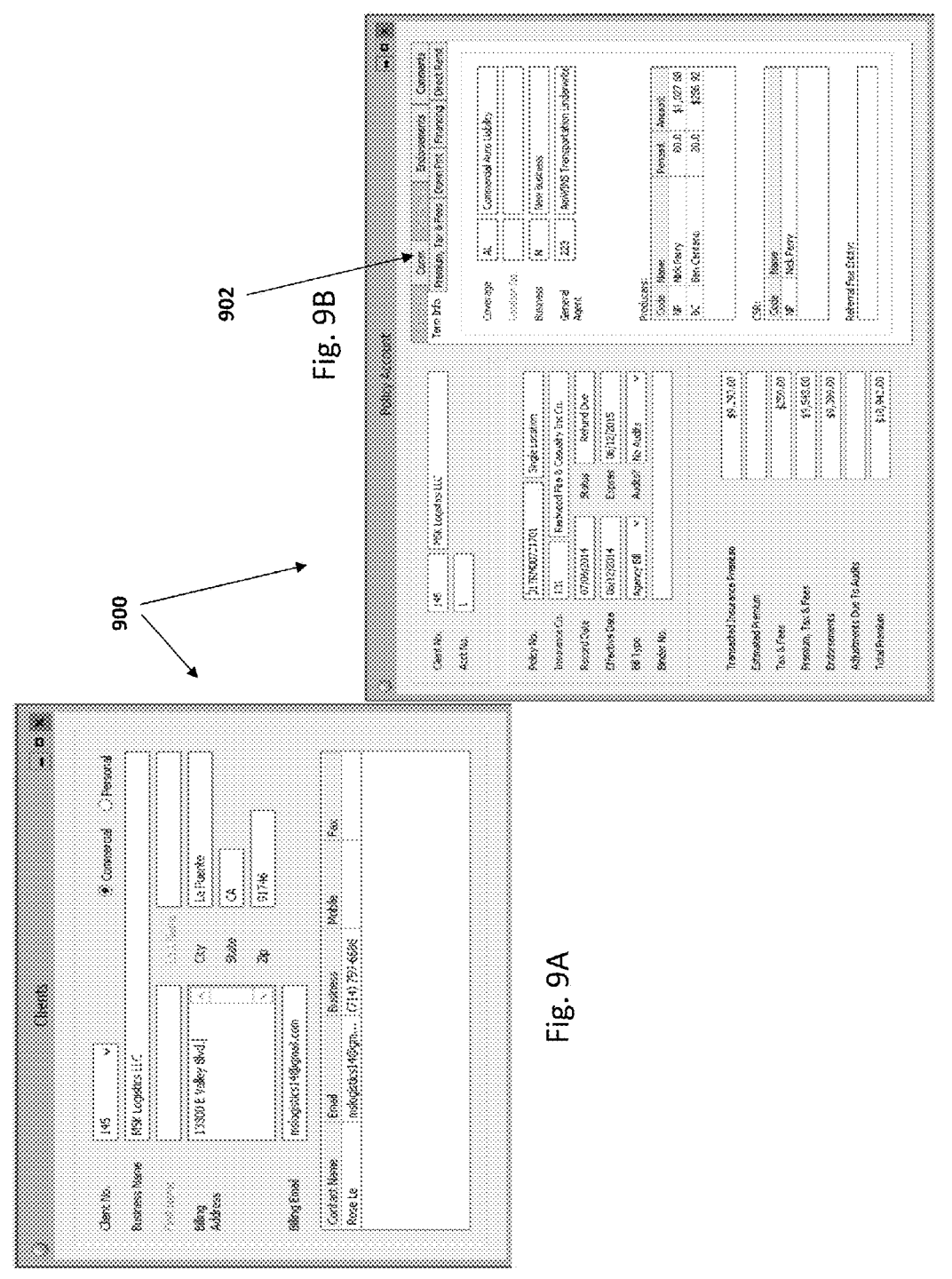

FIGS. 9A-9H illustrate example user interface configurations 900. In particular, FIGS. 9A-9H illustrate example user interface configurations 900 that can be configured to receive entered policy data. FIG. 9A illustrates an example user interface configuration 900 configured to receive policy data. As shown in FIG. 9A, a user can enter insured data in the user interface configuration 900. FIG. 9B illustrates another example of a user interface configuration 900. The user interface configuration 900 can include a plurality of tabs 902. The user can select one of the plurality of tabs 902, including a term info tab, a premium taxes and fees tab, a down payment tab, a financing tab, a commission tab, an endorsements tab, a direct remittance tab, and/or a comments tab, among others. The user interface configurations 900 can be displayed to the user by the management system upon selection of a menu option.

As shown in the illustrated example, a user can enter policy non-premium data, for example, such as insurance company, policy number and/or term, among others. In some embodiments, a status is automatically populated by the management module. The status can indicate when the insured is due a premium refund. For example, in the illustrated embodiment, the insured is due a premium refund which is yet to be processed. In some embodiments, the management module can automatically display premium data, including an initial premium and/or related endorsements, among others. In this example, the management module 106 can automatically retrieve symbolic data from the second database index 160 of the second database and populate the symbolic data in the user interface configurations 900. In some examples, the first database query system 190 can retrieve physical data and/or symbolic data from one of the plurality of indexes of the first database and display the data in the user interface configuration 900.

FIG. 9C illustrates an example user interface configuration 900 which displays the premium taxes and fees tab 900A of the user interface configuration 900. In this example, a user can enter the policy premium and fees into the premium taxes and fees tab 902A. As shown in the illustrated example, a $250 broker fee has been entered, and no fees have been charged by the insurance company on this policy. In some embodiments, a referral fee is entered and/or automatically populated in the user interface configuration 900.

FIG. 9D illustrates an example user interface configuration 900 which displays the down payment tab 902B of the user interface configuration 900. In this example, a policy required down payment is entered in the down payment tab 902B. In this example, based on the down payment amount entered in the down payment tab 902B and related data entered in the user interface configurations 900, the management module calculates a premium balance and displays the premium balance in the down payment tab 900B. As shown, the premium balance is financed. In some embodiments, the down payment tab 900B automatically displays to the user whether the down payment was received. Some embodiments of the user interface configuration 900 can include disabled prompts. The disabled prompts can automatically be disabled and/or greyed to prevent the user from entering in specific data. In this example, the disabled prompts apply to Direct Bill policies.

Figures 9E, 9F:
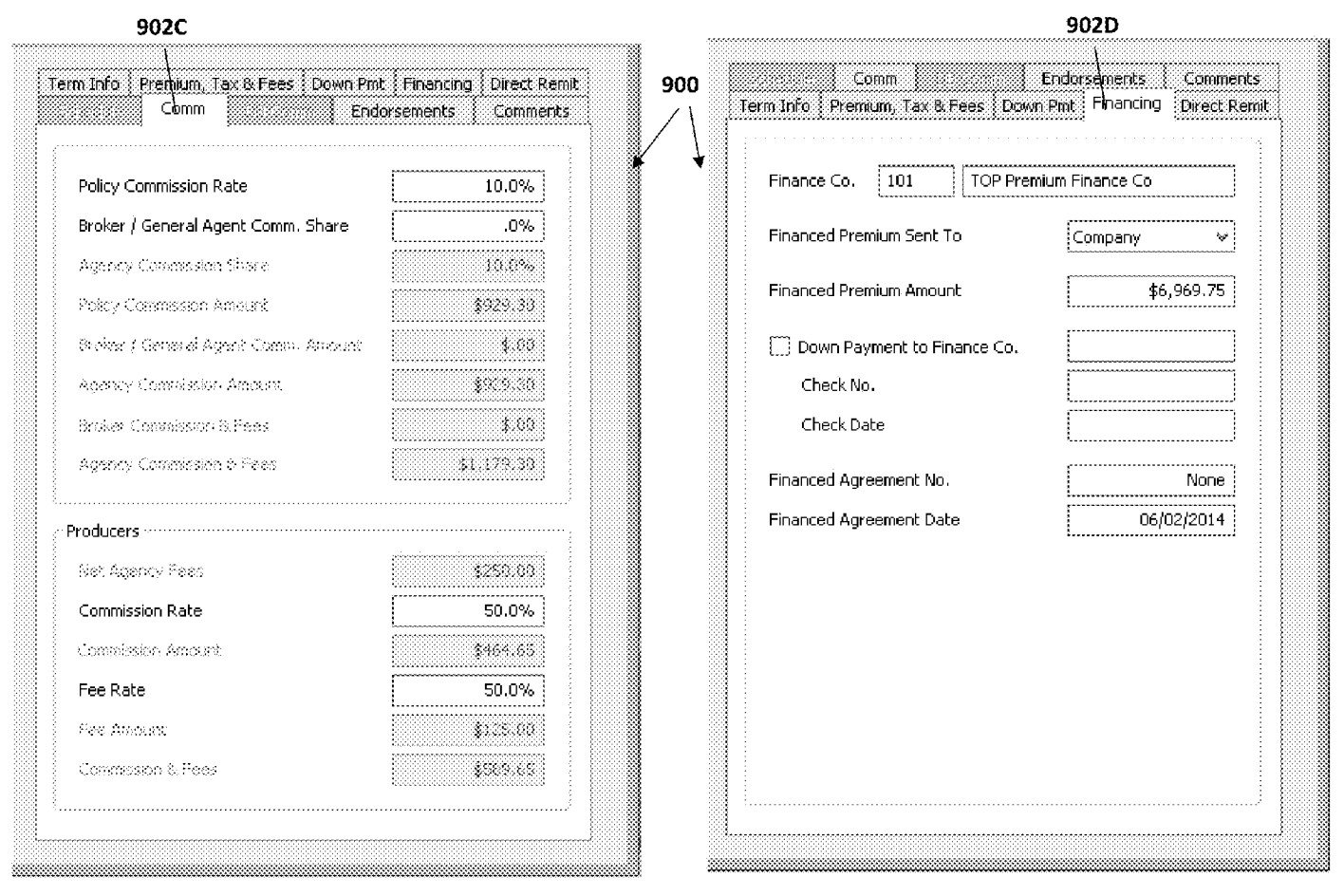

FIG. 9E illustrates an example user interface configuration 900 which displays a policy commission tab 902C. In this example a user can enter a policy commission rate in the policy commission tab 902C. When the data is entered, the first database query system can store the data in an appropriate index and/or location. In this example, the user can enter commission shared with outside brokers in the policy commission tab 902C (e.g., in this example, the commission share is 0%). Producer commission and fees can also be entered in the policy commission tab 902C and can be indicated by a percentage of the agency commission.

FIG. 9F illustrates an example user interface configuration 900 which displays a financing tab 902D. In this example, a user can enter a plurality of premium financing data in the financing tab 902D. As shown in FIG. 9F, a user can enter a company name and financing agreement data, among other data. In this example, a financed amount is to be directly remitted to the insurance company and a financed premium amount is defaulted. In some embodiments, a down payment by the agency to the finance company may be necessary. However, no down payment by the agency to the finance company is required in this example.

Figures 9G, 9H:
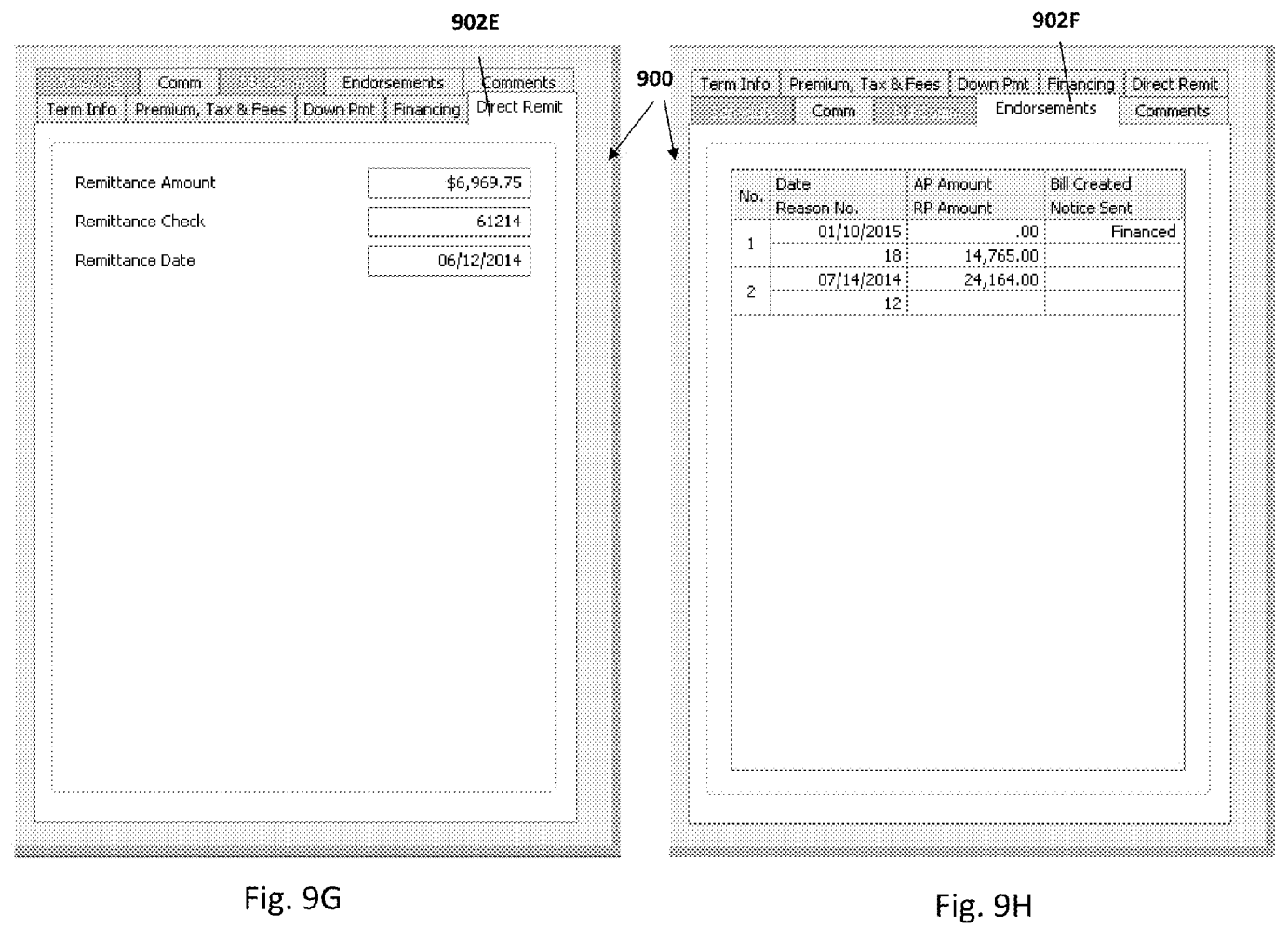

FIG. 9G illustrates an example user interface configuration 900 which displays a direct remittance tab 902E. in this example, a user can enter a plurality of direct remittance data in the direct remittance tab 902E. As shown in the direct remittance tab 902E, a remittance amount is defaulted. In this example, a user can enter a remittance check and/or a remittance check date.

FIG. 9H illustrates an example user interface configuration 900 which displays an endorsements tab 902F. the endorsements tab 902F can indicate to the user the number of endorsements records associated with a particular policy account. For example, the illustrated embodiment indicates that there are two endorsement records in the policy amount, including an endorsement RP of $14,765 and an endorsement AP of $24,164.

FIGS. 10A-10G illustrate example user interface configurations 1000. For example user interface configurations 1000 illustrate a user interface in which a user can enter endorsement data. In some embodiments, after the endorsement data is entered by the user, the first database query system can assign a first database identifier to the endorsement data and store the endorsement data in an index of the first database. Endorsement data can include additional premium data ("AP" data) and/or reduction of premium data ("RP" data).

FIG. 10A illustrates an embodiment of an endorsement AP data user interface 1000A. The AP data user interface 1000A can include a plurality of tabs. Each of the tabs can be selected by the user to input various other data, including data relating to a down payment, commissions, financing, and/or comments, among others. In the illustrated example, a plurality of policy data 1001, including an insured's name, a policy number, and/or the like can be entered on one side. Similarly, a plurality of endorsement data 1002, including an endorsement number, an endorsement date, and/or the like can be entered on one side of the AP data user interface 1000A. In some embodiments, when the plurality of endorsement data is entered into the AP data user interface 1000A, the first database query system automatically populates and displays an endorsement premium data 1004, including an endorsement gross premium, tax and fees, premium tax and fees, an endorsement net premium, an endorsement commission and fees, and/or the like.

Similar to other user interface configurations described herein (including FIGS. 9A-9H), in some embodiments, when a user enters one or more data records in one of the plurality of the endorsement AP data user interface 1000A configurations, the first database query system stores the entered data records in an index of the first database and assigns the data record a first database identifier. In some embodiments when certain entered data is stored in the first database 102, the management module 106 will convert the entered data stored in the first database into symbolic data according to methods described herein and assign the symbolic data a second database identifier. Based on the second database identifier, the management module 106 of the second database can store the symbolic data in the second database index 160. The symbolic data can be presented and/or otherwise displayed automatically in the AP data user interface 1000A.

In some embodiments, endorsement premium and fee data can be entered in the premium tax and fees tab. In the illustrated embodiment, a broker fee is automatically added to the AP data user interface 1000A by the first database query system. As shown in example illustrated in FIG. 10A, no policy fees are charged by the insurance company.

FIG. 10B illustrates a down payment tab 1000B of the AP data user interface 1000A. As shown in the illustrated embodiment, the endorsement is premium financed. In other words, the endorsement requires a down payment in this example. The database management system 100 can calculate and/or display a down payment net of commission and commission amount in the down payment tab 1000B. In some embodiments, the user enters an endorsement premium. When the user enters an endorsement premium, the fees are defaulted. Based on the endorsement premium and fees, the first database query system and/or the management module can calculate and/or display a total endorsement amount in the down payment tab 1000B.

FIG. 10C illustrates a commissions tab 1000C of the AP data user interface 1000A. In the illustrated example, a user enters an endorsement commission rate of 10% and a commission share rate with an outside broker (e.g., $0 in the illustrated example). The management module can calculate and/or display an agency commission share in the commission tab 1000C, which in the illustrated example is 10%. In some embodiments, the management module can calculate and/or display a commission amount, which in the illustrated example is $2,366.40. In some embodiments, the management module can calculate and/or display an agency commission and broker fee, which in the illustrated example is $2,866.40 (e.g., the commission amount+$500). In the illustrated example, a producer commission and a producer fee is defaulted to 25% of the agency commission. Based on the data calculated and/or displayed in the commissions tab 1000C, the management module can calculate and/or display a total producer commission and fee on the endorsement.

FIG. 10D illustrates a financing tab 1000D of the AP data user interface 1000A. In the illustrated example, a user enters a plurality of endorsement premium financing data in the financing tab 1000D. In this example, the user enters a financed amount and a plurality of finance agreement data in the financing tab 1000D. As shown in FIG. 10D, the financed amount is defaulted to $18,931.20.

Figure 10E:
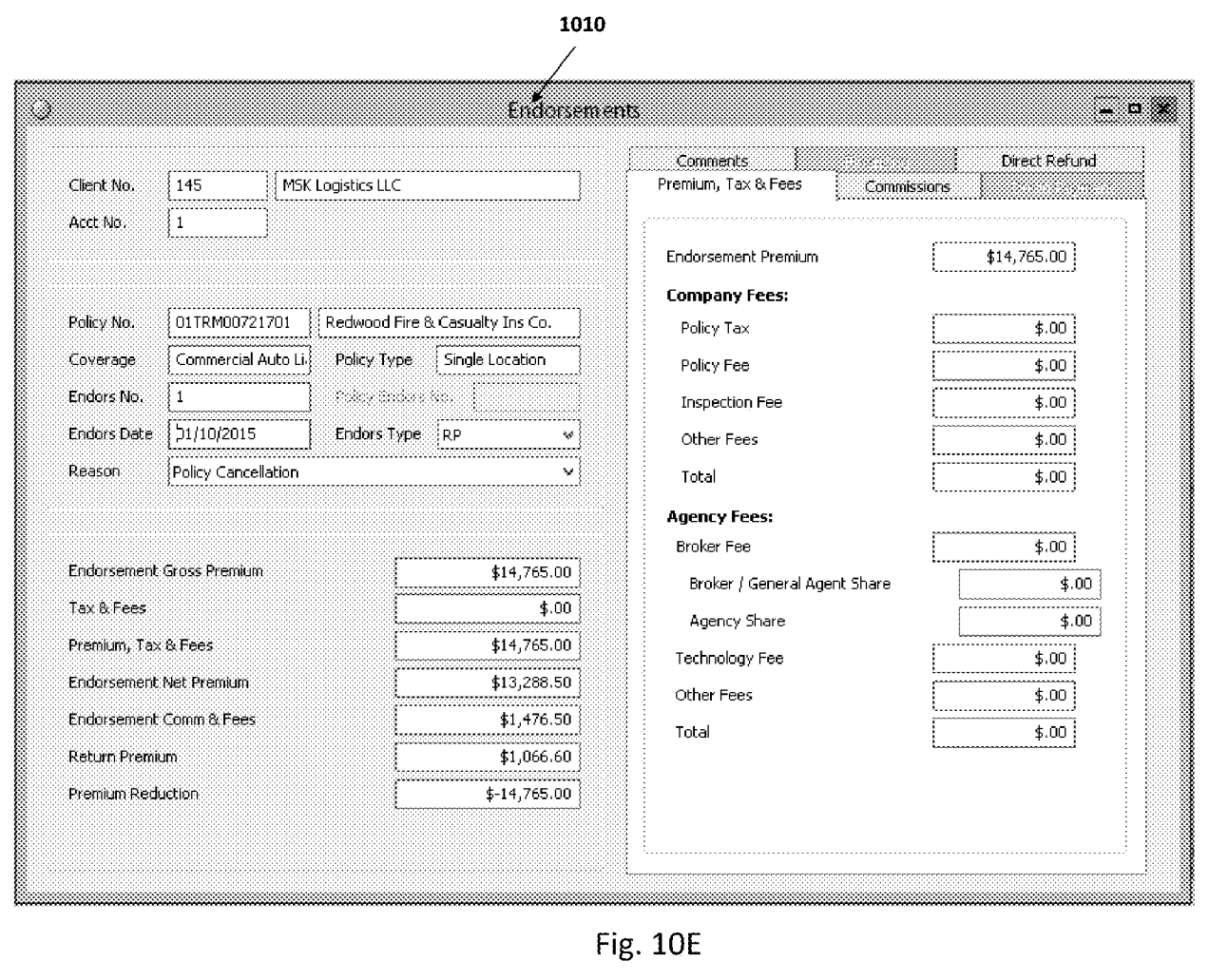

FIGS. 10E-10G illustrate an embodiment of an endorsement RP data user interface 1010. The endorsement RP data user interface 1010 can include a plurality of endorsement RP data that is entered by a user and/or calculated by the management module. In some embodiments, the endorsement RP data user interface 1010 includes many of the same features of the AP data user interface 1000A.

In the trust insurance accounting industry, retailing agencies can transacted a plurality of policy transactions, including a plurality of installment premium policies, a plurality of financed premium policies, a plurality of audit premium policies, a plurality of direct bill premium policies, and/or a plurality of multiple locations policies, among other policies. The plurality of finance premium policies can include policies with a financed amount remitted directly to carriers or MGA's. In some embodiments, the plurality of finance premium policies can include policies with a financed amount paid to producer agencies.

In some embodiments, each of the plurality of policy transactions includes one of a plurality of management systems. In some embodiments each of the plurality of policy transactions is operated by the same management system. Each of the plurality of policy transactions can be operated through premium payments and bank deposits in a trust bank account, a commission earning, a company remittance, and/or endorsements, for example.

Generally, an insurance policy premium may be adjusted through a plurality of endorsements data. As discussed above, the plurality of endorsement data can include a plurality of AP data and/or a plurality of RP data. In some embodiments, RP data includes cancellation endorsements, which may result in a return premium.

Figure 10H:
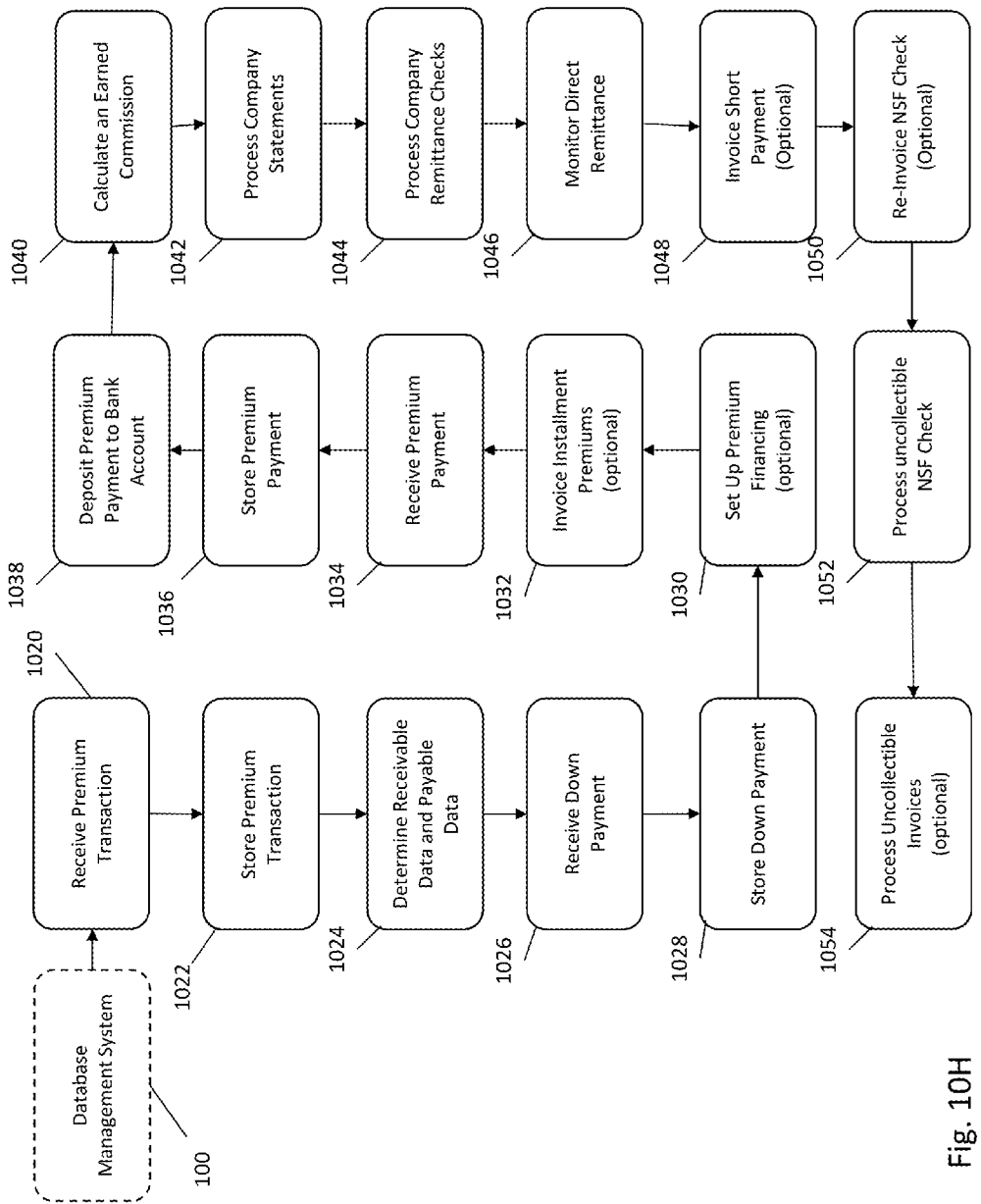
FIGS. 10H-10J are example operating procedures of the database management system.

Insurance agency generally performs a plurality of daily operations in order to track, monitor, and/or otherwise manage a policy premium. For example, FIG. 10H illustrates an embodiment of a method of daily operations that can be performed at least in part by the database management system 100. For example, at block 1020, the database management system 100 can be configured to receive a plurality of premium transaction data, including an associated sales commission. At block 1022, the database management system 100 can store the premium transaction data in one of the plurality of the first database indexes of the first database. At block 1024, the management database system 100 determines and/or calculates receivables data and/or payables data associated with the premium transaction data. At block 1026, the database management system 100 receives a down payment from a user. At this stage, the customer may or may not be invoiced. At block 1028, the database management system 100 can store the down payment received from the user in one of the plurality of first database indexes of the first database.

At block 1030, the database management system 100 can optionally set up premium financing. At block 1032, the database management system 100 can optionally invoice installment premiums. If a payment is delinquent, the agency can follow up on delinquent payments. In some embodiments, the first database can maintain or store records of at least three invoice follow-ups on delinquent invoices. For example, the first database can store a follow-up before the premium due date, one day after the due date and/or after a delinquent invoice payment is received, among other times. At block 1034, the database management system 100 receives premium payment data, including installment premium or financed amount payments. At block 1036, the database management system 100 can store the premium payment data in one of the plurality of first database indexes of the first database. At block 1038, the premium payments can be deposited and/or transferred to the trust bank account. At block 1040, the database management system 100 can calculate an earned commission upon bank deposit. The database management system 100 can report the earned commission for commission transfer to an agency business operating account and/or an agency commission reserve account.

At block 1042, the database management system 100 can process company statements based on the plurality of premium transaction data and/or the earned commission, among other data. At block 1044, the database management system 100 can prepare remittance check vouchers and enter remittance checks to carriers. In some embodiments, the database management system 100 can process MGAs invoices and remittance check vouchers and/or enter remittance checks to MGAs. At block 1046, the database management system 100 can monitor direct remittance provided to carriers and/or direct remittance provided to MGAs of financed premium amounts. At block 1048, the database management system can optionally invoice short payments if the system determines a short payment exists. At block 1050, the database management system 100 can re-invoice NSF checks. At block 1052, the database management system can process and/or alert the user of uncollectible NSF checks to recover the loss from an agency commission reserve. At block 1054, the database management system can optionally process and/or alert the user of uncollectible NSF invoices to recover the loss from the agency commission reserve.

Figure 10I:
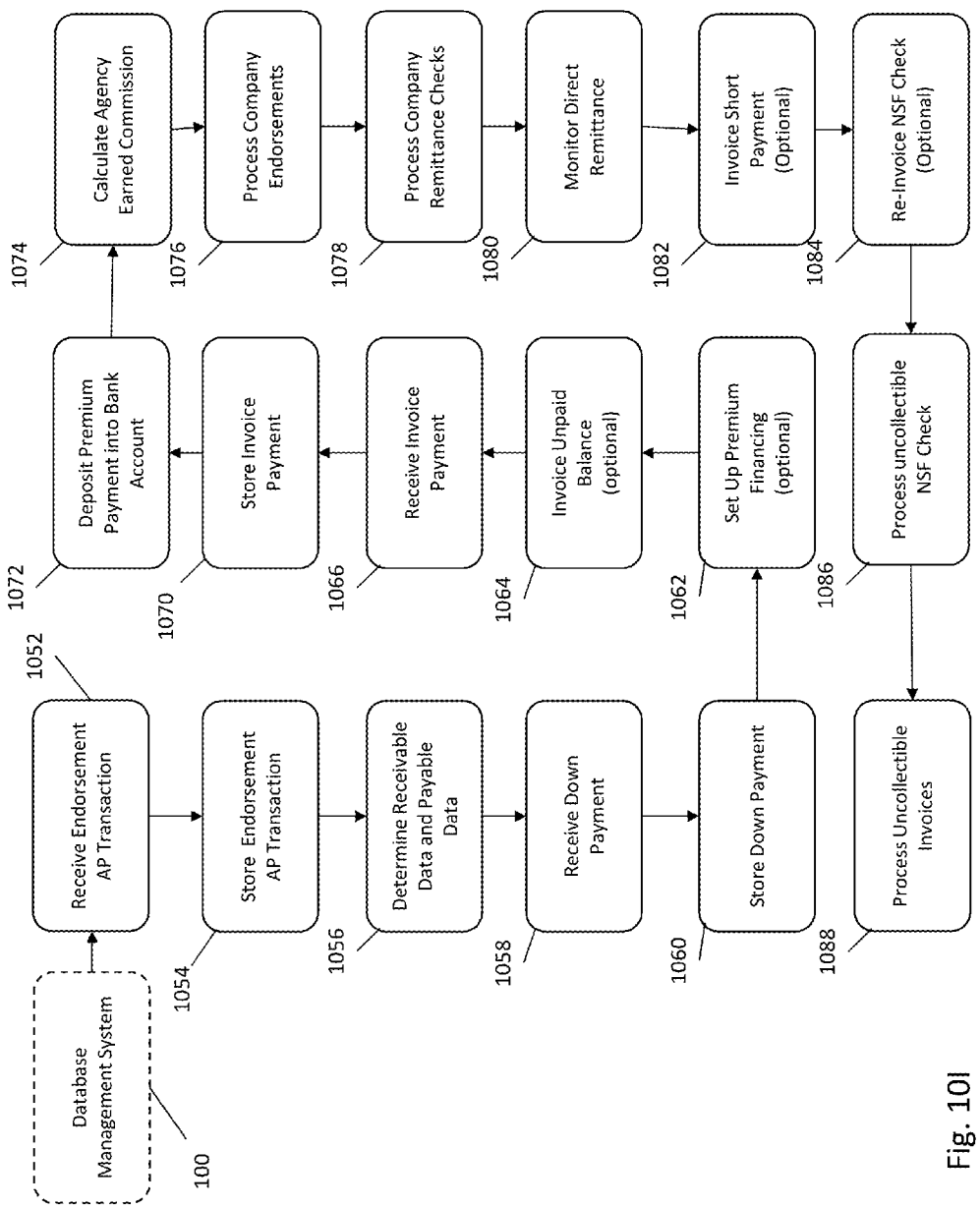

FIG. 10I illustrates an embodiment of a method of processing endorsement AP Premium transactions that can be performed at least in part by the database management system 100. For example, at block 1052, the database management system 100 can be configured to receive a plurality of endorsement premium transaction data, including an associated sales commission. At block 1054, the database management system 100 can store the endorsement premium transaction data in one of the plurality of the first database indexes of the first database. At block 1056, the management database system 100 determines and/or calculates receivables data and/or payables data associated with the premium transaction data. At block 1058, the database management system 100 receives a down payment from a user. At this stage, the customer may or may not be invoiced. At block 1060, the database management system 100 can store the down payment received from the user in one of the plurality of first database indexes of the first database.

At block 1062, the database management system 100 can optionally set up premium financing. At block 1064, the database management system 100 can optionally invoice unpaid balances. If a payment is delinquent, the agency can follow up on delinquent payments. The unpaid balance can be included in a plurality of remaining unpaid installments. At block 1066, the database management system 100 receives invoice payment data, including installment premium or financed amount payments. At block 1070, the database management system 100 can store the invoice payment data in one of the plurality of first database indexes. At block 1072, the premium payments can be deposited and/or transferred to the trust bank account. At block 1074, the database management system 100 can calculate an earned commission upon bank deposit. The database management system 100 can report the earned commission for commission transfer to an agency business operating account and/or an agency commission reserve account.

At block 1076, the database management system 100 can process a plurality of endorsements based on the plurality of premium transaction data and/or the earned commission, among other data included in company statements. At block 1078, the database management system 100 can process MGAs invoices and remittance check vouchers and/or enter remittance checks to MGAs. At block 1080, the database management system 100 can monitor direct remittance provided to carriers and/or direct remittance provided to MGAs of financed premium amounts. At block 1082, the database management system can optionally invoice short payments if the system determines a short payment exists. At block 1084, the database management system 100 can optionally re-invoice NSF checks. At block 1086, the database management system can process and/or alert the user of uncollectible NSF checks to recover the loss from an agency commission reserve. At block 1088, the database management system can optionally process and/or alert the user of uncollectible NSF invoices to recover the loss from the agency commission reserve.

Figure 10J:
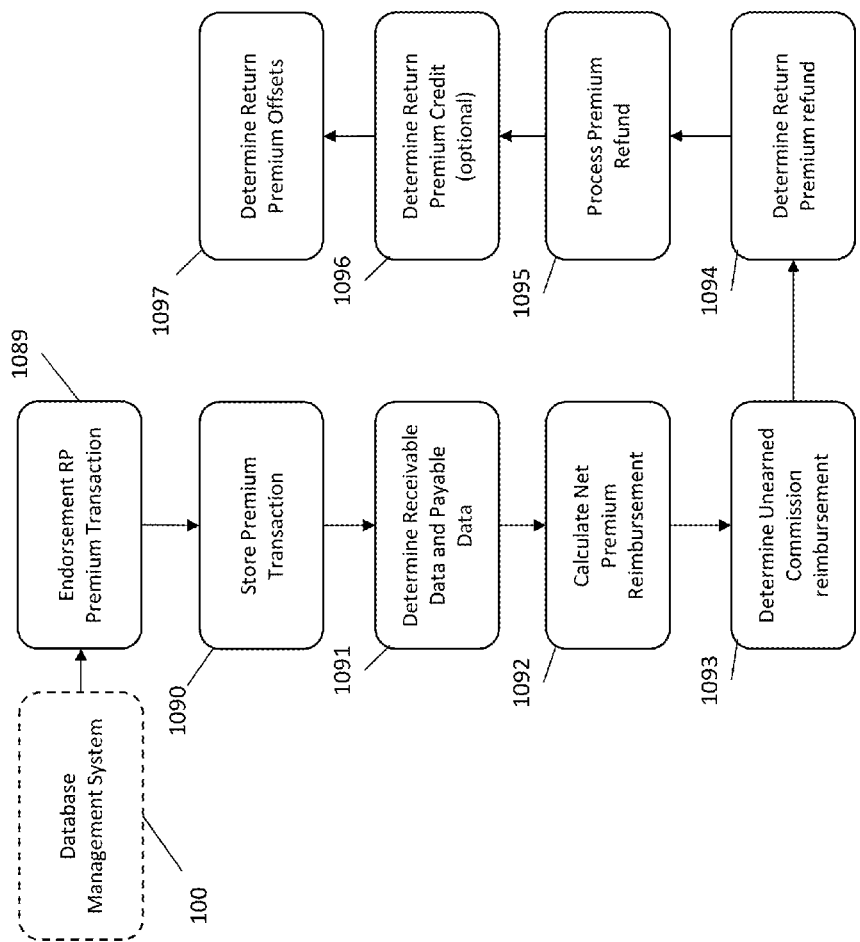

FIG. 10J illustrates an embodiment of a method of processing RP Premium transactions that can be performed at least in part by the database management system 100. For example, at block 1089, the database management system 100 can be configured to process a plurality of endorsement RP premium transaction data, including an associated sales commission. At block 1090, the database management system 100 can store the premium transaction data in one of the plurality of the first database indexes of the first database. At block 1091, the management database system 100 determines and/or calculates receivables data and/or payables data associated with the premium transaction data.

At block 1092, the management module can calculate a net premium reimbursement based on at least the plurality of premium transaction data stored in the first database. The net premium reimbursement includes cash and/or credit. At block 1093, the database management module can determine an unearned commission reimbursement based on at least the plurality of premium transaction data stored in the first database. The unearned commission reimbursement can include cash or credit from the agency commission reserve. At block 1094, the management module can determine a premium refund based on at least the plurality of transaction data stored in the first database. The return premium refund can include cash or credit to an insured and/or a premium finance company. At block 1095, the database management system 100 can process premium refund checks. At block 1096 the database management system 100 can optionally determine a return premium credit and/or a return premium undo credit. At block 1097, the database management system 100 can determine one or more return premium offsets to a plurality of premium transaction data received from an insured's second policy. Advantageously the database management system 100 can easily and cost-effectively manage insurance premium and return premium refunds, for example. Thus, the database management system 100 can help a user to maintain insurance premium and return premium refunds according to certain laws and mandates.

Example First Database Reports and User Interfaces

In some embodiments, the first database 102 of the database management system 100 can include a first database query system 190. The first database query system 190 can be configured to select, retrieve, and/or calculate data stored on the first database. In some embodiments the first database query system 190 can select, retrieve, and/or calculate data stored on second database 160. Based on the data that is stored in the first database 102 and/or the second database 104, first database query system 190 can generate a plurality of data management reports be grouped by their content for example to a plurality of report groups. In some embodiments, the plurality of report groups can include an account details report group, an audits report group, a bank deposits report group, the billing report group clients and policies report group and agency commission income report group, a producers commission income report group, a DB commission report group, a daily premium payments report group, a financed premium report group, a personal funds report group, a production report, a group remittance report group, and/or a return premium report group, among others. Each report group of the plurality of report groups can include a plurality of data management reports.

Figures 11A, 11B:
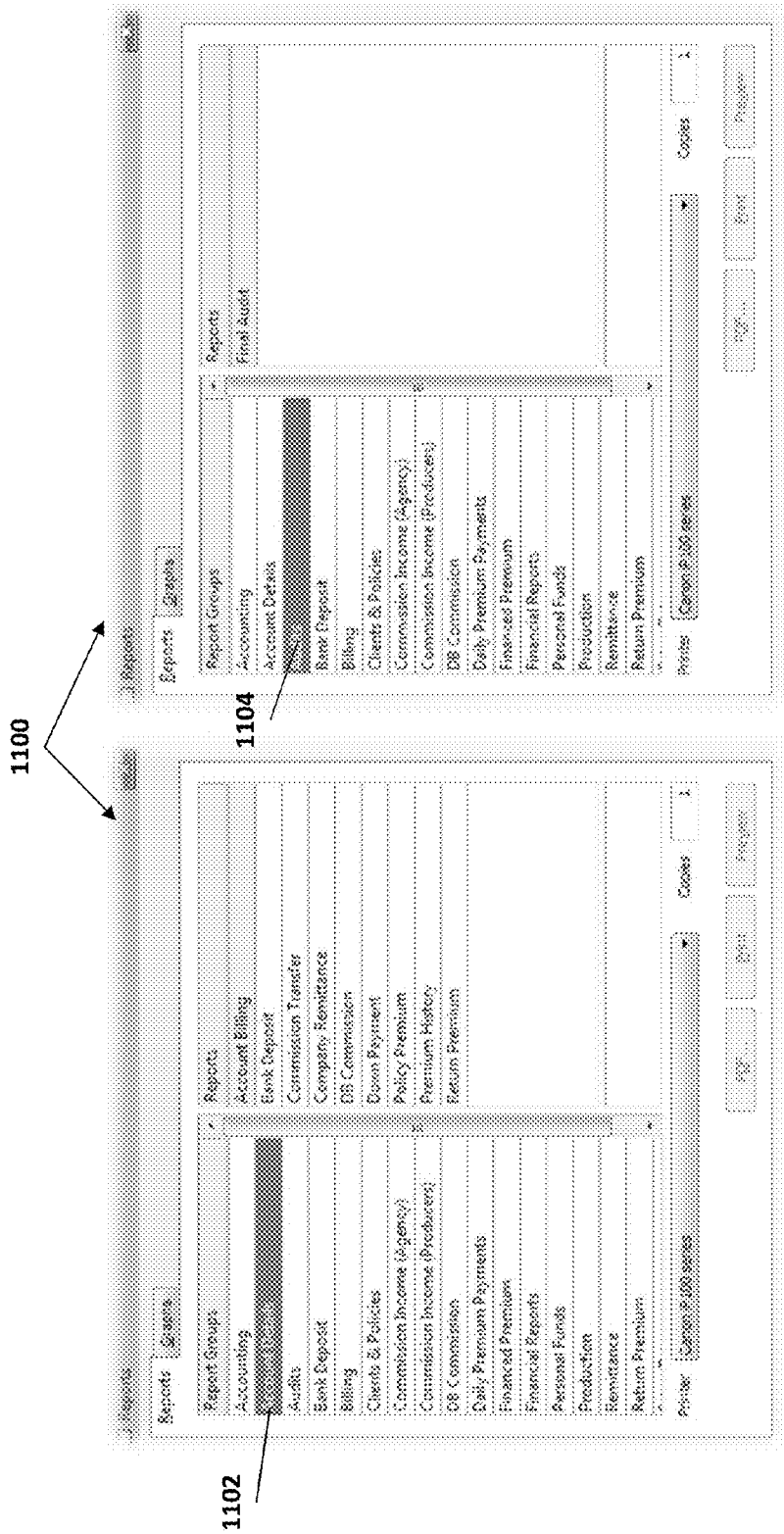

As shown in FIG. 11A, selection of the account details report group 1102 can provide data for each of the customer's policies. Each of the report groups can be displayed in a user interface 1100 and can be configured to be selected by a user. For example, the account details report group can include a plurality of data management reports showing invoices, payments, bank deposits, an agency commission, a company's DB commission and/or return premium, among others. In some embodiments, the first database query system 190 can generate the data management reports of the account details report group 1102 for each policy and/or for a plurality of policies.

As shown in FIG. 11B, selection of the audits report group 1104 can cause the first database query system to generate a plurality of data management reports, including a final audit. In some embodiments, the first database query system 190 can generate the data management reports of the audits report group 1104 for each policy and/or for a plurality of policies.

Figures 11C, 11D:
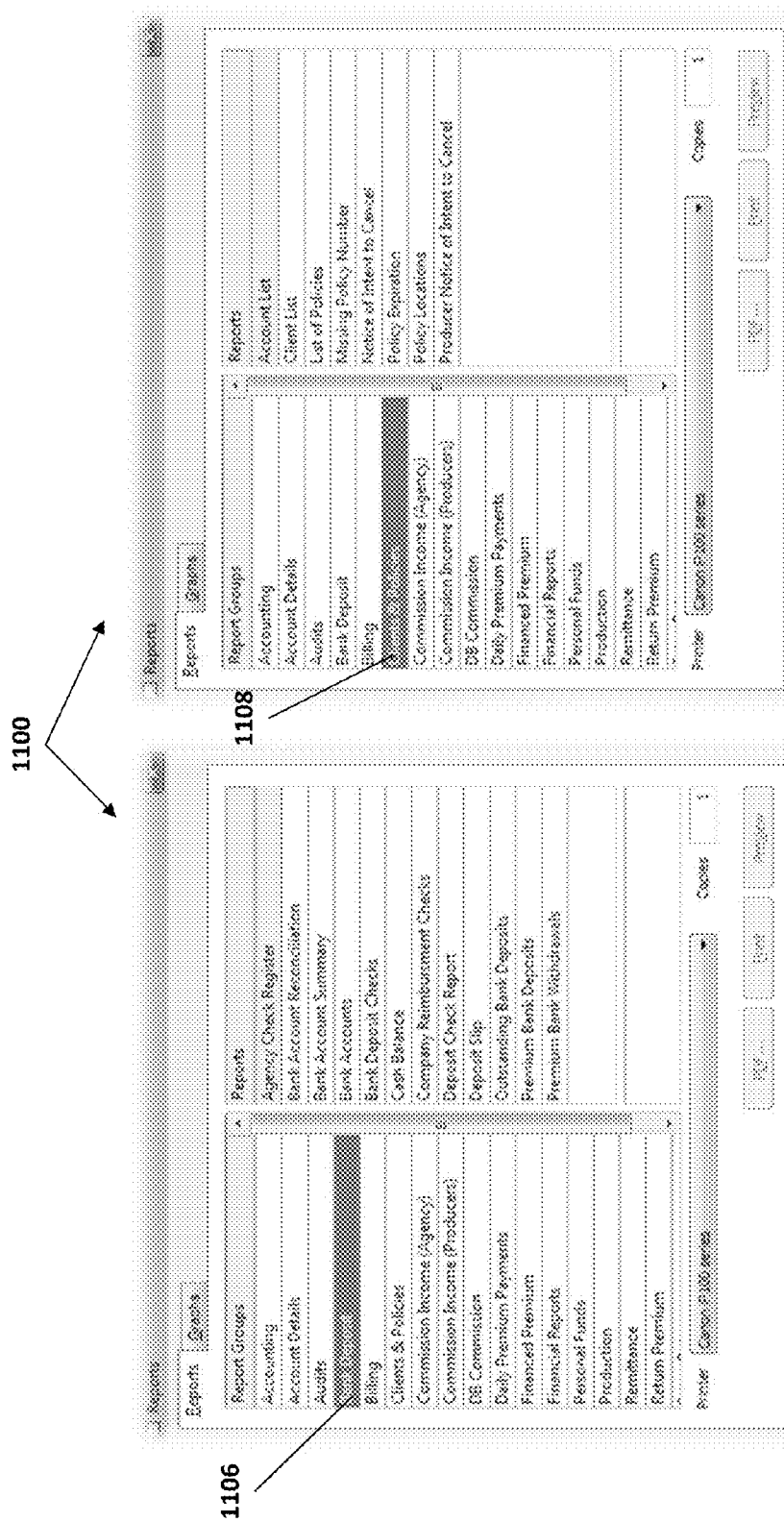

As shown in FIG. 11C, selection of the bank deposits report group 1106 can cause the first database query system 190 to generate a plurality of data management reports, including a cash balance, deposits & withdrawals, bank account reconciliation, and/or copies of bank deposit slips. In some embodiments, the first database query system 190 can generate the data management reports of the bank deposits report group 1106 for each account and/or for a plurality of accounts. In some embodiments, the first database query system 190 generates data management reports that display trust bank account data.

As shown in FIG. 11D, selection of the clients and policies report group 1108 can cause the first database query system to generate a plurality of data management reports, including a list of clients and policies, policy premium accounts, missing policy numbers, policy expiration reports, and/or cancellation notices due to non-payment of premium, among others. In some embodiments, the first database query system can generate the data management reports of the clients and policies report group 1108 for each policy and/or for a plurality of policies. In some embodiments, the first database query system can generate the data management reports of the clients and policies report group 1108 for single and/or multiple locations policies.

Figures 11E, 11F:
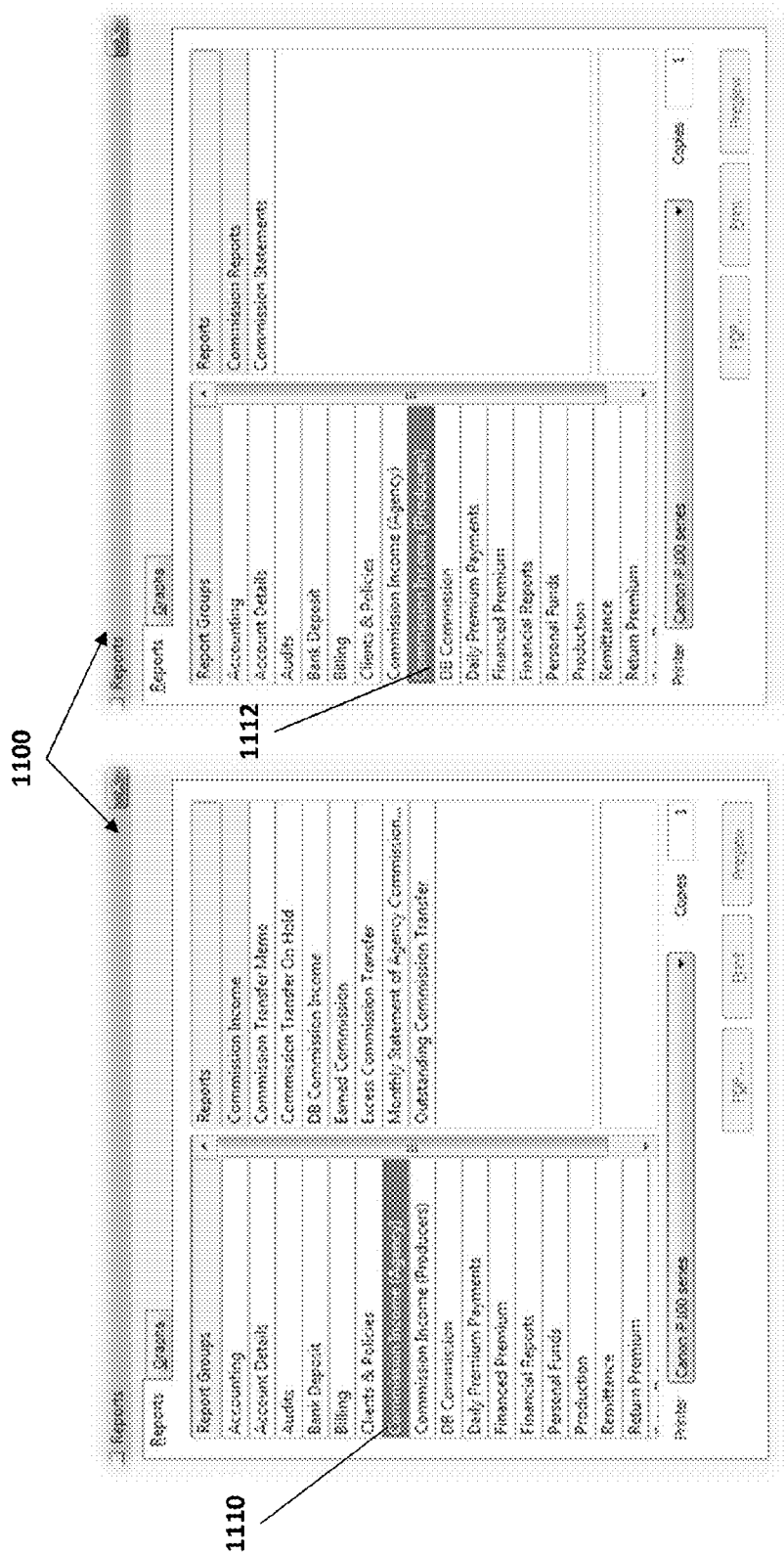

As shown in FIG. 11E, selection of the agency commission income group 1110 can cause the first database query system or the database management system to generate a plurality of data management reports, including a commission income report based on at least premium receipts, past commission, and/or transfer memos, commissions on hold, commission receivable earned or lost, and/or commissions transferred to operating accounts, for example. In some embodiments, the first database query system can generate the data management reports of the agency commission income report group 1110 for each policy and/or for a plurality of policies. In some embodiments, the first database query system or the database management system can generate the data management reports of the agency commission income report group 1110 for any period of time.

As shown in FIG. 11F, selection of the producer commission income report group 1112 can cause the first database query system to generate a plurality of data management reports, including a producer commission income, commission statements summarizing data of one producer and/or commission statements summarizing data of more than one producer, for example. In some embodiments, the first database query system can generate the data management reports of the producer commission income report group 1112 for each policy and/or for a plurality of policies. In some embodiments, the first database query system can generate the data management reports of the producer commission income report group 1112 for any period of time.

Figures 11G, 11H:
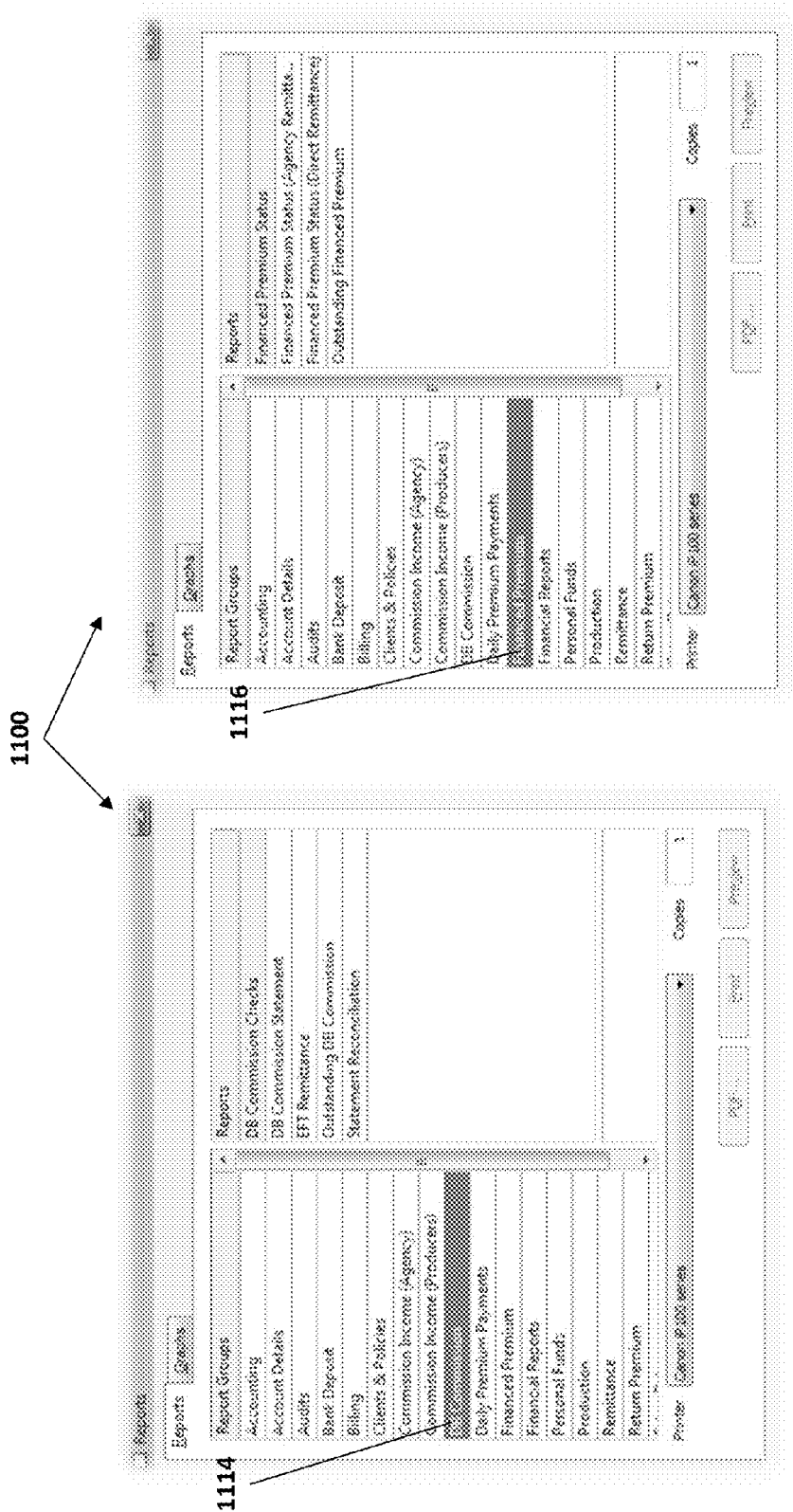

As shown in FIG. 11G, selection of the DB commission report group 1114 can cause the first database query system to generate a plurality of data management reports, including copies of past DB commission statements and/or DB commission checks, and/or outstanding DB commissions reports, among others. In some embodiments, the first database query system can generate the data management reports of the DB commission report group 1114 for each policy and/or for a plurality of policies.

As shown in FIG. 11H, selection of the financed premium report group 1116 can cause the first database query system to generate a plurality of data management reports showing a reporting status of financed premiums remitted directly to carriers and/or due to an agency, and/or outstanding financed premiums. In some embodiments, the first database query system can generate the data management reports of the financed premium report group 1116 for each policy and/or for a plurality of policies.

As shown in FIG. 11I, selection of a financial reports group 1118 can cause the first database query system to generate a plurality of data management reports, including a balance sheet and statement of receipts and disbursements (e.g., a float statement), solvency analysis reports based on the data displayed in the balance sheet report, and/or a statement of trust funds beneficiaries based on the data displayed in the float statement. In some embodiments, the first database query system can generate the data management reports of the financial reports group 1118 for each policy and/or for a plurality of policies.

As shown in FIG. 11J, selection of the personal funds report group 1120 can cause the first database query system to generate a plurality of data management reports, including reports showing cash maintained in the trust bank account as commission reserve, private funds, and/or interest earnings, for example.

Figures 11K, 11L:
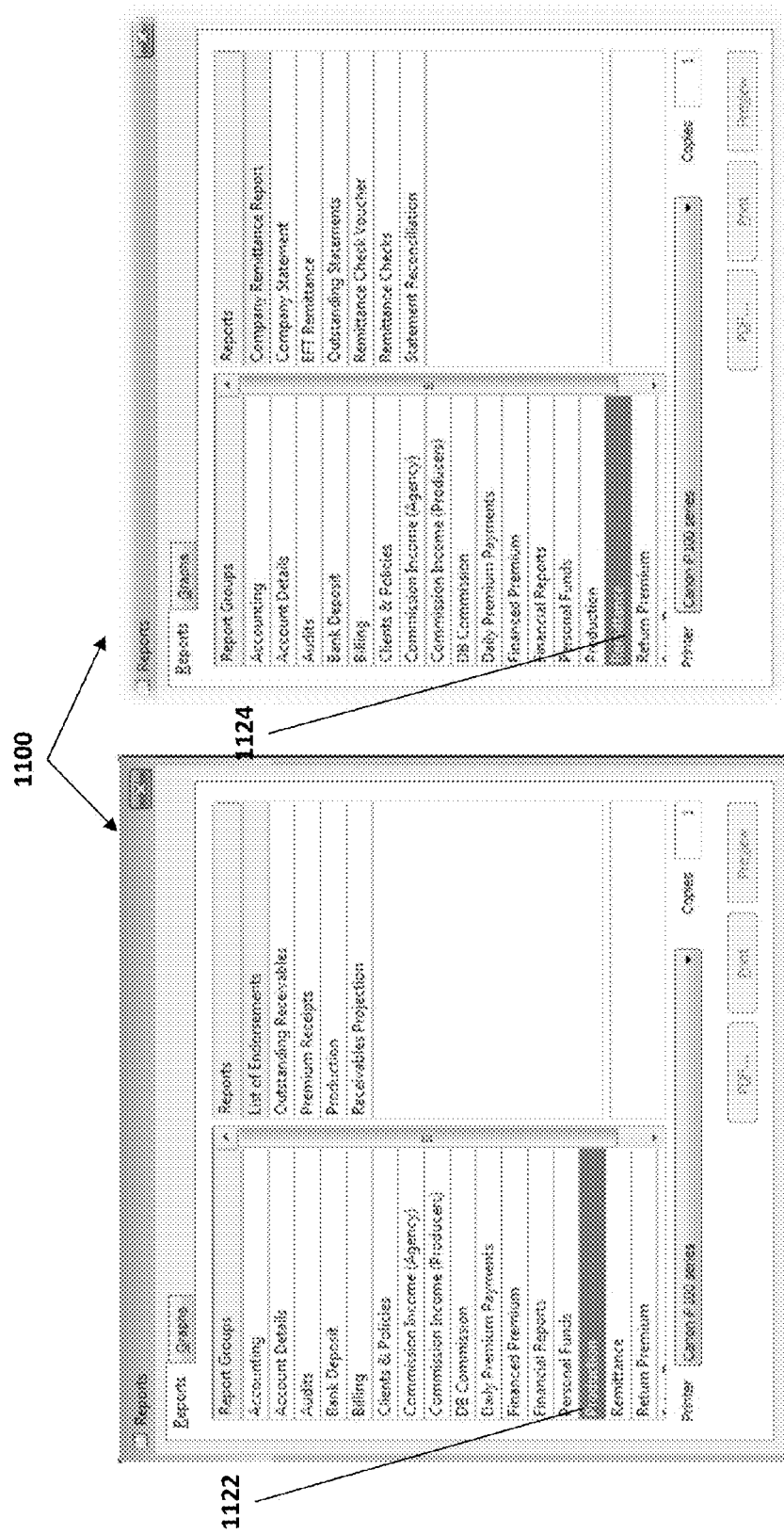

As shown in FIG. 11K, selection of the production report group 1122 can cause the first database query system to generate a plurality of data management reports, including a reports showing agency production by producers, CSRs, and/or companies, reports showing premiums received during the last 12 months and/or projected premiums and commissions over the next 12 months, and/or reports showing a list of endorsements, among others. In some embodiments, the projected premiums and commissions over the next 12 months is based on current sales.

As shown in FIG. 11L, selection of the remittance report group 1124 can cause the first database query system to generate a plurality of data management reports, including reports reporting company or general agents remittance, reports showing copies of any company statement, check voucher, and/or remittance check, and/or reports showing outstanding company statements, among others.

Figure 11M:
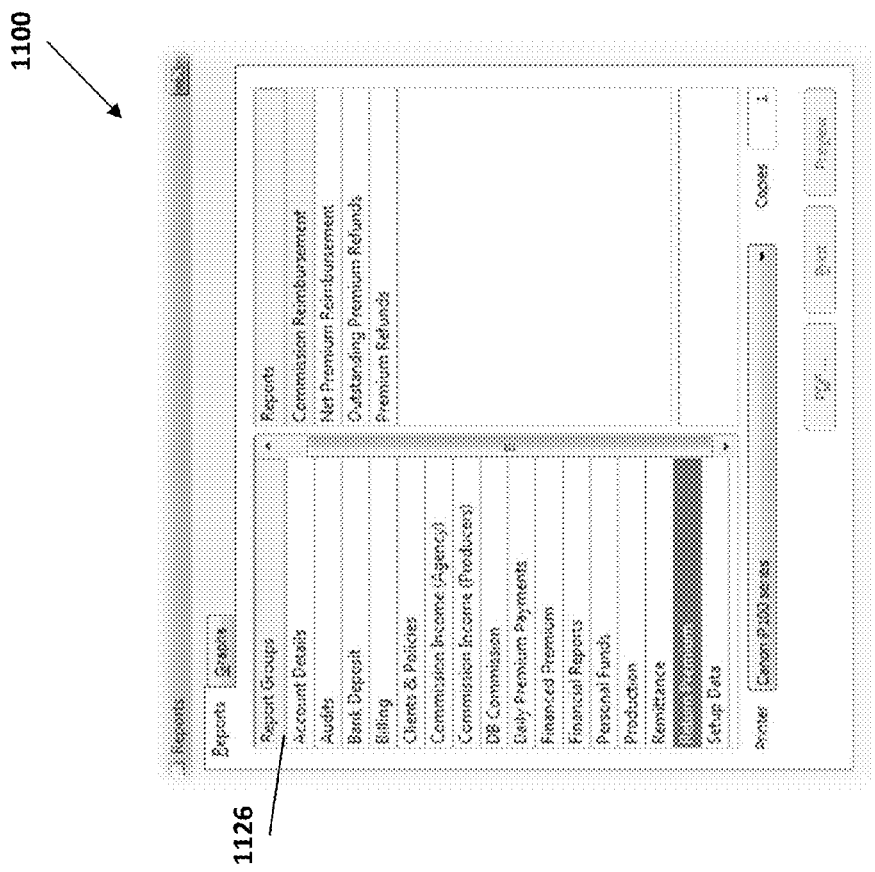

As shown in FIG. 11M, selection of the return premium report group 1126 can cause the first database query system 190 to generate a plurality of data management reports, including reports showing tracked outstanding premium refunds, reports reporting a status of return net premiums due from companies or general agents, and/or reports reporting a status of return commissions due from an agency operating account, among others.

FIGS. 12A-12J illustrated examples of the plurality of data management reports of the plurality of report groups 1100. In some embodiments, the data management reports include daily operations reports and/or actual agency production reports. In some embodiments, the daily operations reports include the plurality of data management reports of the account details report group 1100, the plurality of data management reports of the financed premium report group 1116, the plurality of data management reports of the return premium report group 1126, and/or of a commission reserve reports group.

In some embodiments, agencies may use production reports to monitor the producers' sales effort and/or monitor the agency commission income. The first database query system 190 of the database management system 100 can generate the database management reports in real time, automatically, and/or after receiving an input from a user. The database management reports may be based on data entered into the first and/or second database and/or data calculated by first database query system 190.

FIG. 12A illustrates an example of a policy premium detail report 1202. In the illustrated embodiment, the policy premium detail report 1202 can display data in a plurality of sections. The plurality of sections can display the data in a manner that is useful to the user. For example, the plurality of sections can include section 1202A, 1202B, 1202C, and/or 1202D. To display data in Section 1202A, first database query system 190 can retrieve data from the first database and/or the second database. Section 1202A displays the retrieved data including the policy premium, tax, and fees. Once the first database query system 190 retrieves the data from the first database and/or the second database, the first database query system 190 can calculate a policy net premium and commission. Section 1202B illustrates the policy net premium and commission. Based on, among other things, the policy net premium and the commission, the first database query system 190 can calculate and display a sales commission of the producers involved in the transaction closing in Section 1202C. Based on, among other things, the sales commission, and referral fee, the first database query system 190 can calculate and display a policy net commission and fees the agency will have to earn as a policy comes to an end of its term.

Figure 12B:
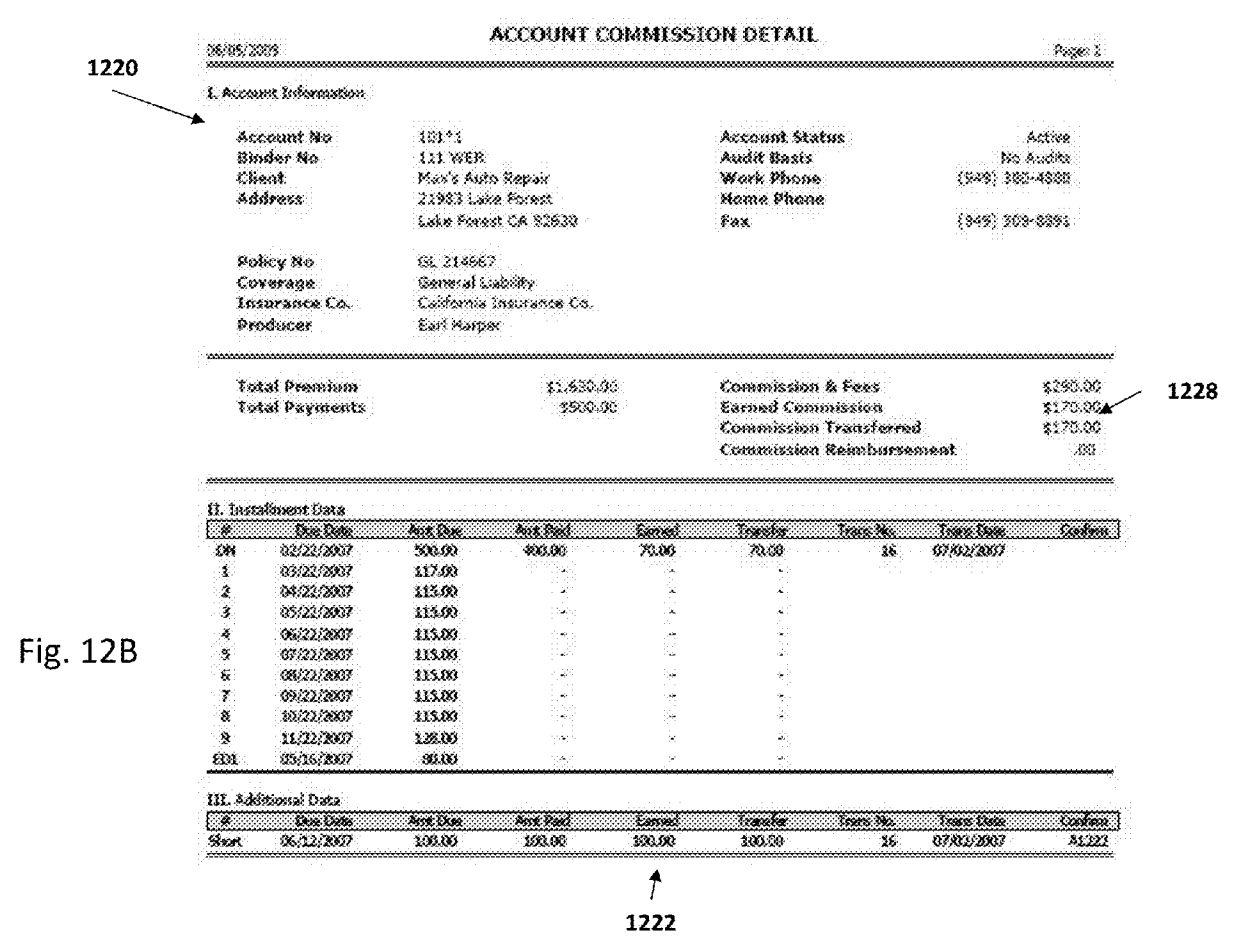

FIG. 12B illustrates an example of a policy commission detail report 1220. In this example, a policy includes a down payment and a plurality of installment payments (e.g., nine). In this example, the down payment is illustrated as being paid short by $100 while a related commission is reduced accordingly by the short amount (e.g., $100) to $70. As shown in the illustrated embodiment, the short amount is invoiced and displays that a payment has been made. Since in this example the payment represents a lost commission of the down payment 1222, it is added to $70 (e.g., the earned commission). As shown in FIG. 12B, the policy commission detail report can include a summary section 1228 illustrating that the down payment commission (e.g., $170) is fully earned and transferred to an operating account.

Figure 12C:
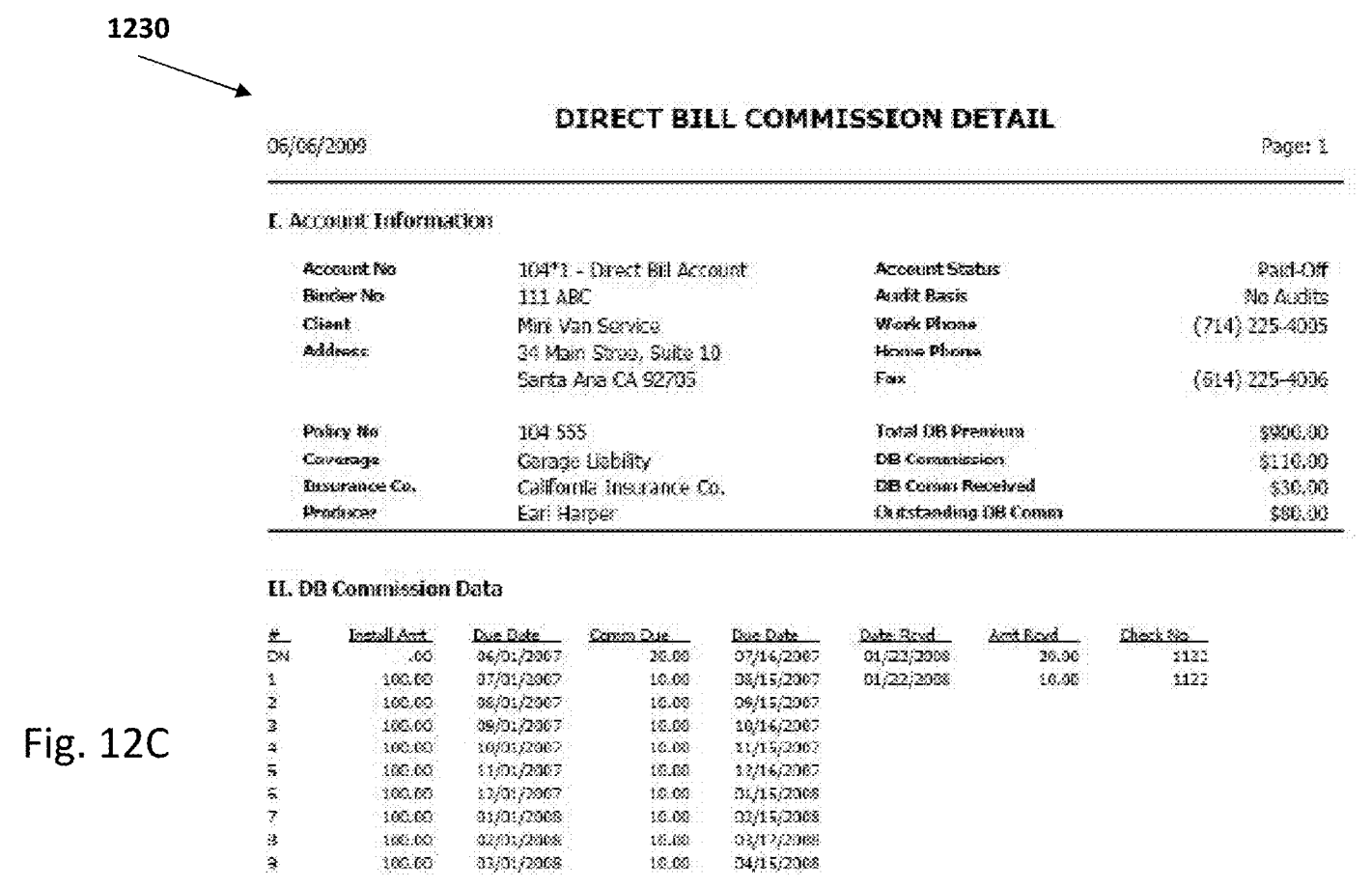

FIG. 12C illustrates an example of a Direct Bill ("DB") policy commission detail report 1230. In this example, a policy includes a down payment and a plurality of installment payments (e.g., nine), which will be invoiced directly by an insurance company. As the agency received DB commission, the data can be automatically updated in the first database. Based on the updated data of the first database, the first database query system 190 can generate an updated DB policy commission report to reflect the DB commission data. Advantageously, the DB policy commission detail report can help agencies more easily monitor and/or control DB commissions.

Figures 12D, 12E:
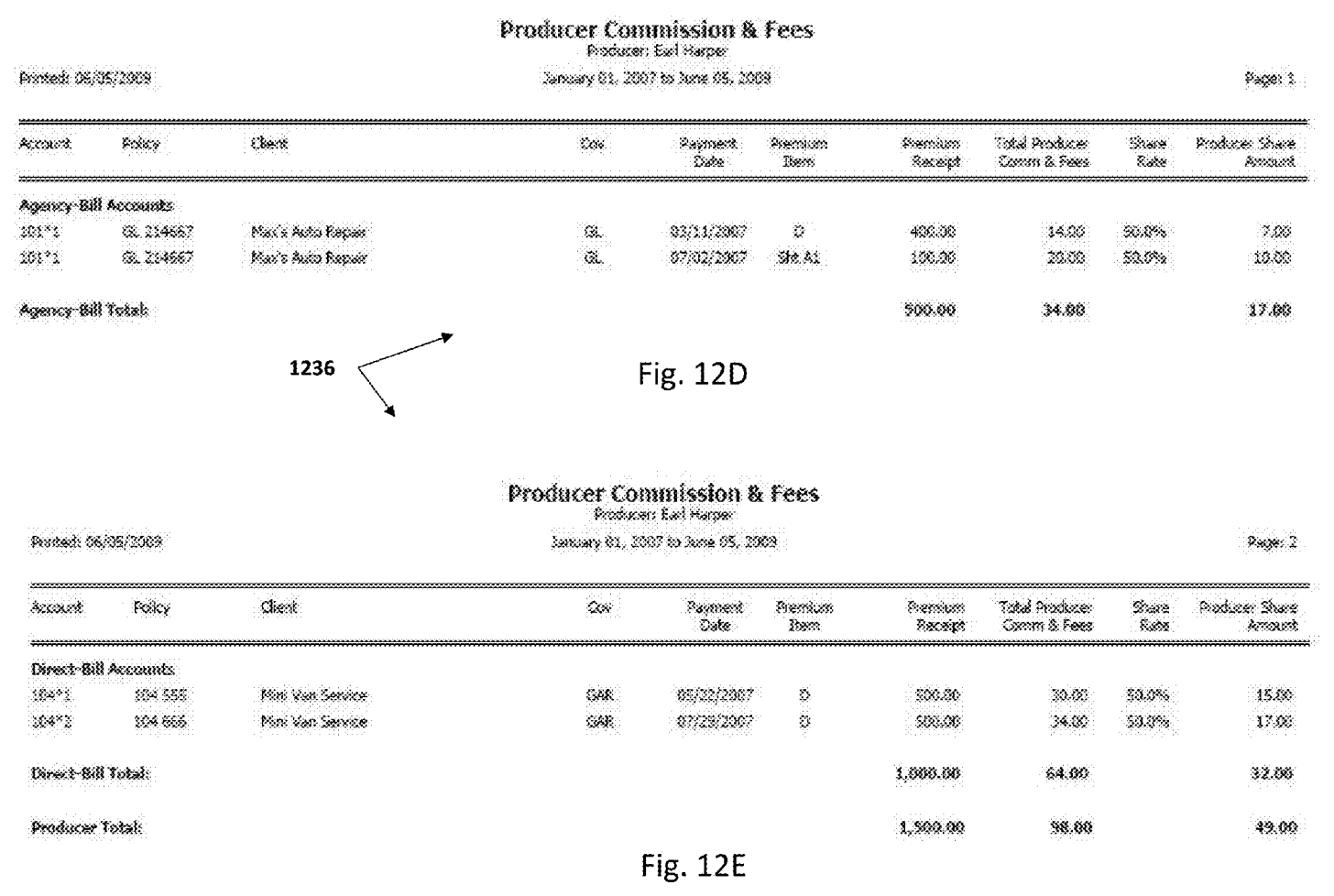

FIGS. 12D and 12E illustrate an example of a producer commission and fees report 1236. The first database query system 190 may generate the producer commission and fees report 1236 for each agency producer automatically upon receipt of a user request. In some examples, the producer commission and fees report 1236 displays each policy of a plurality of policies the producer has worked on, any payments received and/or the producer's commission share if more than one producer participates in the closing of a policy transaction. In some embodiments, agencies may use the producer commission and fees report 1236 to pay sales commission.

Figure 12F:
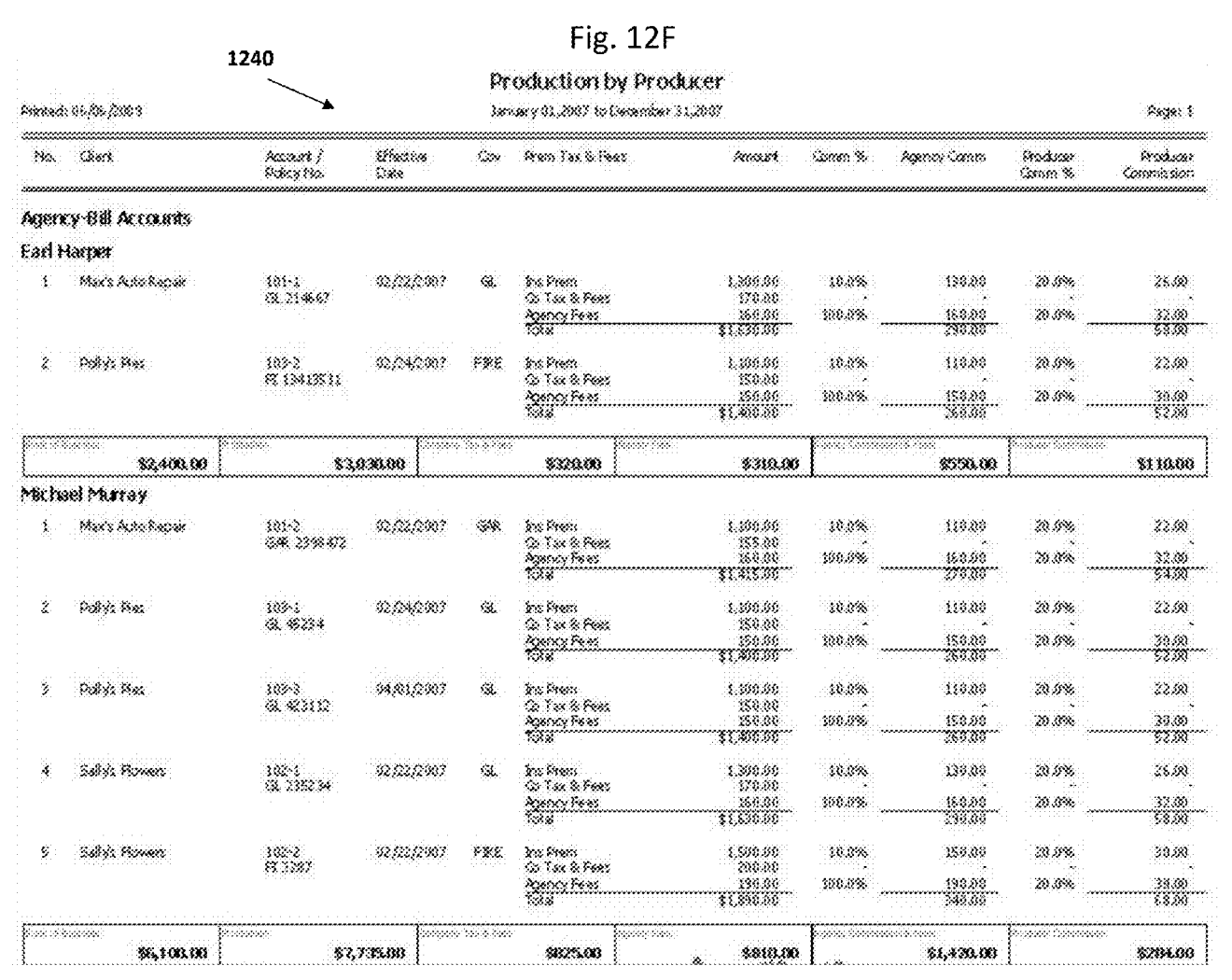

FIG. 12F illustrates an example of a production report 1240. In some embodiments, the first database query system 190 may generate the production report 1240 automatically and/or upon receipt of a user request (e.g., from an agency). Generally, the production report 1240 can be generated for any time period. For example, the user can input a specific report period. Based on the user input, the first database query system 190 can retrieve the data from the first database and/or the second database according to the input report period. In some examples, the time period is predefined.

In some embodiments the production report 1240 displays an agency production. The agency production can be displayed according to a book of business (e.g., premium only) or production value (e.g., premium and taxes and fees). The first database query system 190 can calculate and display the insurance company's fees, agency fees, agency commission and fees and/or producer commission for example. In some embodiments, the first database query system 190 calculates and/or displays in the production report 1240 the production value for each producer.

In some embodiments, the production report 1240 determines whether a policy has been transacted during the report period. If a policy has been transacted during the report period, the first database query system 190 can generate the production report such that the production report 1240 displays the premium, tax and fees, sales commission, and/or agency commission and fees and producer commission associated with each policy. Generally, the first database query system 190 calculates and displays production values for agency-bill policies (See FIGS. 8B-8F) separately from direct-bill policies.

Figure 12G:
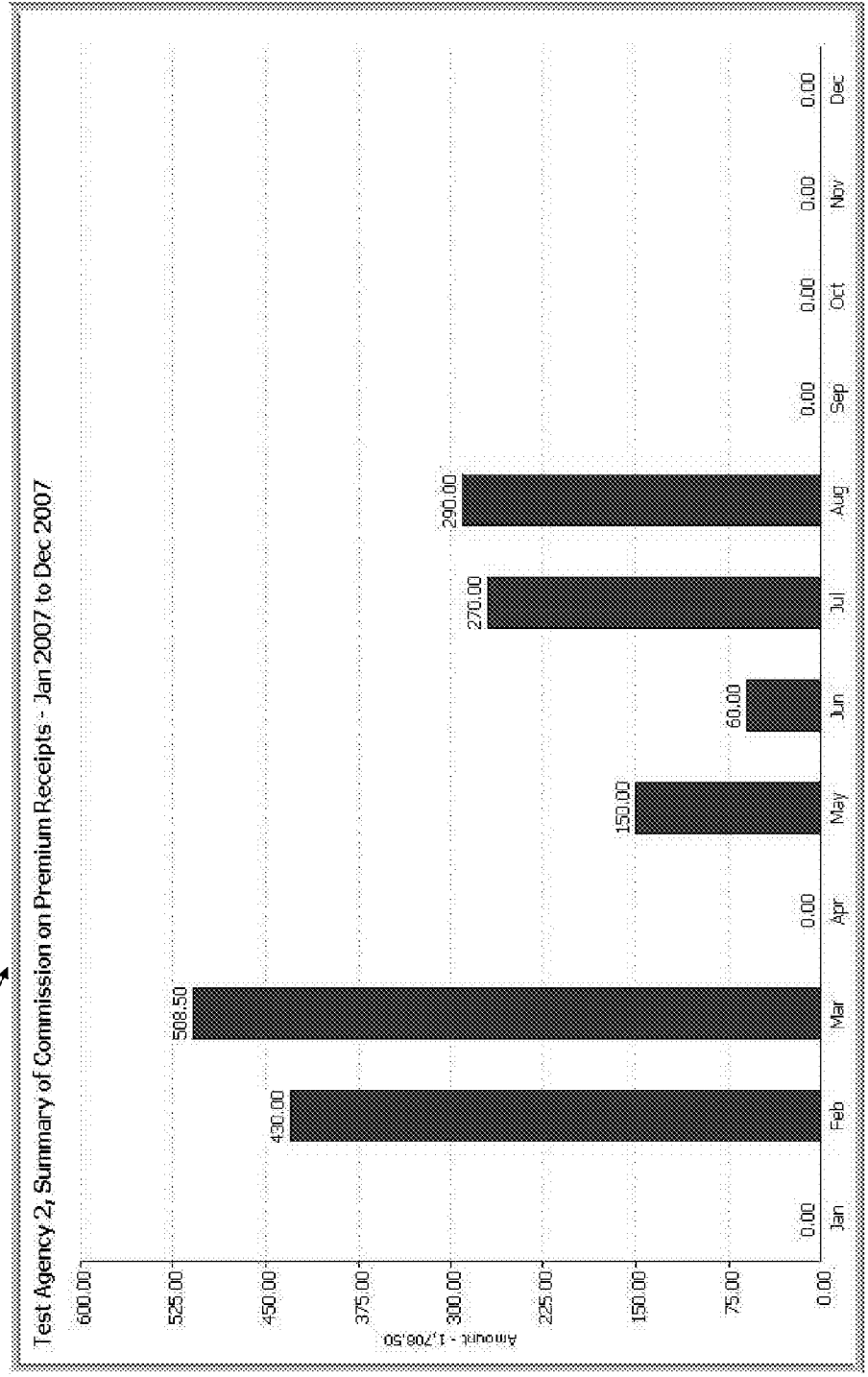

FIG. 12G illustrates an example of a projection of premium receipts report 1242 as a graphical representation of current policy transactions. In the illustrated embodiment, a plurality of premium receipts are graphically represented over a period of time. For example, the period of time can be 1 month, 3 months, 6 months, 9 months, and/or 12 or more months. In some embodiments, the projection of premium receipts report can display a total projected premium.

Figure 12H:
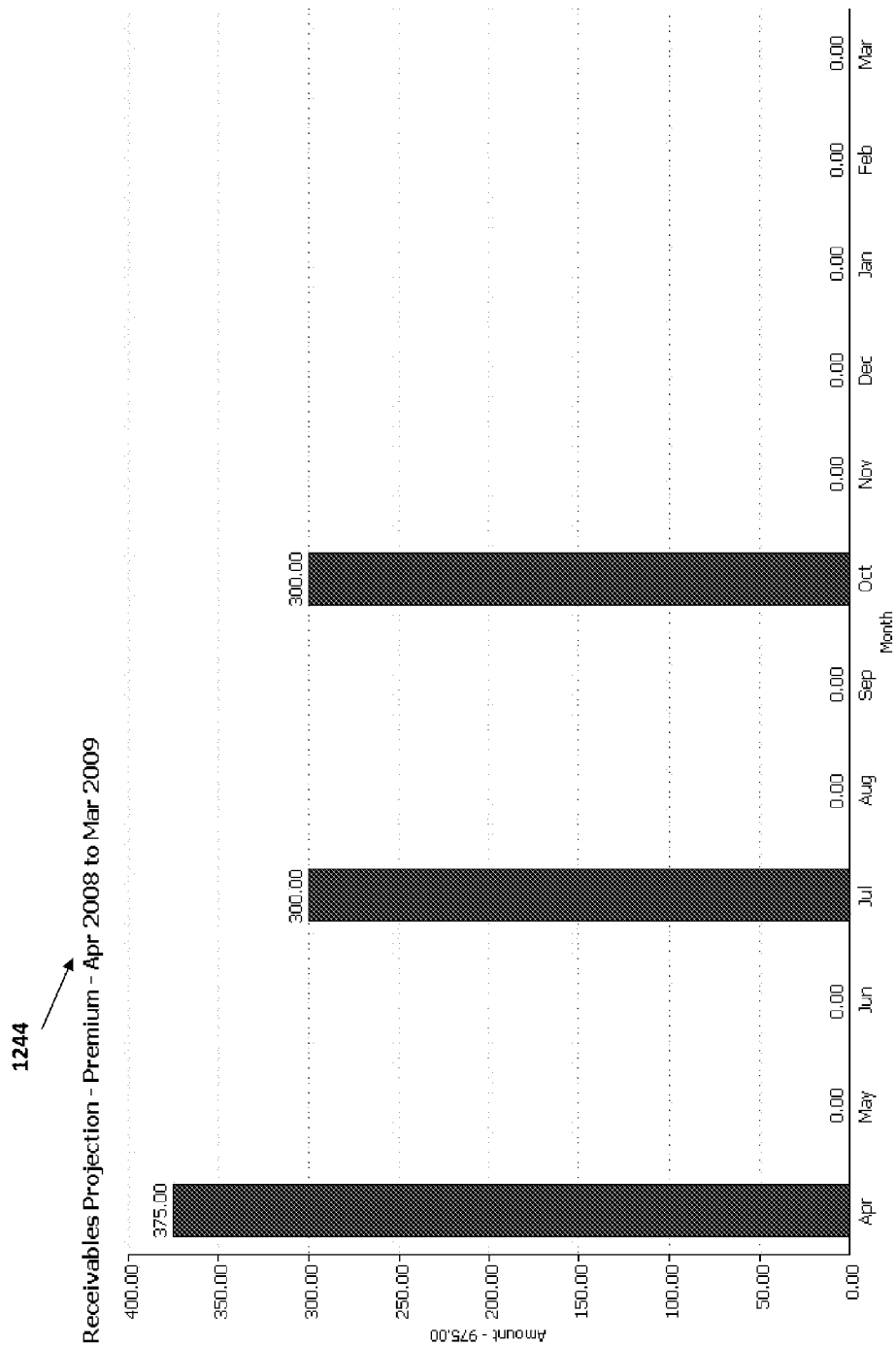

FIG. 12H illustrates an example of a graphical representation of a premium receivables projection report 1244. In the illustrated embodiment, the receivables projection report 1244 displays a plurality of monthly receivables projections.

Figure 12I:
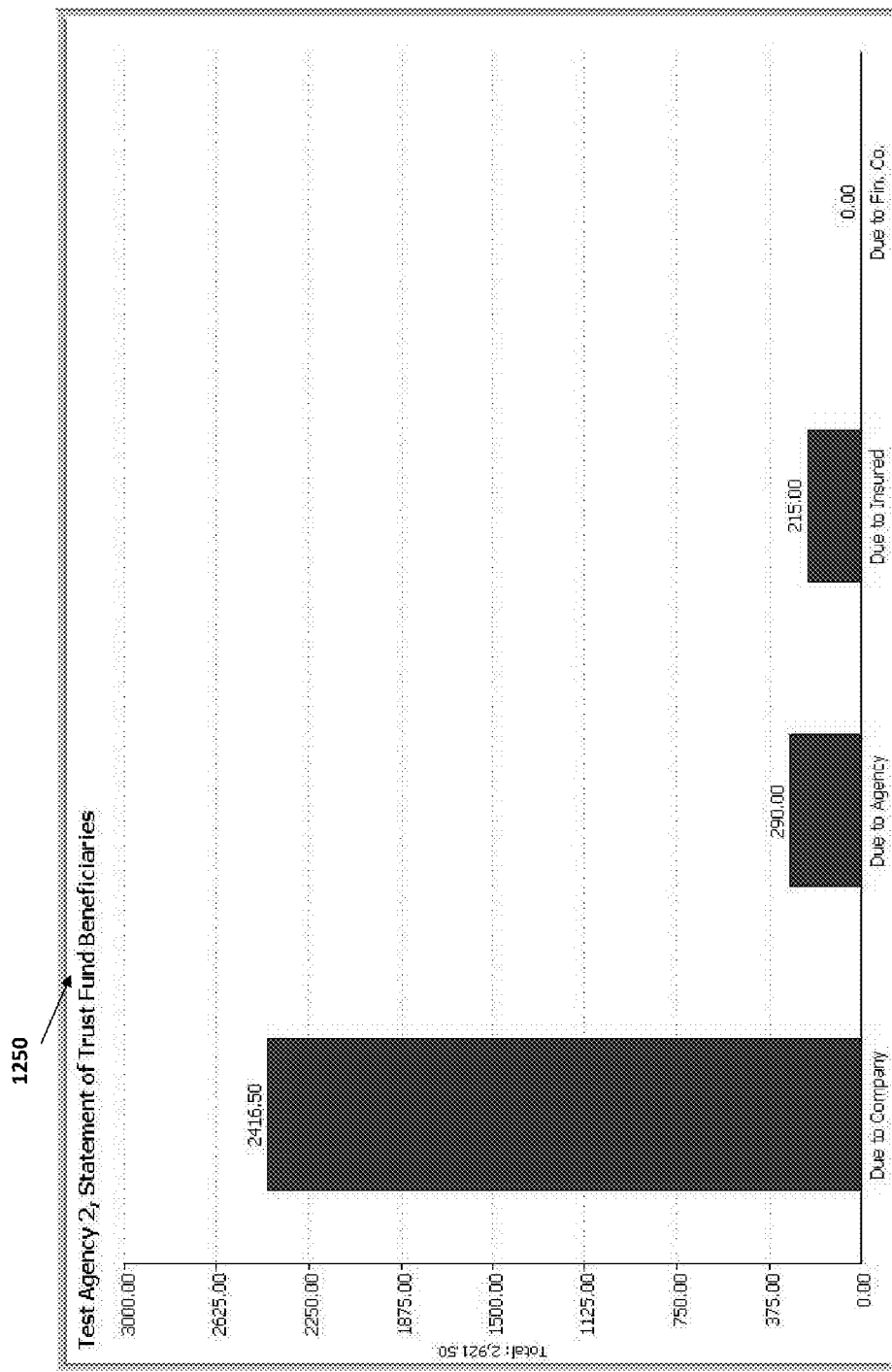

FIG. 12I illustrates an example of a trust fund beneficiaries statement 1250. For example, in the illustrated embodiment, the plurality of beneficiaries include insurance companies (e.g., net premiums), agencies (e.g., earned commission ready for transfer), insureds (e.g., return premiums), and/or finance companies (e.g., return premium). In some embodiments the first database query system 190 can calculate a total premium float based on the net premiums, earned commission ready for transfer, and/or return premiums. The query system can display the total premium float in the trust fund beneficiaries statement 1250. FIG. 12J illustrates an example of a graphical representation 1252 of the trust fund beneficiaries statement 1250. Though only one company is displayed in the illustrated embodiment, in some embodiments, the trust fund beneficiaries statement 1250 lists all insurance companies owning premium funds in the agency's trust bank account. In some examples of the trust fund beneficiaries statement 1250, the query system can calculate a net of the data displayed in the trust fund beneficiaries statement 1250 and/or display the net of the data.

Example Second Database Reports

In some embodiments, a user can select one report group of the plurality of financial reports. In some embodiments, a plurality of financial reports can be generated by the management module of the second database based on symbolic data stored in the second database and/or physical data or symbolic data stored in the first database. In some embodiments the plurality of financial reports can be generated automatically by the management module of the second database when the first database query system receives and/or stores certain data in the first database and/or when the management module converts a record or plurality of records from the first database into the second database. In some embodiments, the management module can analyze the content of the data stored in the second database, including an assigned second database identifier to display the data in the proper financial report.

Generally, the financial solvency reports generated by the management module of the second database can illustrate a plurality of trust financial solvency criteria that can display the solvency of an agency trust account. For example, in a trust balance sheet, a trust fiduciary assets record should be equal to a trust fiduciary liabilities record. In a statement of receipts and disbursements, a sum of a total premium receipts record and an outstanding transacted premium record should equal a sum of a total premium disbursements record and an undisbursed premium record, which should be equal to a total agency transacted premium record. Generally, a trust cash bank account balance record of the balance sheet should be equal to a premium float displayed on a premium float statement. Generally, a total cash assets record displayed on the balance sheet should be equal to a total premium amount record indicated on a statement of trust beneficiaries.

FIGS. 13A-13K illustrate example financial reports that can be generated by the management module 106 of the second database. FIG. 13A illustrates an example of a bank deposit slip 1300. As shown in the bank deposit slip 1300, an agency received $2,205.73 from an insured. In some embodiments, the database management system 100 receives the deposit amount and stores the deposit amount in a record of a first database index of the first database. As shown in the bank deposit slip 1300, confirmation of the bank deposit requires signature of an agency personnel and a date.

FIG. 13B illustrates an example of a Commission Transfer Memo 1302. As shown in the Commission Transfer Memo 1302, upon entry of the bank deposit, the agency earned $881.60 in commission. The commission can be ready to transfer to the agency operating bank account. As shown in FIG. 13B, the Commission Transfer Memo 1302 indicates that $681.60 is to be transferred to an agency operating bank account and $200 is to be transferred into the agency commission reserve account which can be maintained in the trust account.

FIG. 13C illustrates an example of an earned commission report 1304. The earned commission report 1304 illustrates that the end commission is $881.60. FIG. 13D illustrates an example of a remittance check voucher 1306. An agency can implement the remittance check voucher 1306 when agency provides a remittance check to an insurance company. The remittance check voucher can be automatically generated by the management module 106 and/or the first database query system upon storage of a company statement premium in the first database and/or the second database. In this example, the remittance check voucher 1306 shows the total premium due to the company and related statistics.

FIGS. 13E-13F illustrate an example of a statement of receipts and disbursements 1308. Generally, the statement of receipts and disbursements 1308 (Statement R&D) can be formatted to monitor and control the policy premium float. Insolvency occurs when the premium float becomes negative, in other words, disbursements have exceeded receipts. This condition represents a fiduciary violation punishable by a loss of business license or potential legal prosecution for theft. Agency owners acting as "custodians" of trust funds are personally responsible for a trust insolvency. In some embodiments, Policy Balance Sheet and Statement R&D data is automatically aggregated for each insurance company and/or total agency trust. Premium Float calculated and reported on Statements R&D can be matched by the Balance Sheet's cash assets. A variance between them can be indicative of either improper disbursement of premium funds or a system error. As described in more detail below, the database management system can be self-auditing.

As shown in part I of the illustrated example, earned commission has been reported as received. In this example, an unpaid balance of $3,750 was financed due to the insurance company. Accordingly, the policy transacted premium is shown as reported as $5955.73. As shown in part II of FIG. 13F, no disbursements have been recorded. As illustrated, the net premium and earn commission related to the $2205.73 payment have not been dispersed. The net premium and earn commission are therefore reported as undispersed. Accordingly as shown in the illustrated example, total disbursements and undispersed amounts are reported as the policy transacted premium or in this instance, $5955.73. This amount is shown as the same as in Part I of FIG. 13E. As shown in Part III of FIG. 13F, the policy premium float has been concluded and reported. As shown in this example, $2205.73 matches the cash and trust reported in a balance sheet 1310 (see FIGS. 13G-13H below).

FIGS. 13G-13H illustrate an example of a trust account balance sheet 1310. Generally, the trust account balance sheet 1310 can be formatted to monitor and control the policy financial status. At the policy inception a plurality of balance sheet sum totals match a transacted premium amount. These totals may gradually decrease and become zero at the end of the policy term, after the policy transacted premium and endorsements are fully received and disbursed. In the illustrated example the balance sheet represents an insureds account number 115*1 (e.g., see FIG. 13I). As shown in FIG. 13G, the cash and trust account can be reported following the bank deposit. As shown in FIG. 13H, the net premium is shown as current (e.g., due, not payable), since the agency has not received the company statement. As shown in the illustrated example the earned commission is due and payable as the payment was received and deposited in the bank. According to the trust balance sheet 1310, the commission transfer memo 1302 not been confirmed. In other words, the physical bank transfer of funds has not yet taken place.

FIG. 13I illustrates an example of policy premium float analysis report 1312. In Section A of the policy premium float analysis report 1312, the $2205.73 down payment is reported as received. According to the example in section B and section C of the policy premium float analysis report 1312, the $1324.13 net premium is reported current, while the $881.60 is reported due and payable. As shown in FIG. 13I, the float beneficiaries summary reports the $2205.73 premium float and the two beneficiaries (e.g., California insurance company and Agency).

FIGS. 13J-13K illustrate an example of a solvency analysis report 1314. Generally the financial solvency report 1314 can illustrate whether the trust is solvent according to a plurality of criteria. As shown in Part I of FIG. 13J, the $1324.13 surplus is reported as the difference between the $2205.73 bank deposit and the $881.60 commission payable. As shown in Part II of FIG. 13K, current solvency includes the net premium current record and the analysis indicates no funds as surplus.

Self-Auditing System

Figure 14A:
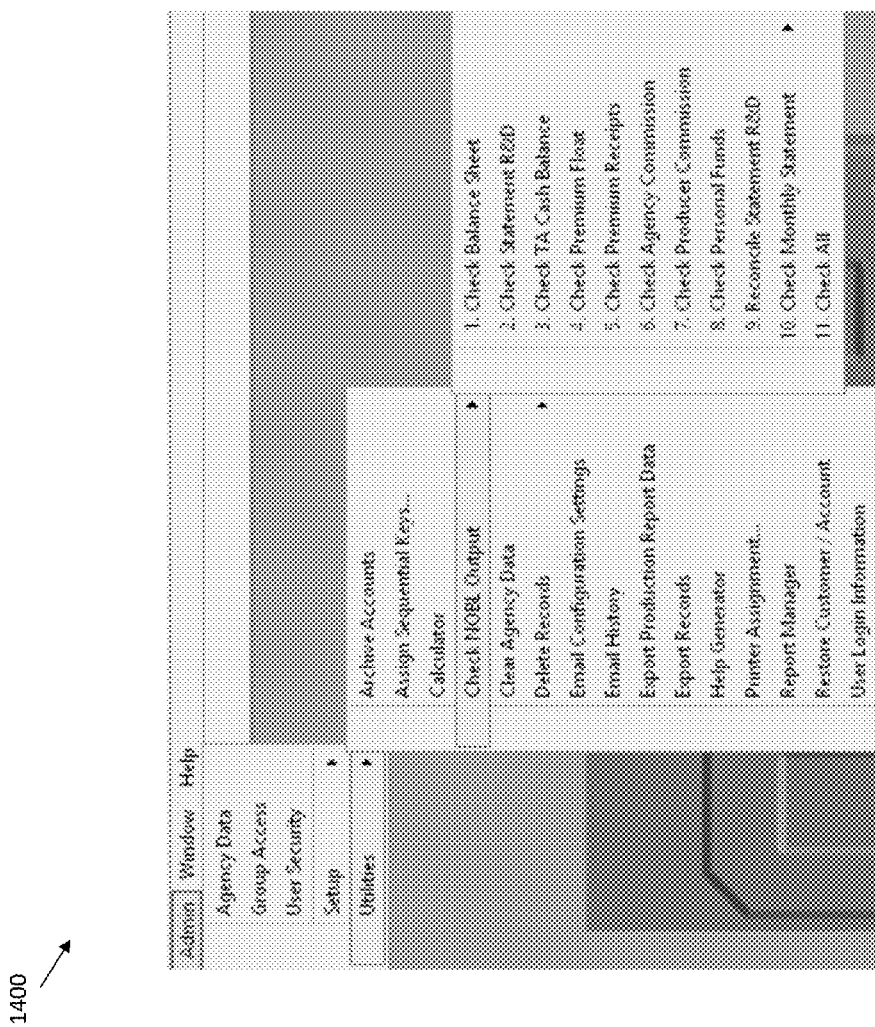
FIGS. 14A-14B are example reports according to an embodiment of the database management system.

In some embodiments, the database management system 100 can include a self-auditing system 1400. The self-auditing system 1400 can be implemented to verify the data records stored in the first database, the second database, and/or any reports generated by the management module 106. FIG. 14A illustrates a menu a user can select to check a plurality of TL account records and/or reports generated by the management module 106. In some embodiments, the user can select a particular item for the self-auditing system to verify. In some embodiments, as shown in FIG. 14A, the self-audition system can be configured to verify all TL account records and/or reports.

Figure 14B:
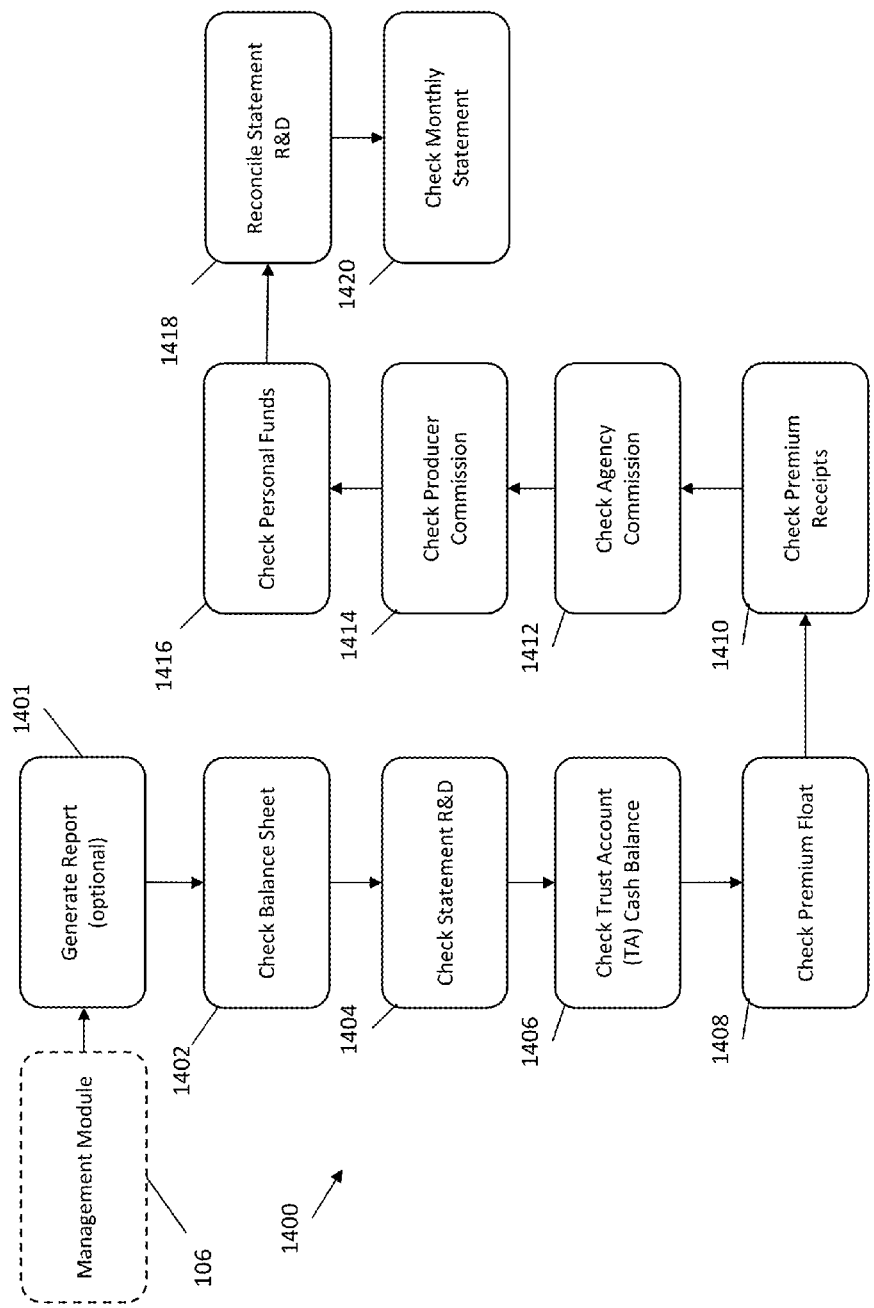

In some embodiments, the self-auditing system 1400 can run automatically upon the generation of any report described herein. In some embodiments, the self-auditing system 1400 can run automatically after any data record is stored in the first and/or second database. For example, FIG. 14B illustrates an method for self-auditing. FIG. 14B illustrates some elements as occurring sequentially, however in various embodiments, a process flow may comprise more or fewer elements and/or the elements may be processed in a different order and/or one or more elements may be processed simultaneously or concurrently. As shown in FIG. 14B, the management module 106 can optionally generate a report based on a plurality of data records of the second database index, for example at block 1401. In this example, at block 1402, the self-auditing system can verify the balance sheet records. At block 1404, the self-auditing system can verify the statement r&d record. At block 1406, the self-auditing system can verify the trust account cash balance record. At block 1408, the self-auditing system can verify the premium float record. At block 1410, the self-auditing system can verify the premium receipts record. At block 1412 the self-auditing system can verify the agency commission record. At block 1414, the self-auditing system can verify the producer commission record. At block 1416, the self-auditing system can verify the personal funds record. At block 1418, the self-auditing system can verify and/or reconcile the statement r&d record. At block 1420, the self-auditing system can verify the monthly statement record. Any record described herein can refer to a single record and/or a plurality of records.

By verifying each of the records described herein, the self-auditing system 1400 can identify an error in any record stored in the first database and/or the second database, or in any report generated by the management module 106.

CONCLUSION

Various other modifications, adaptations, and alternative designs are of course possible in light of the above teachings. Therefore, it should be understood at this time that within the scope of the appended claims the invention may be practiced otherwise than as specifically described herein. It is contemplated that various combinations or sub-combinations of the specific features and aspects of the embodiments disclosed above may be made and still fall within one or more of the inventions. Further, the disclosure herein of any particular feature, aspect, method, property, characteristic, quality, attribute, element, or the like in connection with an embodiment can be used in all other embodiments set forth herein. Accordingly, it should be understood that various features and aspects of the disclosed embodiments can be combined with or substituted for one another in order to form varying modes of the disclosed inventions. Thus, it is intended that the scope of the present inventions herein disclosed should not be limited by the particular disclosed embodiments described above. Moreover, while the invention is susceptible to various modifications, and alternative forms, specific examples thereof have been shown in the drawings and are herein described in detail. It should be understood, however, that the invention is not to be limited to the particular forms or methods disclosed, but to the contrary, the invention is to cover all modifications, equivalents, and alternatives falling within the spirit and scope of the various embodiments described and the appended claims. Any methods disclosed herein need not be performed in the order recited. The methods disclosed herein include certain actions taken by a practitioner; however, they can also include any third-party instruction of those actions, either expressly or by implication. The ranges disclosed herein also encompass any and all overlap, sub-ranges, and combinations thereof. Language such as "up to," "at least," "greater than," "less than," "between," and the like includes the number recited. Numbers preceded by a term such as "approximately", "about", and "substantially" as used herein include the recited numbers (e.g., about 10%=10%), and also represent an amount close to the stated amount that still performs a desired function or achieves a desired result. For example, the terms "approximately", "about", and "substantially" may refer to an amount that is within less than 10% of, within less than 5% of, within less than 1% of, within less than 0.1% of, and within less than 0.01% of the stated amount.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. The headings used herein are for the convenience of the reader only and are not meant to limit the scope of the inventions or claims.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. Additionally, the skilled artisan will recognize that any of the above-described methods can be carried out using any appropriate apparatus. Further, the disclosure herein of any particular feature, aspect, method, property, characteristic, quality, attribute, element, or the like in connection with an embodiment can be used in all other embodiments set forth herein. For all of the embodiments described herein the steps of the methods need not be performed sequentially. Thus, it is intended that the scope of the present invention herein disclosed should not be limited by the particular disclosed embodiments described above.

What is claimed is:

1. A computer-implemented database management method for property and casualty insurance trust financial management to identify account records in response to input received via a personalized interactive user interface to automatically calculate symbolic data based on the account records and to monitor and present the account records in a useful configuration for the management of property and casualty insurance policy premium data, the computer-implemented method running on a computer having a processor and a non-transitory computer readable storage medium, the computer-implemented method comprising:

displaying the personalized interactive user interface that includes functionality for users to interactively provide a plurality of electronic data associated with a first insurance policy and an insurance premium transaction;

receiving, through the interactive user interface by a computer system, the plurality of electronic data associated with the first insurance policy and the insurance premium transaction, the plurality of electronic data comprising one or more account records;

analyzing the plurality of electronic data, by the computer system in response to receipt of the plurality of electronic data, to determine the one or more account records;

applying, by a computer system, a first database identifier to each account record of the one or more account records, wherein the first database identifier comprises a customer number and a policy number associated with the first insurance policy;

storing, by the computer system, each account record of the one or more account records and the first database identifier as a first index of a first database, the storing including writing each account record of the one or more account records within the non-transitory computer readable storage medium, and storing each first database identifier applied to each account record within the non-transitory computer readable storage medium;

wherein the first index includes a plurality of database fields and a plurality of database records, and wherein a first database record of the plurality of database records corresponds to the first insurance policy;

automatically translating the first database into a second database, wherein the automatic translating further comprises:

accessing, by the computer system, the first index of the first database;

retrieving, by the computer system, each account record of the one or more account records from the first index of the first database;

generating, by the computer system, in response to retrieving each account record associated with the insurance premium transaction, a plurality of symbolic data records based on the one or more account records, wherein the plurality of symbolic data records includes: a plurality of ledger records comprising:

an insured transacted premium record indicating an amount of money an insured is obligated to pay;

an insurance company net premium record indicating an amount of money an insurance company has a right to receive; and
an agency sales commission record indicating an amount of money an agent has a right to receive; and
a plurality of fiduciary records comprising:
an owner fiduciary record indicating an amount of money an agency owner has a right to receive; and
a custodian fiduciary record indicating an amount of money an agency custodian has an obligation to disburse to the insurance company and the agent, and
wherein the generating the plurality of symbolic data records includes:
determining, by the computer system, the insured transacted premium record;
calculating, by the computer system, the agency sales commission record, based on the insured transacted premium record and a commission rate of the plurality of electronic data, wherein the agency sales commission record indicates the amount of money the agent has a right to receive;
calculating, by the computer system, the insurance company net premium record, based on the insured transacted premium record and the agency sales commission record;
determining by the computer system, the owner fiduciary record; and
determining, by the computer system, the custodian fiduciary record;
applying, by the computer system, a second database identifier to each symbolic data record of the plurality of symbolic data records,
wherein the second database identifier comprises the first database identifier and a trust ledger account record identifier, the trust ledger account record identifier configured to indicate an instruction for generating a report; and
storing temporarily, by the computer system, the plurality of symbolic data records in the second database according to the second database identifier, wherein storing the plurality of symbolic data records includes recording in the second database, by the computer system, the insured transacted premium record, the agency sales commission record, the insurance company net premium record, the owner fiduciary record, and the custodian fiduciary record;
generating, using the computer system, one or more reports based on at least a first symbolic data record of the plurality of symbolic data records stored in the second database according to the second database identifier applied to the at least a first symbolic data record, wherein the one or more reports includes:
a trust balance sheet configured to display accounting data associated with trust financial solvency, wherein the trust balance sheet is generated by the computer system based on the plurality of ledger records; and
a statement of receipts and disbursements configured to display accounting data associated with trust fund beneficiaries and trust premium float, wherein the statement of receipts and disbursements is generated by the computer system based on the plurality of fiduciary records,
wherein the trust balance sheet and the statement of receipts and disbursements are configured to be compared to determine whether a trust is financially insolvent and to determine float owners, and
verifying, using the computer system, that no errors have occurred in the generation of the one or more reports, the verifying comprising:
accessing one of the plurality of symbolic data records;
accessing another one of the plurality of symbolic data records using a database link between each of the accessed plurality of symbolic data records; and
comparing a value of each one of the accessed plurality of symbolic data records; and
dynamically causing by the computer system, removal of memory associated with the plurality of symbolic data records from the second data base upon verification of the generation of the one or more reports,
wherein the computer system comprises electronic memory.

2. The computer-implemented method of claim 1, wherein recording the insured transacted premium record in the second database further comprises applying a transaction premium second database identifier to the insurance insured transacted premium record.

3. The computer-implemented method of claim 2, wherein the insurance premium transaction includes a down payment, and wherein the method further comprises:
applying, by the computer system, the first database identifier to the down payment; and
storing, by the computer system, the down payment and the first database identifier of the down payment in the first database.

4. The computer-implemented method of claim 3, further comprising:
adjusting the insured transacted premium, wherein the adjusting comprises:
accessing, by the computer system, the down payment from the first database;
matching, by the computer system, the first database identifier of the down payment with the insured transaction premium second database identifier; and
generating, by the computer system an updated insured transacted premium, the generating comprising reducing, by the computer system, the insured transacted premium by the down payment; and
storing the down payment in the second database as a cash in trust record, wherein recording further comprises applying a cash in trust second database identifier to the down payment and storing the cash in trust record in the second database according to the cash in trust second database identifier.

5. The computer-implemented method of claim 4, further comprising:
recording the down payment in the second database as a transacted premium receipt record, wherein recording further comprises applying a transacted premium receipt second database identifier to the down payment and storing the transacted premium receipt record in the second database according to the transacted premium receipt second database identifier; and
generating, by the computer system, the premium float based on the transacted premium receipt record.

6. The computer-implemented method of claim 5, further comprising:
generating, by the computer system, a premium commission record based on the down payment; and applying, by the computer system, a premium commission second database identifier to the premium commission record; and storing, by the computer system, the premium commission record in the second database according to the premium commission second database identifier.

7. The computer-implemented method of claim 6, further comprising:
adjusting the cash in trust record, wherein the adjusting comprises:
accessing, by the computer system, the premium commission record from the second database;
matching, by the computer system, the premium commission second database identifier with the cash in trust second database identifier; and
generating, by the computer system, an updated cash in trust record, the generating comprising reducing, by the computer system, an amount of cash in trust stored in the cash in trust record by an amount of premium commission stored in the premium commission record; and
storing the premium commission record in the second database as a commission transfer, wherein storing further comprises applying a commission transfer second database identifier to the premium commission record and storing the commission transfer in the second database according to the commission transfer second database identifier.

8. The computer-implemented method of claim 7, further comprising:
adjusting the premium float, wherein the adjusting comprises:
accessing, by the computer system, the commission transfer from the second database;
matching, by the computer system, the commission transfer second database identifier of the commission transfer with the premium float second database identifier; and
generating, by the computer system, an updated premium float, the generating comprising reducing, by the computer system, an amount of the premium float by an amount of commission transfer; and
storing the updated premium float in the second database as premium float, wherein storing further comprises applying the premium float second database identifier to the updated premium float and storing the updated premium float in the second database according to the premium float second database identifier.

9. The computer-implemented method of claim 1, wherein the first database comprises a plurality of indexes, wherein each index of the plurality of indexes is configured to store insurance premium data and return premium data.

10. The computer-implemented method of claim 9, wherein each index of the plurality of indexes is configured to store account data records that correspond to an account of a different type.

11. The computer-implemented method of claim 1, wherein the generating comprises automatically generating the one or more reports when an account record is stored in the first database.

12. The computer-implemented method of claim 1, wherein the generating comprises automatically generating the one or more reports when a trust ledger account data record is stored in the second database.

13. The computer-implemented method of claim 1, further comprising verifying, using the computer system, that a first account record of a first report is equal to a second account record of a second report.

14. The computer-implemented method of claim 13, wherein the first account record includes a fiduciary assets record and the second account record includes a trust fiduciary liabilities record.

15. The computer-implemented method of claim 14, wherein the first report includes a first trust balance sheet and the second report includes a second trust balance sheet.

16. The computer-implemented method of claim 13, wherein the first account record includes a trust cash bank account balance record and the second account record includes a premium float record.

17. The computer-implemented method of claim 16, wherein the first report includes the trust balance sheet and the second report includes a premium float statement.

18. The computer-implemented method of claim 1, wherein the second database is stored in a location remote to the location of the first database.

* * * * *